United States Patent
Bernardi

(10) Patent No.: US 11,151,229 B1
(45) Date of Patent: *Oct. 19, 2021

(54) SECURE MESSAGING SERVICE WITH DIGITAL RIGHTS MANAGEMENT USING BLOCKCHAIN TECHNOLOGY

(71) Applicant: AVILA TECHNOLOGY, LLC, Tysons, VA (US)

(72) Inventor: Robert Bernardi, McLean, VA (US)

(73) Assignee: AVILA TECHNOLOGY, LLC, Tysons, VI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,559

(22) Filed: Oct. 6, 2020

Related U.S. Application Data

(63) Continuation-in-part of application No. 16/845,082, filed on Apr. 10, 2020, now Pat. No. 10,873,852.

(51) Int. Cl.
| | |
|---|---|
| *G06F 21/10* | (2013.01) |
| *H04L 12/58* | (2006.01) |
| *G06F 21/62* | (2013.01) |
| *H04L 29/06* | (2006.01) |
| *H04L 9/08* | (2006.01) |

(52) U.S. Cl.
CPC ........ *G06F 21/105* (2013.01); *G06F 21/6263* (2013.01); *H04L 9/085* (2013.01); *H04L 51/10* (2013.01); *H04L 51/18* (2013.01); *H04L 63/123* (2013.01); *G06F 21/10* (2013.01)

(58) Field of Classification Search
CPC .... G06F 21/105; G06F 21/10; G06F 21/6263; H04L 9/085; H04L 51/10; H04L 51/18; H04L 63/123
See application file for complete search history.

(56) References Cited

U.S. PATENT DOCUMENTS

| | | |
|---|---|---|
| 7,337,146 B2 | 2/2008 | Heelan et al. |
| 7,415,439 B2 | 8/2008 | Kontio et al. |
| 7,593,991 B2 | 9/2009 | Friedman et al. |
| 7,765,404 B2 | 7/2010 | Lamberg |
| 8,090,662 B2 | 1/2012 | Pence et al. |
| 8,286,255 B2 | 10/2012 | Grant et al. |
| 8,488,786 B2 | 7/2013 | Ferrazzini et al. |
| 8,619,993 B2 | 12/2013 | Verma |
| 8,635,645 B2 | 1/2014 | Krishnamoorthi et al. |
| 8,660,539 B2 | 2/2014 | Khambete et al. |

(Continued)

OTHER PUBLICATIONS

Goulao, A., Duarte, N., & Santos, N. Sharelff: A Sticky Policy Middleware for Self-Destructing Messages in Android Applications. 2016 IEEE 35th Symposium on Reliable Distributed Systems (SRDS), 11-20. (Year: 2016).*

(Continued)

*Primary Examiner* — John M Macilwinen

(74) *Attorney, Agent, or Firm* — Juneau & Mitchell; Todd L. Juneau

(57) ABSTRACT

The invention described herein is directed to a secure text messaging and object sharing mobile application connected to a DRM cloud service that provides encryption, digital rights management (DRM) of the text and of the attachments, blockchain transactions, the capability of attaching documents, photos and so forth, the capability of interfacing with a user's contacts application, and that operates in both Android and iOS environments.

18 Claims, 43 Drawing Sheets

(56) References Cited

U.S. PATENT DOCUMENTS

| | | | |
|---|---|---|---|
| 8,688,583 B2 | 4/2014 | Boccon-Gibod et al. | |
| 8,701,145 B1 | 4/2014 | Berger et al. | |
| 8,726,406 B2* | 5/2014 | Catrein | H04L 63/10 |
| | | | 726/30 |
| 8,806,208 B2 | 8/2014 | Cheng et al. | |
| 8,831,228 B1 | 9/2014 | Agrawal et al. | |
| 9,113,497 B2 | 8/2015 | Smith, II et al. | |
| 9,177,112 B2 | 11/2015 | Bjorkengren et al. | |
| 9,244,916 B2 | 1/2016 | Berger et al. | |
| 9,313,458 B2 | 4/2016 | Helms et al. | |
| 9,374,369 B2 | 6/2016 | Mahaffey et al. | |
| 9,374,685 B1 | 6/2016 | Jakatdar et al. | |
| 9,396,325 B2 | 7/2016 | Kendall | |
| 9,426,133 B2 | 8/2016 | Boccon-Gibod et al. | |
| 9,473,485 B2 | 10/2016 | Kendall | |
| 9,491,496 B2 | 11/2016 | Patadia et al. | |
| 9,531,744 B2 | 12/2016 | Bettini et al. | |
| 9,577,989 B2 | 2/2017 | Ackerly et al. | |
| 9,578,021 B2 | 2/2017 | Ackerly | |
| 9,582,668 B2 | 2/2017 | Bettini et al. | |
| 9,621,840 B2 | 4/2017 | Berger et al. | |
| 9,626,667 B2 | 4/2017 | Boccon-Gibod et al. | |
| 9,628,841 B2 | 4/2017 | Cho et al. | |
| 9,635,004 B2 | 4/2017 | Giladi et al. | |
| 9,679,332 B2 | 6/2017 | Kim et al. | |
| 9,715,814 B2 | 7/2017 | Sattari | |
| 9,847,975 B2 | 12/2017 | Medvinsky | |
| 9,847,979 B2 | 12/2017 | Peterka et al. | |
| 9,864,405 B2 | 1/2018 | Trachtenberg et al. | |
| 9,900,306 B2 | 2/2018 | Handal et al. | |
| 9,923,844 B1 | 3/2018 | Kret et al. | |
| 9,934,600 B2 | 4/2018 | Sarafa et al. | |
| 9,948,580 B2 | 4/2018 | Reed et al. | |
| 9,948,588 B2 | 4/2018 | O'Connor | |
| 9,965,628 B2 | 5/2018 | Ford et al. | |
| 9,967,553 B1 | 5/2018 | Kim-Whitty | |
| 9,972,239 B2 | 5/2018 | Trachtenberg et al. | |
| 9,979,702 B2 | 5/2018 | Nugent et al. | |
| 9,979,707 B2 | 5/2018 | Miller et al. | |
| 10,015,169 B2* | 7/2018 | Kennedy | H04L 63/101 |
| 10,110,960 B2 | 10/2018 | Roberts et al. | |
| 10,123,065 B2 | 11/2018 | Lyons et al. | |
| 10,210,341 B2 | 2/2019 | Roth et al. | |
| 10,319,022 B2 | 6/2019 | Clayton et al. | |
| 10,332,478 B2 | 6/2019 | Trachtenberg et al. | |
| 10,387,857 B2 | 8/2019 | Kim et al. | |
| 10,429,801 B2 | 10/2019 | Billings | |
| 10,504,418 B2 | 12/2019 | Trachtenberg et al. | |
| 10,536,422 B1 | 1/2020 | Rao | |
| 10,539,806 B1 | 1/2020 | Kim-Whitty | |
| 10,565,621 B2 | 2/2020 | DeWitt et al. | |
| 10,601,794 B2 | 3/2020 | Srinivasan et al. | |
| 10,608,974 B2 | 3/2020 | Longdale et al. | |
| 10,742,732 B1 | 8/2020 | Lindeman | |
| 10,873,852 B1 | 12/2020 | Bernardi | |
| 10,958,629 B2 | 3/2021 | Hybertson | |
| 11,003,802 B2 | 5/2021 | Auh | |
| 11,019,261 B2 | 5/2021 | Chase et al. | |
| 11,023,973 B2 | 6/2021 | Kober et al. | |
| 2003/0078890 A1* | 4/2003 | Schmidt | G06Q 30/02 |
| | | | 705/51 |
| 2003/0131353 A1 | 7/2003 | Blom et al. | |
| 2003/0236892 A1 | 12/2003 | Coulombe | |
| 2004/0101141 A1 | 5/2004 | Alve | |
| 2004/0158741 A1 | 8/2004 | Schneider | |
| 2005/0008163 A1 | 1/2005 | Leser et al. | |
| 2006/0031351 A1 | 2/2006 | Marston et al. | |
| 2006/0161666 A1 | 7/2006 | Cohen | |
| 2006/0176902 A1 | 8/2006 | Bellordre | |
| 2007/0079381 A1 | 4/2007 | Hartung et al. | |
| 2007/0104181 A1 | 5/2007 | Lee et al. | |
| 2007/0204064 A1 | 8/2007 | Mail et al. | |
| 2007/0204078 A1 | 8/2007 | Boccon-Gibod et al. | |
| 2008/0098212 A1* | 4/2008 | Helms | H04N 21/8193 |
| | | | 713/155 |
| 2009/0037388 A1 | 2/2009 | Cooper et al. | |
| 2009/0052863 A1 | 2/2009 | Parmar et al. | |
| 2009/0167531 A1* | 7/2009 | Ferguson | G16H 20/13 |
| | | | 340/572.1 |
| 2011/0071891 A1 | 3/2011 | Gavita et al. | |
| 2011/0072267 A1 | 3/2011 | Johansson | |
| 2012/0066495 A1 | 3/2012 | Hao et al. | |
| 2012/0095749 A1 | 4/2012 | Capretta | |
| 2012/0131120 A1 | 5/2012 | Maghraby | |
| 2012/0240240 A1 | 9/2012 | Naslund et al. | |
| 2012/0303490 A1 | 11/2012 | Hill | |
| 2013/0054965 A1 | 2/2013 | Catrein et al. | |
| 2013/0173378 A1 | 7/2013 | Scholes et al. | |
| 2013/0179949 A1 | 7/2013 | Shapiro | |
| 2013/0227636 A1 | 8/2013 | Bettini et al. | |
| 2013/0227683 A1 | 8/2013 | Bettini et al. | |
| 2013/0347094 A1 | 12/2013 | Bettini et al. | |
| 2014/0040622 A1* | 2/2014 | Kendall | G06F 21/56 |
| | | | 713/171 |
| 2014/0161356 A1 | 6/2014 | Tesch et al. | |
| 2014/0161423 A1 | 6/2014 | Tesch et al. | |
| 2014/0163956 A1 | 6/2014 | Tesch et al. | |
| 2014/0163957 A1 | 6/2014 | Tesch et al. | |
| 2014/0163980 A1 | 6/2014 | Tesch et al. | |
| 2014/0164371 A1 | 6/2014 | Tesch et al. | |
| 2014/0164506 A1 | 6/2014 | Tesch et al. | |
| 2014/0279475 A1 | 9/2014 | Castrechini et al. | |
| 2014/0310527 A1 | 10/2014 | Veugen | |
| 2014/0355955 A1 | 12/2014 | Berger et al. | |
| 2015/0007264 A1 | 1/2015 | Maldaner | |
| 2015/0074715 A1 | 3/2015 | Berger et al. | |
| 2015/0095645 A1 | 4/2015 | Eldar | |
| 2015/0143455 A1 | 5/2015 | Bettini et al. | |
| 2015/0227722 A1 | 8/2015 | Cholas | |
| 2015/0242747 A1 | 8/2015 | Packes et al. | |
| 2015/0269366 A1 | 9/2015 | Bells | |
| 2015/0310188 A1 | 10/2015 | Ford | |
| 2016/0007074 A1 | 1/2016 | Marsh et al. | |
| 2016/0365973 A1* | 12/2016 | van Deventer | H04L 9/14 |
| 2017/0041296 A1 | 2/2017 | Ford | |
| 2017/0099293 A1* | 4/2017 | Tan | G06F 21/40 |
| 2017/0243028 A1 | 8/2017 | Lafever | |
| 2017/0132630 A1 | 11/2017 | Quan et al. | |
| 2017/0374311 A1 | 12/2017 | Trachtenberg et al. | |
| 2018/0114205 A1 | 4/2018 | Thomas et al. | |
| 2019/0035008 A1 | 1/2019 | Venters, III et al. | |
| 2019/0173854 A1 | 6/2019 | Beck | |
| 2019/0213304 A1 | 7/2019 | Webb et al. | |
| 2019/0335133 A1 | 10/2019 | Sharif-Ahmadi et al. | |
| 2019/0387191 A1 | 12/2019 | Sharif-Ahmadi et al. | |
| 2020/0092270 A1 | 3/2020 | Ackerly | |
| 2020/0126594 A1 | 4/2020 | Berger et al. | |
| 2020/0142750 A1* | 5/2020 | Kaplan | G06F 16/94 |
| 2020/0245048 A1 | 7/2020 | Chase et al. | |
| 2020/0266976 A1 | 8/2020 | Roth et al. | |
| 2020/0374113 A1* | 11/2020 | Noam | H04L 9/0847 |

OTHER PUBLICATIONS

Locklizard, Safeguard Enterprise PDF Security Product Manual for Windows, version 5, rev. 1.36, 2018, 265 pages.

Falkaris, Oh Snap, The State of Electronic Discovery . . . , Computer & Internet Lawyer, vol. 33, No. 10, p. 1-17, 2016.

Lea, Does someone know when you save their chat on Snapchat Quora, p. 1-3 Apr. 2019.

Katalov, iMessage Security Encryption and Attach, ElcomSoft Blog p. 1-11 Nov. 2018.

* cited by examiner

DRM Cloud Service Workflow

Rights Application Lifecycle (XrML)
For Messages and Content

Sender POOF App Workflow

Receiver POOF App workflow

Secret Chat - Message and Content Disappears

FIG. 13

POOF App - Text Message+Content Creation Reporting

| Encrypt Chats [X] | Secret Chat [X] | Select Rights [X] | Select Pics [X] | Select Docs [ ] | Select Video [ ] | Select Audio [ ] | Recover history |
|---|---|---|---|---|---|---|---|
| Message ~~~~ ~~~~ ~~~ | Picture ☾ ☺ | Secret chat [x]-copy [x]-save [x]-forward [x] expire 5 minutes | View ~~~~ ~~~~ ☾ ☺ | Encrypt [x]-yes | Notification [x] expire [x] violation [x] revoke | Date xx xx xx | Time Rights xx Y xx N xx Y |

Encrypted SMS Message
With secure DRM Attachments

Inventive
Combination of In-App OTT Msg and DRM Server Link

FIGURE 38

Industry depending on Secure, Private Messaging and Document Sharing

1. BANKING
2. FINANCIAL
3. MEDICAL
4. RETAILER
5. AIRLINE
6. TSA BORDER CONTROL
7. SOCIAL SECURITY
8. LAW ENFORCEMENT
9. MILITARY COMMUNICATIONS
10. INSURANCE

Federal Laws requiring Secure, Private Messaging And Document Sharing a. Telephone Consumer Protection Act (TCPA) 47 USC 227 – regulates SMS Marketing
b. CAN-SPAM Act – protects vs. unwanted spam messages and calls
c. Gramm Leach Bliley Act (GLBA) 15 USC 6802 – protection of personal information by banks, insurance, financial services
d. Fair Credit Reporting Act (FCRA) 15 USC 1681 – protects credit reports, credit card information, credit fraud, comply with Payment Card Industry Data Security Standard (PCI-DSS)
e. Health Information Portability and Accountability Act (HIPAA) 29 USC 1181 – protect health status, information, payment information
f. Family Education Rights and Privacy Act (FERPA) 20 USC 1232 – protects student records
g. Drivers Privacy Protection Act (DPPA) 18 USC 2721 – protects DMV information
h. Children's Online Privacy Protection Act (COPPA) 15 USC 6501 – protects vs. collection of minor's information
i. Video Privacy Protection Act (VPPA) 18 USC 2710 – protects vs. online theft
j. Cable Communications Policy Act (CCPA) 47 USC 551 – protect subscriber privacy
k. California Consumer Privacy Act (CCPA) – protects personal information
l. Computer Fraud and Abuse Act (CFAA) 18 USC 1030 – prohibits unauthorized computer use
m. Electronic Communications Privacy Act (ECPA) 18 USC 2510 – prohibits intercepted communications
n. Sarbanes-Oxley (SOX) 15 USC 98
o. Defense Federal Acquisition Regulation (DFAR) 48 CFR 252

FIGURE 39

| Federal Laws requiring Secure, Private Messaging And Document Sharing | DRM Permissions on Messaging And Document Sharing |
|---|---|
| Telephone Consumer Protection Act (TCPA) 47 USC 227 – regulates SMS Marketing<br>CAN-SPAM Act – protects vs. unwanted spam messages and calls<br>Gramm Leach Bliley Act (GLBA) 15 USC 6802 – protection of personal information by banks, insurance, financial services<br>Fair Credit Reporting Act (FCRA) 15 USC 1681 – protects credit reports, credit card information, credit fraud, comply with Payment Card Industry Data Security Standard (PCI-DSS)<br>Health Information Portability and Accountability Act (HIPAA) 29 USC 1181 – protect health status, information, payment information<br>Family Education Rights and Privacy Act (FERPA) 20 USC 1232 – protects student records<br>Drivers Privacy Protection Act (DPPA) 18 USC 2721 – protects DMV information<br>Children's Online Privacy Protection Act (COPPA) 15 USC 6501 – protects vs. collection of minor's information<br>Video Privacy Protection Act (VPPA) 18 USC 2710 – protects vs. online theft<br>Cable Communications Policy Act (CCPA) 47 USC 551 – protect subscriber privacy<br>California Consumer Privacy Act (CCPA) – protects personal information<br>Computer Fraud and Abuse Act (CFAA) 18 USC 1030 – prohibits unauthorized computer use<br>Electronic Communications Privacy Act (ECPA) 18 USC 2510 – prohibits intercepted communications<br>Sarbane-Oxley<br>Defense Federal Acquisition Regulation | (TCPA) compliant – restricts SMS Marketing<br>CAN-SPAM Act compliant – restricts spam<br>(GLBA) compliant – restricts personal financials<br>(FCRA) compliant – protects credit reports, credit card information, (PCI-DSS)<br><br>(HIPAA) compliant – protects health status, information, payment information<br><br>(FERPA) compliant – protects student records<br>(DPPA) compliant – protects DMV information<br><br>(COPPA) compliant – protects vs. collection of minor's information<br>(VPPA) compliant compliant – protects vs. online theft<br>(CCPA) compliant – protect subscriber privacy<br>(CCPA) compliant – protects personal information<br>(CFAA) compliant – prohibits unauthorized computer use<br>(ECPA) compliant – prohibits intercepted communications<br>SOX compliant<br>DFAR compliant |

Screen Capture Disablement for Android/iOS Mobile

FIG. 43

POOF App - Text Message and Content Creation Reporting

| Disable Screen Capture | Encrypt Chats | Secret Chat | Select Rights | Select Photos | Select Docs | Select VideoAudio | Select history | Recover |
|---|---|---|---|---|---|---|---|---|
| [X] | [X] | [X] | [X] | [X] | [ ] | [ ] | [ ] | [ ] |

| Message | Photo | Secret Chat | View | Encrypt | Notification | Date | Time | Rights |
|---|---|---|---|---|---|---|---|---|
| —— —— | 🙂 | [x]-copy [x]-save [x]-forward [x]-expire 5 minutes | —— 🙂 | [x]-yes | [x] expire [x] violation [x] revoke | xx xx xx | xx xx xx | Y N Y |

SECURE MESSAGING SERVICE WITH DIGITAL RIGHTS MANAGEMENT USING BLOCKCHAIN TECHNOLOGY

PRIOR FILED APPLICATIONS

This application is a continuation-in-part and claims priority to U.S. patent application Ser. No. 16/845,082 entitled "A Secure Mobile Text Message and Object Sharing Application, System, and Method for Same" filed Apr. 10, 2020, the contents of which are incorporated herein in their entirety.

BACKGROUND

The embodiments described herein relate generally to a secure messaging mobile telephone application, and in particular a secure messaging mobile telephone application having digital rights management integrated into a blockchain network having a distributed database, identity and cryptographic features, and optionally integrated with a distributed storage marketplace having storage, smart contracts, and payment technology.

Mobile telephone applications use messaging applications for sending SMS text messages across a peer to peer cellular telephone network. A well-known problem with such messages is the lack of security and the lack of sender control over what happens to a text message or a text message attachment after it has been sent. Most SMS apps do not allow attachments to be integrated into the body of the text message as a link (Word, PDF, pics), and do not provide integration with document storage services, such as Dropbox and OneDrive.

Some 3rd party mobile telephone applications, such as WhatsApp and Signal, have attempted to provide a more secure messaging environment by offering an encrypted messaging service which encrypts the text message in transit. The text messages and attachments are not encrypted at rest or protected in use with encryption and Rights (controls) on the use of the content by the recipient such as forwarding, copying, expirations, revocation and printing.

Accordingly, a need exists for a secure messaging mobile telephone application having digital rights management integrated into a blockchain network having a distributed database, identity and cryptographic features, and optionally integrated with a distributed storage marketplace having storage, smart contracts, and payment technology.

SUMMARY

The embodiments described herein are directed to a secure text messaging and object sharing mobile or desktop application connected to a DRM Cloud Service, that provides encryption, digital rights management (DRM) of the text and of the attachments, blockchain transactions, the capability of rendering links to such electronic messaging objects, e.g. messages, document, photos, video, audio files, and the ability to revoke access to the electronic messaging objects when a DRM violation occurs.

In some embodiments, the application is able to interface with a user's contacts application, and operate in both Android and iOS environments. The secure text messaging and object sharing application connects to DRM cloud service to locate an attachment, assign DRM permissions to either the text message, the attachment, or both (the electronic messaging objects), store the DRM-modified electronic messaging object, and transmit an HTML link from a Sender to a Receiver.

The embodiments described herein are also directed to a system for secure text messaging and object sharing that comprises a secure DRM mobile text app, and a secure DRM cloud service.

The embodiments described herein are also directed to methods related to the secure text messaging and object sharing mobile application and system, including methods for connecting two mobile apps via the internet, methods for protecting a text message attachment, methods for providing a DRM server dedicated to the secure text messaging and object sharing mobile applications, methods of selecting DRM rights and restrictions from a menu of DRM rights and restrictions, methods of selecting encryption from a menu of encryption choices, methods of providing sender monitoring of compliance by the recipient or receiver of the text of the DRM protected text messages and attachments, methods of sending a warning to a recipient concerning the DRM compliance, methods of revoking DRM rights by the sender, methods of removing a DRM protected and encrypted text message or attachment from a conversation with the receiver, and so forth.

BRIEF DESCRIPTION OF THE DRAWINGS

FIG. 13 is a schematic diagram of a camera disablement feature for Android and iOS, according to an embodiment.

FIG. 38 is a diagram illustrating industries that depend on secure, private message and document sharing in relation to the compliance requirements of federal laws that require secure, private messaging and document sharing, according to an embodiment of the invention.

FIG. 39 is a diagram illustrating the compliance requirements of federal laws that require secure, private messaging and document sharing in relation to the DRM permissions available from the inventive subject matter on messaging and document sharing available to achieve compliance with those laws, according to an embodiment of the invention.

FIG. 43 is a schematic diagram illustrating the Text Message and Content Creation Reporting function of the Application.

DETAILED DESCRIPTION

Figure 1:
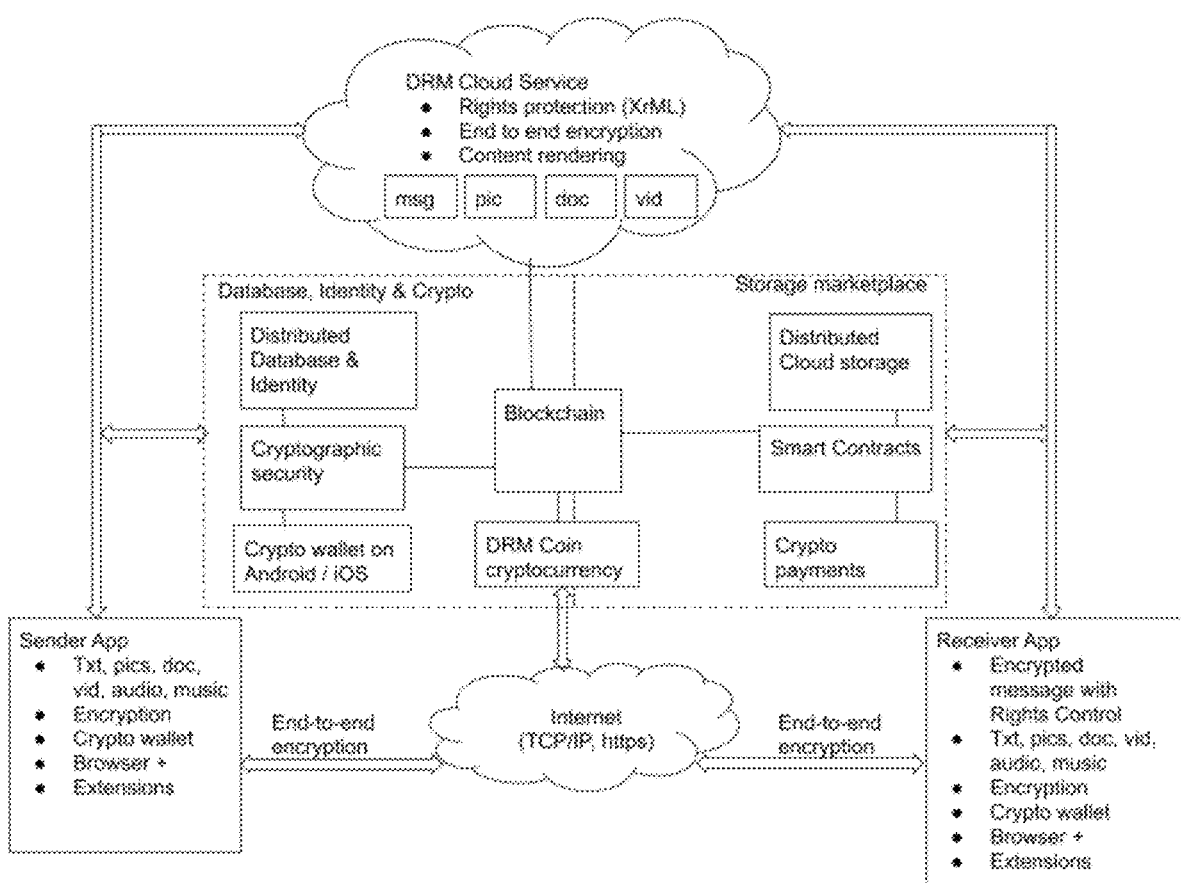
FIG. 1 is a schematic diagram of a system for secure text messaging and object sharing having mobile devices in communication with a DRM server to establish a link for a shared text message and text message attachment, that is then stored and shared using blockchain technology via encrypted network connections, according to an embodiment.

Disclosed embodiments are directed to a secure text messaging and object sharing mobile application, that provides encryption, digital rights management (DRM) of the text and of the attachments, the capability of sending SMS, RCS, MMS, IM or blockchain communications, the capability of attaching documents, photos and so forth, the capability of interfacing with a user's contacts application, and that operates in both Android and iOS environments. The secure text messaging and object sharing mobile application connects to DRM cloud service, and also connects to a plurality of networked users thru their mobile app.

The embodiments described herein are also directed to a system for secure text messaging and object sharing that comprises a secure DRM mobile text app, and a secure DRM cloud service.

Method

In some embodiments, the invention comprises a method, comprising:

Assigning a digital rights management (DRM) restriction to an electronic messaging object associated with a first user to generate a DRM-modified electronic messaging object (DRM-MEMO), the electronic messaging object selected from a text message, a document, a photo, a video file, and an audio file, the DRM restriction selected by the first user from a DRM menu in a DRM Messaging application installed on a first user computing device, the DRM restriction selected from copy, save, print, forward, expire, revoke upon violation, disappear, edit, and modify, the electronic messaging object saved to memory associated with the first user computing device, the first user computing device in encrypted communication with a DRM Cloud Server, Server-side rendering the DRM-modified electronic messaging object on the DRM Cloud Server to produce an HTML file of the DRM-modified electronic messaging object, the HTML file saved to a storage location associated with the first user, Transmitting a URL link of the HTML file in an encrypted electronic message to a second user computing device of a second user, the second user computing device in encrypted communication with the DRM Cloud Server, the second user computing device having the DRM Messaging application installed, the URL link displayed within a message module of the DRM Messaging application of the second user computing device, Requesting the HTML file of the DRM-modified electronic messaging object from the DRM Cloud Server in response to the second user clicking the URL link, Displaying in a browser associated with the DRM Messaging application of the second user computing device the HTML file of the DRM-modified electronic messaging object, and Enforcing the DRM restriction of the electronic messaging object by monitoring the second user computing device and disabling the URL link to the HTML file when a DRM restriction is violated, wherein the DRM Messaging application and the DRM Cloud Server have programming instructions saved to memory and executable on a processor to perform the method steps.

Computer-implemented System

In some embodiments, the invention comprises a computer-implemented system for secure text messaging and object sharing, comprising:

a first user computing device having program instructions saved to memory and executable by a processor for running a DRM Messaging application configured to assign a digital rights management (DRM) restriction to an electronic messaging object associated with a first user to generate a DRM-modified electronic messaging object (DRM-MEMO), the electronic messaging object selected from a text message, a document, a photo, a video file, and an audio file, the DRM restriction selected by the first user from a DRM menu in a mobile application installed on a first user computing device, the DRM restriction selected from copy, save, print, forward, expire, revoke upon violation, disappear, edit, and modify, the electronic messaging object saved to memory associated with the first user computing device, the first user computing device in encrypted communication with a DRM Cloud Server, a second user computing device having program instructions saved to memory and executable on a processor for running a DRM Messaging application, a DRM Cloud Server having program instructions saved to memory and executable by a processor for providing a DRM Cloud Service configured to perform server-side rendering of the DRM-modified electronic messaging object on the DRM Cloud Server to produce an HTML file of the DRM-modified electronic messaging object, the HTML file saved to a storage location associated with the first user, transmit a URL link of the HTML file in an encrypted electronic message to the second user computing device of a second user, the second user computing device in encrypted communication with the DRM Cloud Server, the URL link displayed within a message module of the DRM Messaging application of the second user computing device, request the HTML file of the DRM-modified electronic messaging object from the DRM Cloud Server in response to the second user clicking the URL link, display in a browser associated with the DRM Messaging application of the second user computing device the HTML file of the DRM-modified electronic messaging object, and enforce the DRM restriction of the electronic messaging object by monitoring the second user computing device and disabling the URL link to the HTML file when a DRM restriction is violated.

Computer-implemented Mobile App System

In some embodiments, the invention provides a computer-implemented system, comprising:

a DRM Mobile Messaging App saved to memory of a first mobile communication device having program instructions executable on a processor configured to effect, by the first mobile communication device in encrypted communication with a DRM Cloud Server, assignment of DRM permissions on an electronic messaging object, to generate a DRM restricted electronic messaging object, said DRM Mobile Messaging App configured to send, by a TCP-IP communication module, the DRM restricted electronic messaging object, encrypted in transit from the first mobile communication device to the DRM Cloud Server, said DRM Cloud Server configured to render, by a DRM rendering module, an HTML file of the DRM restricted electronic messaging object sent to the DRM Cloud Server, the HTML file stored in memory associated with the DRM Cloud Server and having a URL link associated therewith, said DRM Cloud Server configured to forward, by the TCP-IP link messaging module, the URL link, encrypted in transit, to a second mobile communication device having program instructions saved thereon and executable on a processor for the DRM Mobile Messaging App, said DRM Mobile Text App having a browser associated therewith to request access to the HTML file, and said DRM Mobile Messaging App configured to process, by a DRM Enforcement module, DRM permissions on the HTML file, said DRM Mobile Messaging App configured to send an Alert, encrypted in transit, by the DRM Enforcement module, to the DRM Cloud Server when a DRM permissions violation is detected, and said DRM Cloud Server forwarding the Alert, encrypted in transit, by the TCP-IP communication module, to the DRM Mobile Messaging App of the first mobile communication device that assigned DRM permissions, said DRM Cloud Server configured to send an enforcement command to the second mobile communication device, encrypted in transit, by the DRM Enforcement module, wherein the DRM Cloud Server is configured to enforce DRM permissions to disable access by the second mobile communication device to the URL link.

Method of Assigning DRM

In some embodiments, the invention provides a method of assigning DRM permissions from a menu of DRM permissions in the system described herein, comprising the steps:

STEP 1: generating in said DRM Mobile Messaging App of the first mobile communication device an electronic messaging object;

STEP 2: transmitting the electronic messaging object, encrypted in transit, to the DRM Cloud Server along with a selection of DRM permissions;

STEP 3: assigning, in the DRM permissions module of said DRM Cloud Server, a DRM restriction on the electronic messaging object sent to the DRM Cloud Server;

STEP 4: saving the DRM restricted electronic messaging object in storage on the DRM Cloud Server;

STEP 5: rendering, by a DRM Rendering module, an HTML link to the DRM restricted electronic messaging object; and STEP 6: forwarding the HTML link, encrypted in transit, to the DRM Mobile Messaging App of the second mobile communication device.

Method of Enforcing DRM

In some embodiments, the invention provides a method of enforcing DRM permissions in the system described herein, comprising the steps:

STEP 1: processing, by the DRM Enforcement module, DRM permissions on the HTML link transmitted to the second mobile communication device;

STEP 2: sending an Alert, by the DRM Enforcement module of the DRM Mobile Messaging App, encrypted in transit, to the DRM Cloud Server when a DRM permissions violation is detected;

STEP 3: forwarding the Alert, by the TCP-IP communication module of said DRM Cloud Server, encrypted in transit, to a DRM Mobile Messaging App that assigned DRM permissions;

STEP 4: sending an enforcement command by the DRM Enforcement module of said DRM Mobile Messaging App, encrypted in transit, to the DRM Cloud Server;

STEP 5: enforcing DRM permissions, by disabling the URL link to the HTML file. Dependent claims Any of the methods and systems described herein can use encryption that is split-key encryption.

Any of the methods and systems described herein can provide wherein the DRM restriction is assigned to the electronic messaging object using XrML to insert a restrictive header into metadata of the electronic messaging object.

Any of the methods and systems described herein can provide wherein the DRM Cloud Server stores the DRM-modified electronic messaging object on a decentralized cloud platform having a blockchain network auditing module and blockchain identity and security module.

Any of the methods and systems described herein can provide wherein the DRM Cloud Server has a blockchain crypto payments module.

Any of the methods and systems described herein can provide wherein the DRM Menu item for expire provides an timed expire option to disable the URL link to the HTML file after a period selected from the ranges of 1-30 days, 1-24 hours, and 1-60 minutes.

Any of the methods and systems described herein can provide wherein the first user computing device and the second user computing device are each a mobile telephone, and wherein the DRM Messaging application is configured as a mobile telephone application.

Any of the methods and systems described herein can provide wherein the DRM-restricted electronic messaging object is a specific file type with a specific DRM permission, selected from the group consisting of: a marketing file and a (TCPA) compliant DRM used to restrict SMS Marketing, a commercial message and a CAN-SPAM Act compliant DRM used to restrict spam, a financial record and a (GLBA) compliant DRM used to restrict access and abuse of personal financial information, a credit record and a (FCRA) compliant DRM used to protect credit reports, credit card information, (PCI-DSS), a health record and a (HIPAA) compliant DRM used to protect health status, information, payment information, a student record and a (FERPA) compliant DRM used to protect student records, a DMV record and a (DPPA) compliant DRM used to protect DMV information, a child's information and a (COPPA) compliant DRM used to protect against collection of a child's personal information, an online transaction file and a (VPPA) compliant DRM used to protect against online theft, a subscriber record and a (CCPA) compliant DRM used to protect subscriber privacy, a personal information file and a (CCPA) compliant DRM used to protect personal information, a file stored on a computer and a (CFAA) compliant DRM used to prohibit unauthorized computer use, a communication file and an (ECPA) compliant DRM used to prohibit intercepted communications, an identification file and a SOX compliant DRM used to enforce protection of cybersecurity credentials, and a DoD or DFAR related file and a DFAR compliant DRM used to protect unauthorized dissemination of DoD information.

Any of the methods and systems described herein can provide wherein the encryption is standard 256-bit AES encryption or is split-key encryption.

Any of the methods and systems described herein can provide wherein the DRM Mobile Messaging App is configured to interface with a Contacts App on the first mobile communication device.

Any of the methods and systems described herein can provide wherein the encryption is split-key encryption, and wherein the DRM restriction is assigned to the electronic messaging object using XrML to insert a restrictive header into metadata of the electronic messaging object.

Any of the methods and systems described herein can provide wherein the DRM Cloud Server stores the DRM-modified electronic messaging object on a decentralized cloud platform having a blockchain network auditing module and blockchain identity and security module, and wherein the DRM Cloud Server has a blockchain crypto payments module.

Any of the systems or devices described herein can use an Android operating system or an iOS operating system.

Any of the systems or devices described herein can provide wherein the first mobile communication having a DRM mobile text app is configured to connect to DRM cloud service and to connect to a second mobile communication device having a second DRM mobile text app thru a network, wherein the network is selected from the internet, an SMS network, an RCS network, an MMS network, IM, or a Blockchain-mediated network.

Any of the embodiments of the DRM Server and Mobile application invention described herein may comprise wherein the linkable file is a Block Chain transaction.

Definitions

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

The term "text" or "text message" or SMS refers, by way of illustration and without limitation, to the Short Messaging Service, which is a protocol used for sending messages over wireless networks. SMS allows for messages of 160 characters in length. The SMS file is a protocol description unit (PDU) that contains multiple subcomponents of information, including length of Short Message Center (SMC), type of SMC, a delivery code, length of address, type of sender address, sender number, protocol ID, data encoding scheme, time stamp, SMS length, and SMS message. As used herein the DRM permissions may be rendered within the PDU. In one embodiment, the DRM permissions can be rendered within the SMS message portion itself.

MMS refers to multimedia messaging service and is a way to send multimedia, video, photos, audio, between capable mobile devices.

Digital Rights Management

The term "DRM" or Digital Rights management" refers, by way of illustration only and without limitation to technologies used for the protection of digital content, typically photos, documents, audio files, audiovisual files, and other objects that can be stored on a computer and transmitted electronically. As used herein, DRM refers to permission or restrictions placed within a header or made part of a file, especially a text message or a file attachment to a text message. The DRM restrictions can be made to a single device, can limit the number of time a text or an attachment is opened, can restrict viewing, printing, editing, copying, pasting, saving, saving as, sharing, macro execution, adding watermarks, adding other links, adding-deleting-or-modifying identifying information such as IP, network name, user, organization, or security clearance level ("DRM actions"), including restricting or permitting DRM actions by item, by date/time, by policy, by person, by clearance, etc.

Typically, DRM works by encrypting the content before distribution, and by limiting access to only those end-users who have acquired a proper license to play or render (display) the content. An end-to-end DRM system typically comprises three (3) parts: encryption, business-logic and license-delivery. DRM starts with the encryption of the content. Once the content is encrypted, a key is required to unlock the content. The encrypted content can be delivered through any number of delivery methods. An end-user who desires to play or render the content visits an e-commerce web site and transacts with the business-logic process, usually involving one of registration, login, and/or payment;

once this is done, the end-user is issued a license to play the content. The issued license typically comprises (i) a key (for decrypting the content), (ii) a set of rights (e.g. play or render exactly once, play for 30 days, render, or the like), and (iii) with the property that the license is valid only on the end-user machine to which it is issued. When an end-user attempts to play or render the DRM protected content, an end user player/client application enforces the DRM.

XrML

The term "XrML" refers to extensible rights markup language, and refers to the use of extensible markup language (XML) to establish rights, fees and conditions together with message integrity and entity authentication information. XrML is designed for machine-to-machine interaction, with rights expressed as machine actionable functions. XrML also requires that in interpreting expression of rights, only those rights that are explicitly granted can be acted upon. Any areas where a rights expression is silent must be interpreted as rights not granted, and therefore must be denied by the software enforcing the rights. XrML may also include metadata for adding unique identifiers, including the use of private and public keys, and mechanisms for identifying and verifying the authenticity of the issuer and the user of the resource. XrML may also include certification for hardware and software that is part of a trusted environment. XrML may also include a variation using abstract rights language with only a few core elements, rather than the machine actionable functions required. The core elements of such an XrML variant are only those needed to establish trust between systems so that transactions can take place, including the issuer of the license, the parties to the license, and the ability to include resources and rights, digital signatures, etc. This XrML variant does not require specifying any specific medium or type of resource, and is generalized to control rights on digital resources, services, and entities.

In one embodiment, XrML refers to the addition of metadata restrictions in the header of a file to provide for restricting access, editing, modification, and so forth of the file. Such files may be documents, photos, video files, audio files, text messages, and so forth. Original files having such metadata inserted into the header may be known as DRM-restricted electronic messaging objects.

DRM Cloud Service

The term "DRM Cloud Service" refers to a cloud-based computer system that provides encryption, Digital Rights Management (DRM), and the Sender Alert and Revoke function. Encryption can include any standard encryption, or can also include split-key encryption. The DRM of the DRM Cloud Service includes the capability to apply permissions (rights) to control the viewing of text messages and attachments on the mobile app. DRM restrictions can include any function including copy, paste, save, save as, print, forward, expiration, and revocation. The sender alert and revoke, or "Poof" function provides an automatic notification to the sender (sender side reporting) of recipient attempted or actual violation of DRM permissions (rights). The alert and revoke function includes denying or blocking access to text messages and/or attachments on the recipient mobile app by expiring the content (or blocking the encrypted keys). The recipient will experience the revoked SMS or object as an instantaneous disappearance, or "poof", of the text message or attachment to which the recipient previously had access.

By way of illustration, a DRM Cloud Server or DRM Cloud Service can be a server database with Amazon Web Services (AWS) that captures all DRM-related transactions from the "Poof" mobile apps. These transactions can includes the ability to protect, consume, unprotect, log failed consume, revoke (Poof), modify, print, and failed print.

In some embodiments, the data is collected by user, by mobile device, by content, and by policy. This can provide administrators with the ability to know what data or content is protected, where, by who, provides easy access to documents, and DRM interaction history, and provide an easy view of where the DRM content is, on which device.

In any of these embodiments, the mobile apps are designed for measuring, auditing, tracking, and providing analytics of data sharing and data content.

In any of the embodiments herein, the DRM Cloud Service can be for individual use, or by enterprises by implementing corporate policy assignments.

Any of the DRM Cloud Service embodiments can have an Administrative interface to provide a comprehensive directory that provides the ability to oversee and control enterprise/SMB POOF customers, with both internal and external users.

Any of the DRM Cloud Service embodiments here include content policy options where administrators can create policies such as rules, templates and water marks for internal and external users.

Any of the DRM Cloud Service embodiments herein include user directory management where a user-friendly directory can organize internal and external users.

Any of the DRM Cloud Service embodiments herein can include rule creation to provide the ability to create rules so specific words, patterns, and phrases in the SMS text messages can triggers automatics content policy protection without a user's intervention. This can also provide user or system Alerts and Alert creation, along with Administrative and client-level reporting, documents revocation (Poof), and allow/block lists.

Mobile App

The term "Mobile App" or "secure DRM mobile text app" etc. refers to a downloadable mobile application, e.g. downloadable from the iOS or Android app store, that provides encryption of text messages (SMS) and text attachments, where the attachments are links to docs, pics, video, and other objects that are uploaded from the Sender device and stored on the DRM Server, in the DRM Cloud Service. The mobile app applies permissions (DRM rights) to encrypted SMS and attachments. The mobile app also provides the automatic notification (ALERT) to the sender when a recipient attempts to perform a function on the text message or attachment that is outside of the DRM rights assigned for that text message or attachment. The mobile app can then provide the Sender with the opportunity to send an optional Warning of DRM violation to the recipient. The mobile app also provides the Sender with the capability to update or modify the DRM permissions for the SMS text or attachment, including the ability to deny or block access to the SMS text or attachment for the recipient.

Any of the Mobile App embodiments herein may include operations to enable protection, consumption, and editing of documents, PDF, pics, on both Android and iOS devices.

Any of the Mobile App embodiments herein may include download procedures from the Apple store or the Google Play Store or from a website.

Any of the Mobile App embodiments herein may include where the Apps retrieve encryption keys for decrypting documents and text messages, including enforcement of usage rights.

Any of the Mobile App embodiments herein may include Workflow descriptions, and where a user receives an SMS text message in the Poof app, and where attachments (Word, ppt, pdf) and pictures (jpeg, etc.), videos, and audio are inserted in the text message as a link. Recipients can click on the SMS message to open the text link, and the encrypted text message and file attachment links, if any, are decrypted through a request made to the DRM Cloud Service.

Any of the Mobile App embodiments herein may allow for the consumption/viewing of the SMS text message and of the file attachment available through the link.

Any of the Mobile App embodiments herein may include composing, reply, reply all, forwarding of documents, and pictures.

Any of the Mobile App embodiments herein may include specific download rights, and may include user templates.

Any of the Mobile App embodiments herein may include support to import, export objects to cloud applications including Dropbox, SharePoint, OneDrive, Google Drive, Facebook, and Instagram.

Server-Side Rendering

The term "Server-side rendering", or SSR, is the ability of an application to display the webpage on the server instead of rendering it in the browser. Server-side rendering (SSR) sends a fully rendered page to a client-device. In one embodiment, the SSR uses static rendering to send a fully rendered HTML to a recipient browser. In another embodiment, the SSR uses dynamic rendering to produce HTML on-demand for each URL link. In a preferred embodiment, the DRM Server dynamically selects the type of SSR depending on the type of messaging content being delivered. In a preferred embodiment, the client-device is a Recipient in the DRM Messaging System. In some embodiments, the recipient is a mobile device having the POOF App installed thereon and the recipient is a POOF subscriber. The client-device's JavaScript bundle takes over to show a browser view of the DRM-modified electronic messaging object to the recipient. In some embodiments, the JS bundle allows a Single Page Application (SPA) framework to operate to facilitate display of the browser view on the recipient device. With an SSR, when a web link is clicked and a web page is visited, the client-device's browser submits a request to the server. In a preferred embodiment, the request is made when the recipient clicks the link to the DRM-modified electronic messaging object that was received in an encrypted communication from the Sender, another POOF subscriber. The webpage is located or associated with the DRM Server. In some embodiments, the web link to the webpage may be located in a secondary storage location. The client-device webpage request contains the contents of the webpage by the DRM Server. Once the webpage request is done processing, a fully rendered HTML is delivered to the client-device e.g. recipient's browser. In some embodiments, the request process uses React or another JS framework to enable dynamic routing with AJAX and fetches only necessary data, speeding rendering times.

In another non-limiting embodiment where a Single Page Application is used, the SPA functions as a type of web application that operates entirely from one page, usually with an "infinite scroll" user interface. Such SPAs do not require the entire page to reload when the end-user clicks or scrolls on a page element to fetch new data or to execute an action. SPAs may be built with Javascript and can be developed on a multitude of frameworks including Angular, Vue, and React. SPAs are accessed through a web browser just like other websites, but can provide the ability to deliver dynamic user experiences at a faster speeds.

The term "Network" refers to any combination of a computing network used for text messaging, with a DRM client-server cloud service which applies and manages message encryption and the application of DRM permissions to the text messages and/or attachments.

Email to Text Messaging Conversion software refers to downloadable software for PCs, tablets, and handheld communication devices, that converts standard emails in Outlook, Gmail, Yahoo mail, etc. and their attachments (docs, pdf, pics, video) to text messages (SMS) and attachment links embedded in the text messages. In some embodiments, Enterprises can install an SMS Gateway API into email applications.

Document Storage Service refers to an API integration of the present invention into cloud based document storage services including Dropbox, Box, OneDrive, Google Drive, etc. to retrieve documents and other objects stored in the cloud.

Social Media Service refers to an API integration with social media services for pictures and videos including Facebook, Instagram, Twitter, and so forth.

Registration

The term "registration" or "connecting to the DRM server" includes, without limitation, the process whereby a registration module uses a gateway to input a secure identification provided by a gateway administrator; input a short code, a long code, or a phone number (for example, a number associated with a cellular modem) to facilitate routing of one or more messages. Furthermore, registration may comprise exchanging encryption keys between a mobile device and a gateway. For example, a server public key may be utilized to securely send the encryption key of module to a mobile device. Registration uses a default server public key, a unique public key, a short code, and a unique secure identification code. In this manner, a module is able to contact gateway to register. This module encrypts the unique secure identification code and the newly generated public key with the default server public key and sends the result in an SMS message to the short code. The Gateway decrypts the SMS message using a default server private key. The Gateway verifies the unique secure identification code and the phone number associated with module. If the result is not verified, an error message is returned to module. If the result is verified, the gateway transmits a new server public key to module. The Gateway then creates a unique AES key and sends this key, together with registration information, to the module via a registration message encrypted with the module public key. This module decrypts the registration message using the private key. The Module then transmits a registration acknowledgement message, encrypted with a unique AES key associated with module, to the Gateway. Upon receipt of the registration acknowledgement message at the Gateway, the module is registered with the Gateway.

Encryption

Encryption as used herein refers to any standard encryption technique for encrypting and decrypting SMS text messages, encrypting and decrypting attachments that are uploaded from the Sender to the DRM Server, encrypting and decrypting SMS text messages that contain a link to the attachment(s) stored on the DRM Server, encrypting and decrypting any alerts or notifications between a sender and a recipient or a user and a DRM server.

In some embodiments, split key encryption is preferred. In an embodiment, the invention can deploy multiple encryption keys designed to prevent quantum computing attacks on text messages and attachments in transit or at rest. Split key encryption is a preferred significant advance over standard 256 bit key based encryption.

Split-key Encryption

The term "split key encryption" as defined herein includes cryptographic bit splitting or cryptographic data splitting, is a technique for securing data over a computer network. The technique involves encrypting data, splitting the encrypted data into smaller data units, distributing those smaller units to different storage locations, and then further encrypting the data at its new location. With this process, the data is protected from security breaches, because even if an intruder is able to retrieve and decrypt one data unit, the information would be useless unless it can be combined with decrypted data units from the other locations. Cryptographic splitting utilizes a combination of different algorithms to provide the data protection. A block of data is first encrypted using the AES-256 government encryption standard. The encrypted bits are then split into different shares and then each share is hashed using the National Security Agency's SHA-256 algorithm.

One application of cryptographic splitting is to provide security for cloud computing. The encrypted data subsets can be stored on different clouds, with the information required to restore the data being held on a private cloud for additional security. Security vendor Security First Corp uses this technology for its Secure Parser Extended (SPx) product line.

Cryptographic splitting can be used with storage area networks. By splitting the data into different parts of the storage area network, this technique provided data redundancy in addition to security.

Cryptographic splitting has also been written about in the context of more effectively using sensitive corporate information, by entrusting different individuals within a company (trustees) with different parts of the information.

Encryption entails encrypting data with one key and decrypting with the other key in a public private key pair. When asymmetric key pairs are generated, the public key is typically used to encrypt and the private key is used to decrypt.

In cryptography, secret sharing refers to any methods for distributing a secret among participant(s), each of which allocates a share of the secret. The secret can only be reconstructed when the shares are combined together; individual shares are of no use on their own.

The embodiments herein, and/or the various features or advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Rather, these embodiments are provided so that this disclosure will be thorough and complete, and will fully convey the scope of the inventive concepts to those skilled in the art. Like numbers refer to like elements throughout.

Figures

Referring now to the FIGURES, FIG. 1 is a schematic diagram of a system for secure text messaging and object sharing having mobile devices in communication with a DRM server to establish a link for a shared text message and text message attachment, that is then stored and shared using blockchain technology via encrypted network connections, according to an embodiment.

FIG. 1 shows a DRM Cloud Service providing Rights protection, end to end encryption, and content rendering. Rights protection uses an XrML protocol whereby an original document is modified with a security header (meta-data) to generate a modified document. Other Rights Expression Language protocol are within the scope of the invention in some embodiment. An REL is a machine-processable language used to express intellectual property rights and other terms and conditions for use over content. RELs can be used as standalone expressions (i.e. metadata usable for search, compatibility tracking) or within a DRM system. RELs are expressible in a machine-language (such as XML, RDF, RDF Schema, and JSON). Although RELs may be processed directly, they can also be encountered when embedded as metadata within other documents, such as eBooks, image, audio or video files. In one embodiment, Rights Protection may be defined by Attributes or Properties, or aspects of each of the content being protected. Such attributes may include constraints, permissions, prohibitions, and requirements/obligations (or duties).

End-to-end encryption is a method of secure communication that prevents third-parties from accessing data while it's transferred from one end system or device to another. In E2EE, the data is encrypted on the sender's system or device and only the recipient is able to decrypt it.

Content Rendering is the process whereby a Cloud stored item is used to generate a display version of the Cloud-item that can be accessed using browser technology. Browsers require HTML to display page content. Server-side rendering and client-side rendering are two ways a browser can get rendered HTML content for a page. Server-side rendering may be provided through JavaScript and PHP server implementations. The server provides resolvers that return HTML content as a response to a request. Resolvers may allow a user to use the contents of a static file in the response body. For example, a pre-built static HTML file for messages, pictures, videos, documents may be set up so that content is mapped directly to a URL using a resolver. This is the fastest way to deliver a server-side rendered HTML response to a request. In another embodiment, templates may be used to create a server-side rendered response. Templates can provide more flexibility than pre-built static HTML files because they use template variables to create the final HTML response.

In one embodiment, the DRM Server receives the request and checks to see if it is a valid request. If the request is for a document (or photo, message, video, or audio) file, the DRM server returns a pre-built, server-side rendered HTML response. An http link to this response is provided to the Receiver's device. When a receiver clicks on a link, the browser loads the application, and a program, e.g. JavaScript bundle, renders the rest of the page content on the Receiver side using components. These components may make additional calls to the DRM server to get the data they need to finish rendering.

FIG. 1 also shows a schematic of a SENDER App and a RECEIVER App. Both the Sender App and the Receiver App include programming instructions for managing content (txt msg, pics, docs, video, audio, music, etc.), implementing and enforcing encryption (at-rest, in-transit), managing a crypto wallet, managing a browser, and managing browser extensions or APIs.

FIG. 1 also shows a schematic of blockchain being used for data, identity & crypto functions, as well as for storage and storage marketplace functions. The database, identity and crypto functions includes modules having programming instructions for distributed and database identity, cryptographic security, and a crypto wallet usable in mobile operating systems and platforms. The storage and storage marketplace functions include modules having programming instructions for distributed Cloud storage, Smart Contracts, and Crypto payments.

FIG. 1 also shows a schematic of an embodiment using Coin Cryptocurrency which functions to facilitate payments for services provided within the DRM Cloud Service system.

Figure 2:
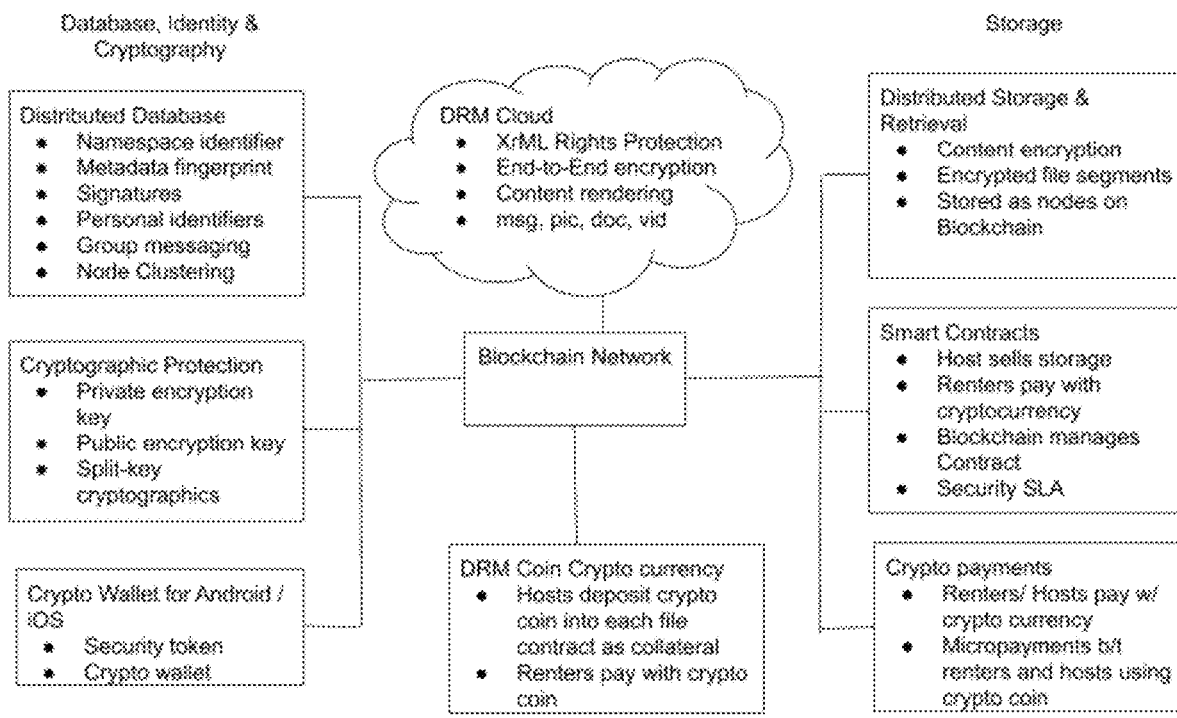
FIG. 2 is a schematic diagram of a decentralized database, identity, cryptography and storage using blockchain, according to an embodiment.

FIG. 2 is a schematic diagram of a decentralized database, identity, cryptography and storage using blockchain, according to an embodiment. FIG. 2 shows a blockchain embodiment having a DRM Cloud connecting to a network having modules with programming instructions executable on a processor to provide a database, identity and cryptography function with a storage function.

FIG. 2 shows the DRM Cloud programmed to provide XrML Rights Protection, End-to-End encryption, and Content rendering of items, such as text messages (msg), photos (pic), documents and related images (doc), video files, audio files, and so forth.

FIG. 2 illustrates how the database, identity & cryptography functions are provided by a distributed database module, a cryptographic protection module, and a crypto wallet module. The Distributed Database module includes programming for a Namespace identifier, Metadata fingerprint, Signatures, Personal identifiers, Group messaging, and Node Clustering. The Cryptographic Protection module includes programming for a Private encryption key, Public encryption key, and Split-key cryptographics. The Crypto Wallet module for Android/iOS includes programming for a Security token and Crypto wallet.

FIG. 2 illustrates how the storage function is provides by a distributed storage and retrieval module, a Smart Contracts module, and a Crypto payments module. The Distributed Storage & Retrieval module includes programming for Content encryption, Encrypted file segments, and for items Stored as nodes on Blockchain. The Smart Contracts module includes programming to allow the Hosts to sell storage, for the Renters to pay with cryptocurrency, for Blockchain to manage the Contract, and to manage Security Service Level Agreements (SSLA). The Crypto payments module includes programming to allow the Renters/Hosts to pay w/crypto currency, and for Micropayments between renters and hosts using crypto coin.

FIG. 2 also illustrates the DRM Coin Crypto currency module, which provides functions of allowing Hosts to deposit crypto coin into each file contract as collateral, and Renters to pay with crypto coin.

Figure 3:
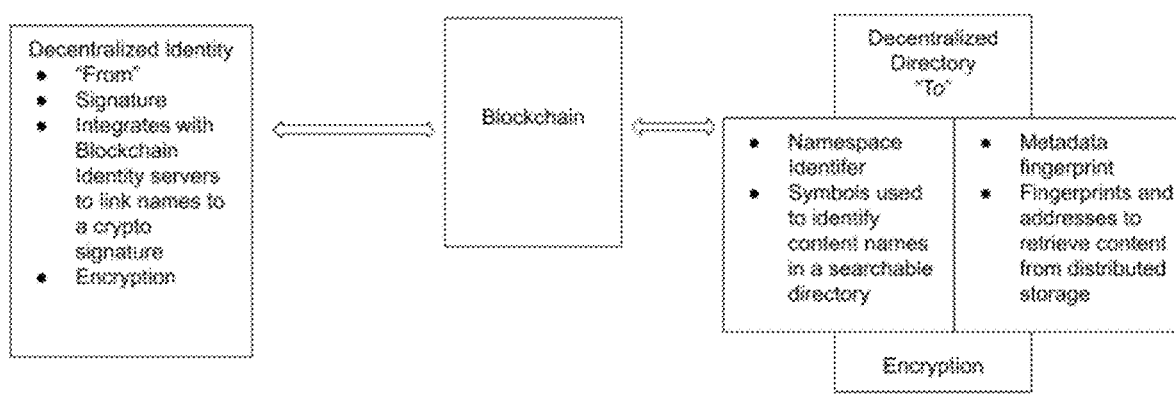
FIG. 3 is a schematic diagram of peer to peer decentralized database and identity management using blockchain, according to an embodiment.

FIG. 3 is a schematic diagram of peer to peer decentralized database and identity management using blockchain, according to an embodiment. FIG. 3 shows that a Decentralized Identity module includes programming instructions to provide functions for managing Sender/Recipient "From", Signature, integration with Blockchain Identity servers to link names to a crypto signature, and Encryption. FIG. 3 shows the Decentralized Identity module connected to the Blockchain to facilitate transfer of information from and to the Decentralized Identity module and from and to the Decentralized Directory module. The Decentralized Directory module includes programming instructions to provide functions for managing Sender/Recipient "To", Namespace Identifer, Symbols used to identify content names in a searchable directory, Metadata fingerprint, Fingerprints and addresses to retrieve content from distributed storage, and Encryption FIG. 3 shows that decentralized Apps may be provided by "dApps"—which are decentralized open-source computing platforms that provide decentralized protocols for authentication, identity, and directory services using Blockchain.

Figure 4:
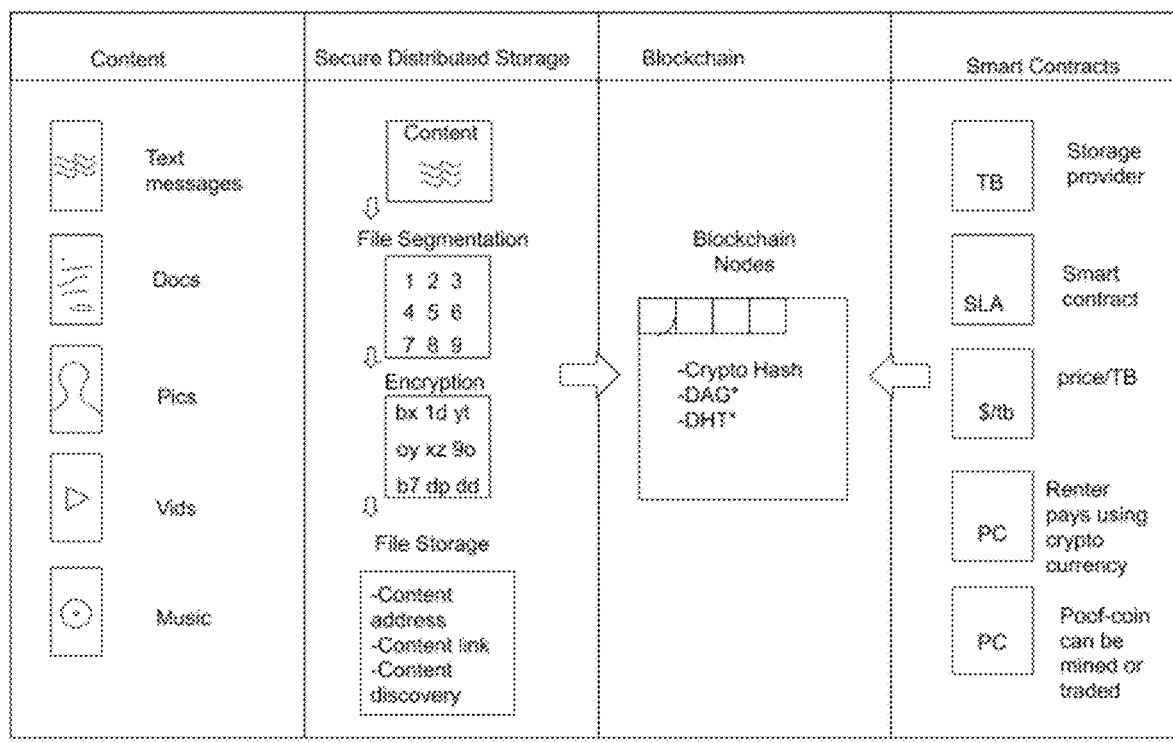
FIG. 4 is a schematic diagram of distributed secure storage with smart contracts, according to an embodiment.

FIG. 4 is a schematic diagram of distributed secure storage with smart contracts, according to an embodiment. FIG. 4 shows how content is converted using file segmentation, followed by encryption, which can then be sent for storage. The stored file maintains the content address, the content link, and the content discovery information. The stored file is then stored using Blockchain having a crypto Hash. In some embodiments, the Blockchain Nodes may use Directed Acyclic Graphs (DAG) to assist as an identifier that is a Hash of the Nodes Content, and may also use Distributed Hash Tables (DHT) to provide a table that is split across all nodes in a Blockchain. FIG. 4 shows the Smart Contracts module managing the storage provider process, the Smart Contract, the price per Terabyte (TB), the payment by Renters using cryptocurrency, and the Mining or Trading of a dedicated cryptocurrency, e.g. POOFcoin.

Figure 5:
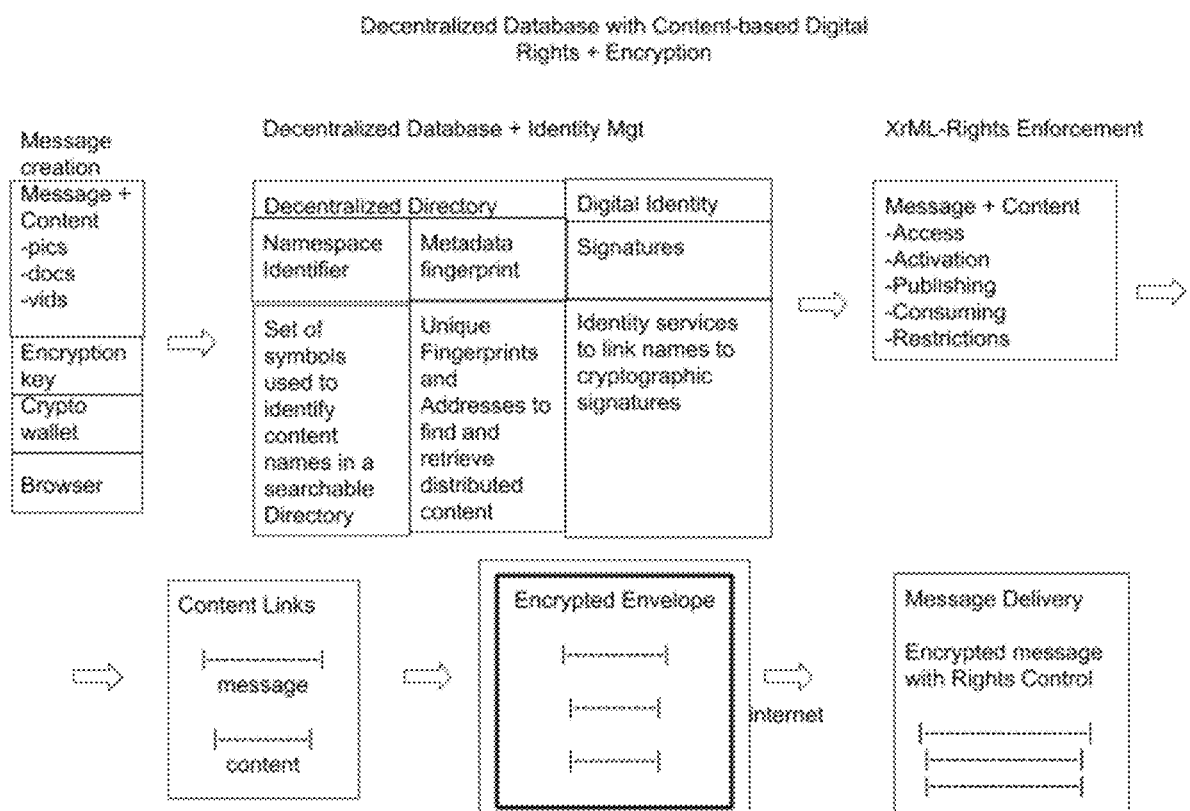
FIG. 5 is a schematic diagram of peer to peer decentralized database with content-based digital rights and encryption, according to an embodiment.

FIG. 5 is a schematic diagram of peer to peer decentralized database with content-based digital rights and encryption, according to an embodiment. FIG. 5 shows how a Sender POOF App creates content (message or file). The Sender content may be local or may already be stored in the DRM Cloud. The Sender transmit request is encrypted and transmitted to the DRM Server. If the content was local to the device, the content itself is transmitted and is stored in the DRM Server using Blockchain according to Sender user settings. If the content was stored, the Sender request generates a Find request to obtain the Cloud content. A Decentralized Directory module uses Namespace identifier modules and metadata fingerprint modules to locate content. If content is in a searchable Directory, the Namespace identifier is used to identify content names in the searchable Directory. If the content was split, distributed and stored, the Metadata fingerprint uses unique file fingerprints and addresses to retrieve distributed content. DRM Services may be authenticated or identity services can use Signatures to link names with cryptographic signatures. Once the content is available, the content is modified by adding DRM restrictions. An html link to the DRM-modified content is then generated, and the link(s) are packaged, encrypted and forwarded to the Recipient App.

Figure 6:
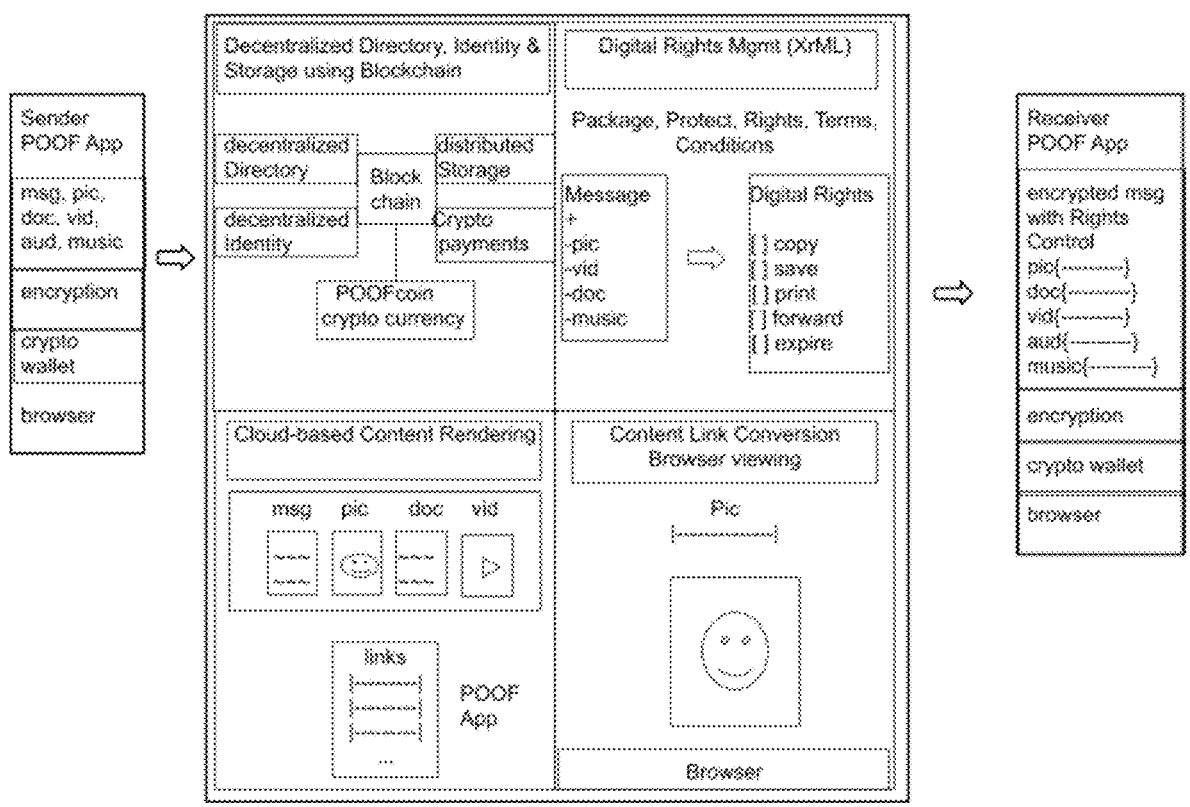
FIG. 6 is a schematic diagram of DRM Cloud Service workflow, according to an embodiment.

FIG. 6 is a schematic diagram of DRM Cloud Service workflow, according to an embodiment. FIG. 6 shows how a Sender POOF App creates content (message or file). The Sender content may be local or may already be stored in the DRM Cloud. The Sender transmit request is encrypted and transmitted to the DRM Server. If the content was local to the device, the content itself is transmitted and is stored using Blockchain according to Sender user settings. If the content was stored, the Sender request generates a Find request to obtain the Cloud content. Once the content is available, the content is modified by adding DRM restrictions. An html link to the DRM-modified content is then generated, and the link(s) are packaged, encrypted and forwarded to the Recipient App.

Figure 7:
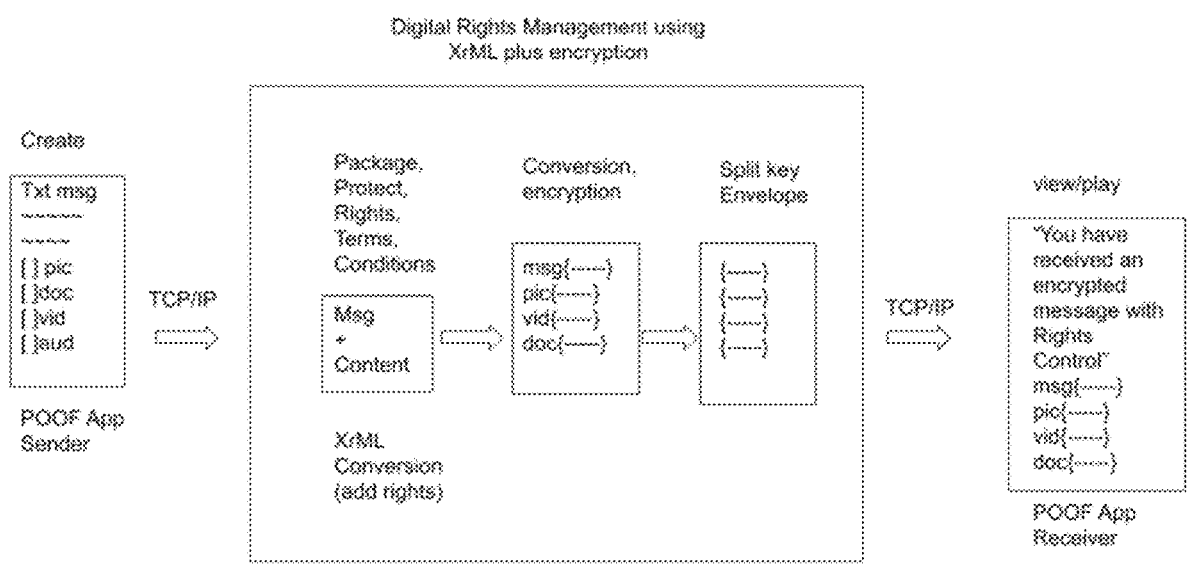
FIG. 7 is a schematic diagram of a Rights Application Lifecycle (XrML) for messages and content, according to an embodiment.

FIG. 7 is a schematic diagram of a Rights Application Lifecycle (XrML) for messages and content, according to an embodiment. FIG. 7 shows how the DRM Rights protection is added as meta-data to the original item to create a DRM-modified-item (message or content). Links to the DRM-modified items are generated and encrypted in a secure, e.g. split-key, envelope for transfer over the internet to the recipient.

Figure 8:
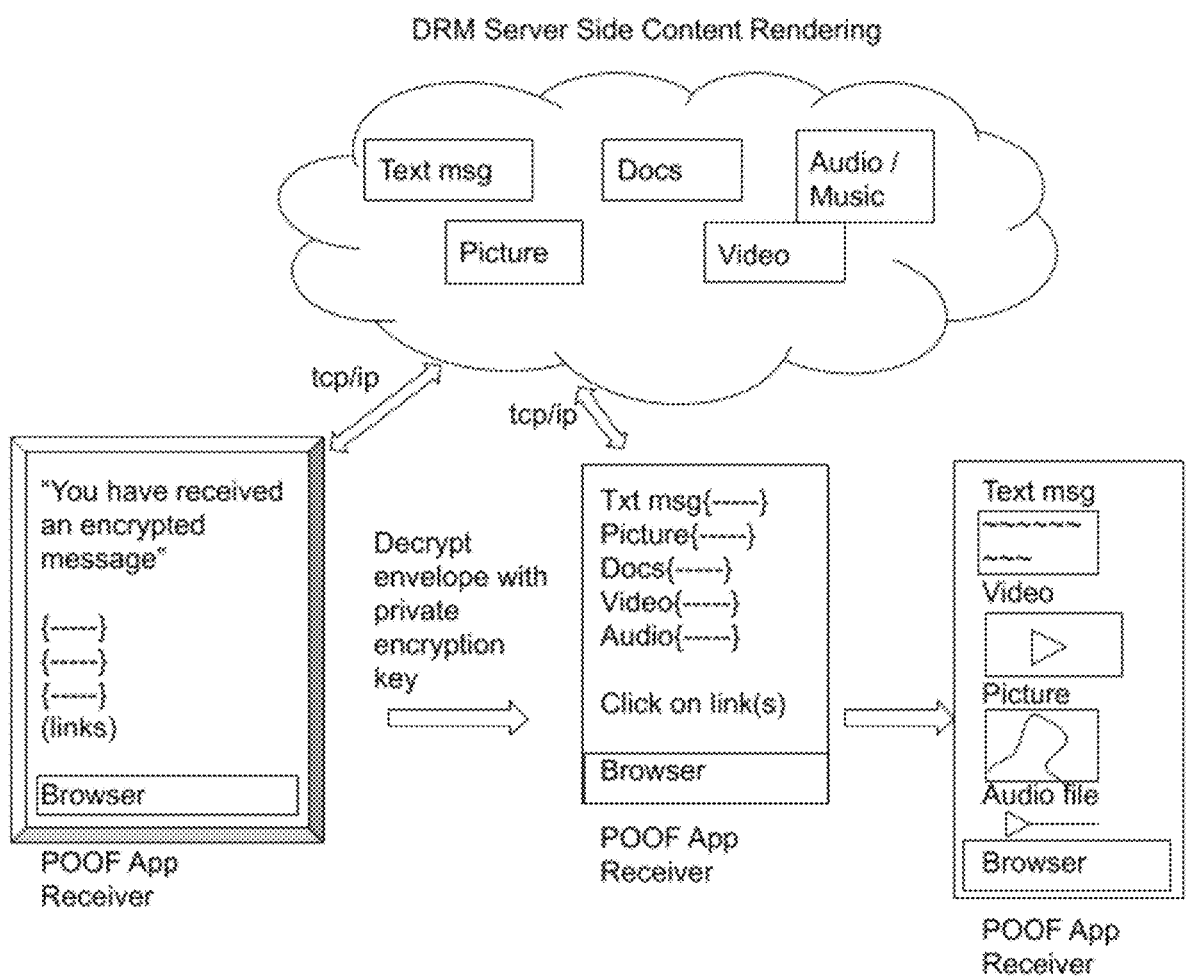
FIG. 8 is a schematic diagram of DRM Server Side Content rendering, according to an embodiment.

FIG. 8 is a schematic diagram of DRM Server Side Content rendering, according to an embodiment. FIG. 8 shows how the receiver decrypts the outer transfer envelope from the DRM Server to reveal the links to the DRM-modified content. Once the links are clicked, the browser on the device permits the content/message to be viewed, while the content/message resides on the DRM Server.

Figure 9:
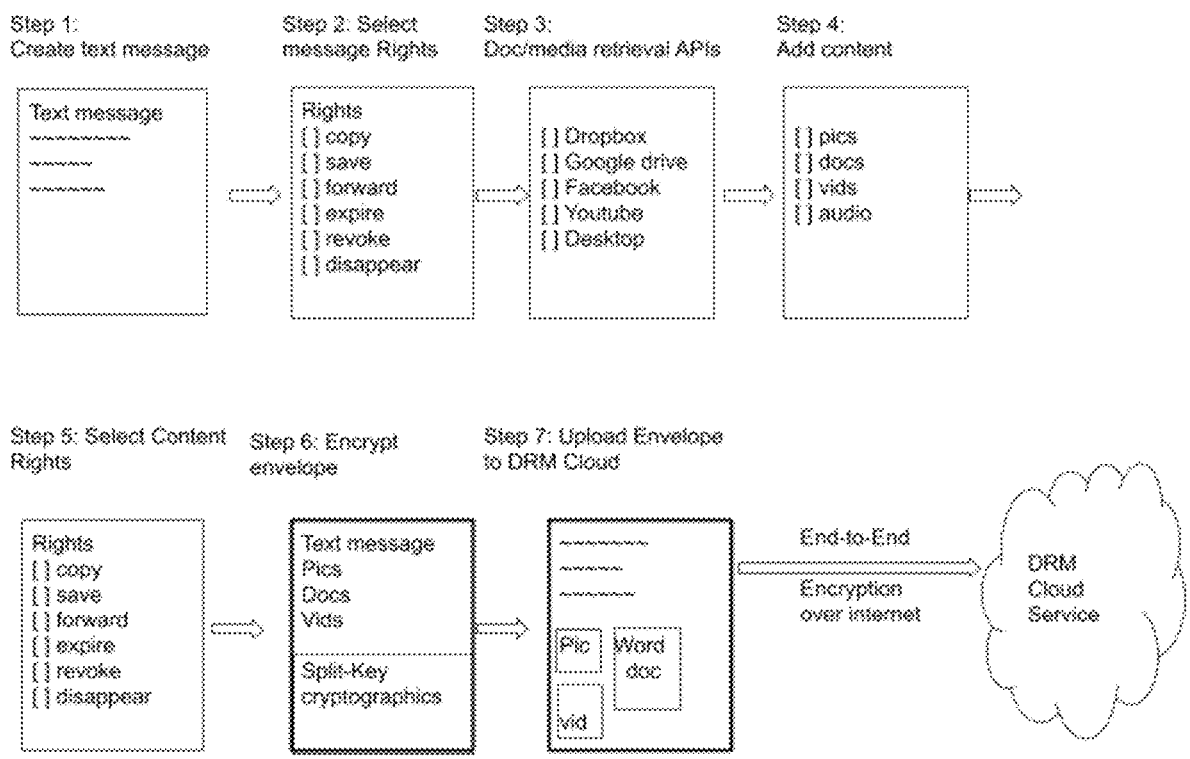
FIG. 9 is a schematic diagram of Sender POOF App workflow, according to an embodiment.

FIG. 9 is a schematic diagram of Sender POOF App workflow, according to an embodiment. FIG. 9 shows Step 1 where the message is created on the Sender device. Step 2 provides the Sender the ability to select DRM Rights. Step 3 shows how the Sender can retrieve items/content from various storage options using APIs. Steps 4 and 5 show that the items/content receives its own DRM Rights restrictions. FIG. 9 then show the outer transfer envelope being encrypted and the encrypted envelope uploaded to the DRM Server for securely transmitting to the Recipient.

Figure 10:
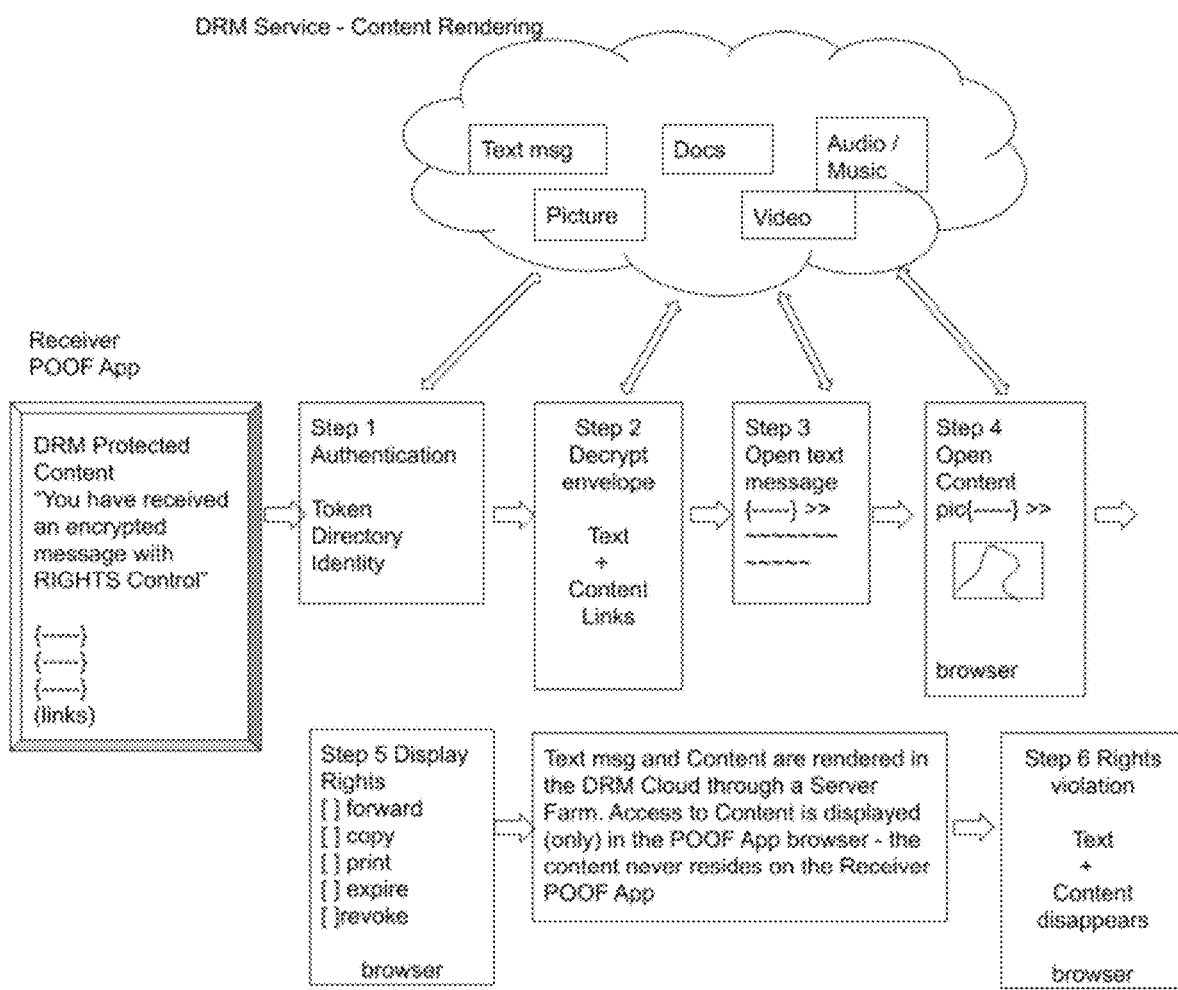
FIG. 10 is a schematic diagram of Receiver POOF App workflow, according to an embodiment.

FIG. 10 is a schematic diagram of Receiver POOF App workflow, according to an embodiment. FIG. 10 shows the DRM Service performing the Content Rendering function. The Recipient receives a message that DRM content has been sent. In Step 1, the Recipient is authenticated, and in Step 2 the outer transfer envelope is decrypted. In Step 3, the links to the DRM-modified message and DRM-modified-content are then made available to the Recipient by html access through the in-App browser or the native device browser. In Step 4, the content and message(s) are "opened" by permitting viewing of the content and message on the DRM Server. Step 5 shows the DRM Server enforcing the DRM Rights that have been selected by the Sender. Step 6 shows the access to the message and content benign revoked when a DRM Rights violations occurs.

Figure 11:
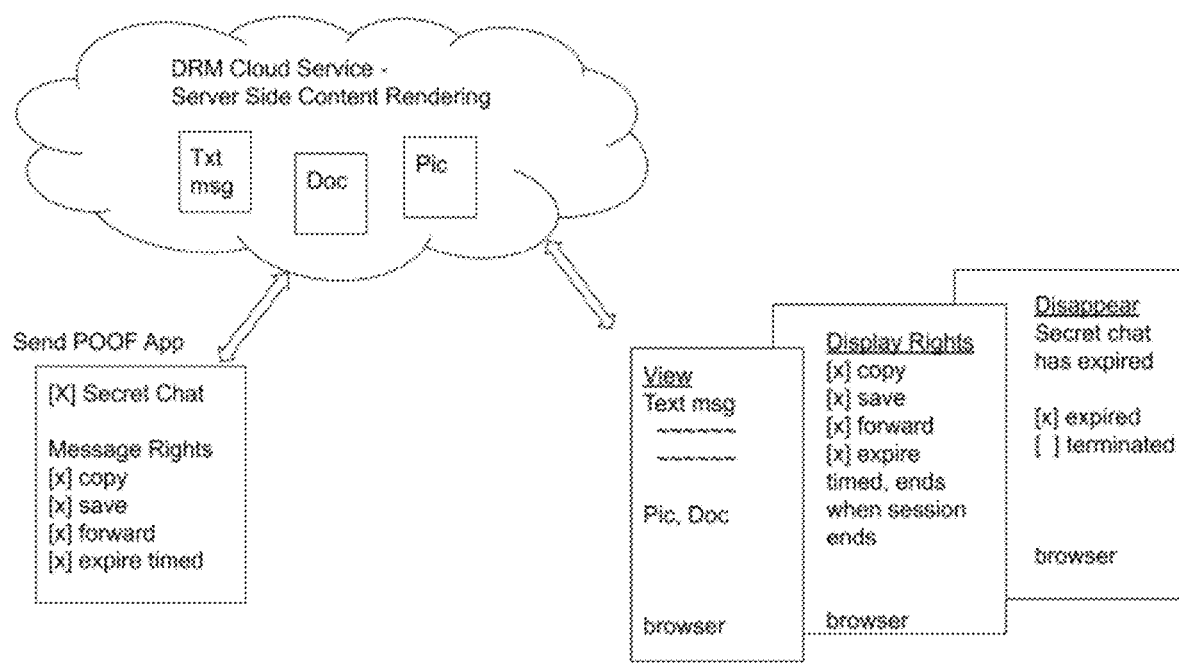
FIG. 11 is a schematic diagram of Secret Chat where message and content disappears, according to an embodiment.

FIG. 11 is a schematic diagram of Secret Chat where message and content disappears, according to an embodiment. FIG. 11 shows the DRM Cloud Service managing a Secret Chat function between a Sender POOF App and a recipient. The DRM Rights for the text message are selected by the Sender using amenu, and expiration instructions are provided for the link to the Secret text message. The message is originally sent to the DRM Server, where a DRM-modified-message is generated along with an html link to the DRM-modified message which is stored in the Cloud. The link gets sent to the recipient for viewing. When the Session expires, the link is disabled and access to the original text message content is no longer available.

Figure 12:
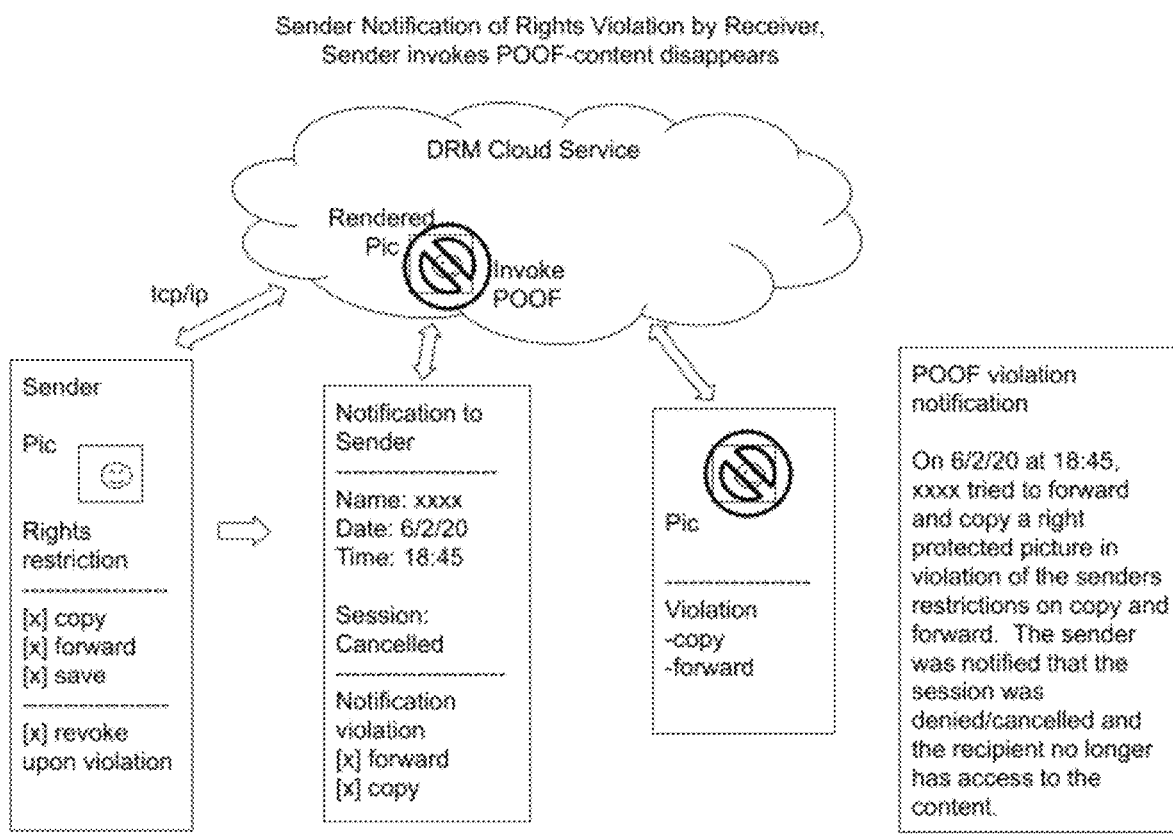
FIG. 12 is a schematic diagram of DRM Cloud Service invoking a denial or revocation of access generated by a Rights violation, according to an embodiment.

FIG. 12 is a schematic diagram of DRM Cloud Service invoking a denial or revocation of access generated by a Rights violation, according to an embodiment. FIG. 12 shows that a Sender transmits a photo (pic) using a POOF App having Rights restrictions on copying, forwarding, and saving. A menu item of "revoke upon violation" may also be included to contrast to a warning default. When the Recipient attempts to forward and copy the photo within the Recipient POOF App, the DRM Rights violation has occurred and access to the photo is no longer available to the Recipient when the DRM Violation module on the DRM Server disables the html link to the DRM-modified-photo. A Violation Notification Module sends a notification to the Sender with pre-set details of the violation.

FIG. 13 is a schematic diagram of a text messaging and content creation reporting module, according to an embodiment. FIG. 13 shows that content can be paired with a selection menu for encryption, secret chat, DRM Rights selection, type of content, and recovery settings.

Figure 14:
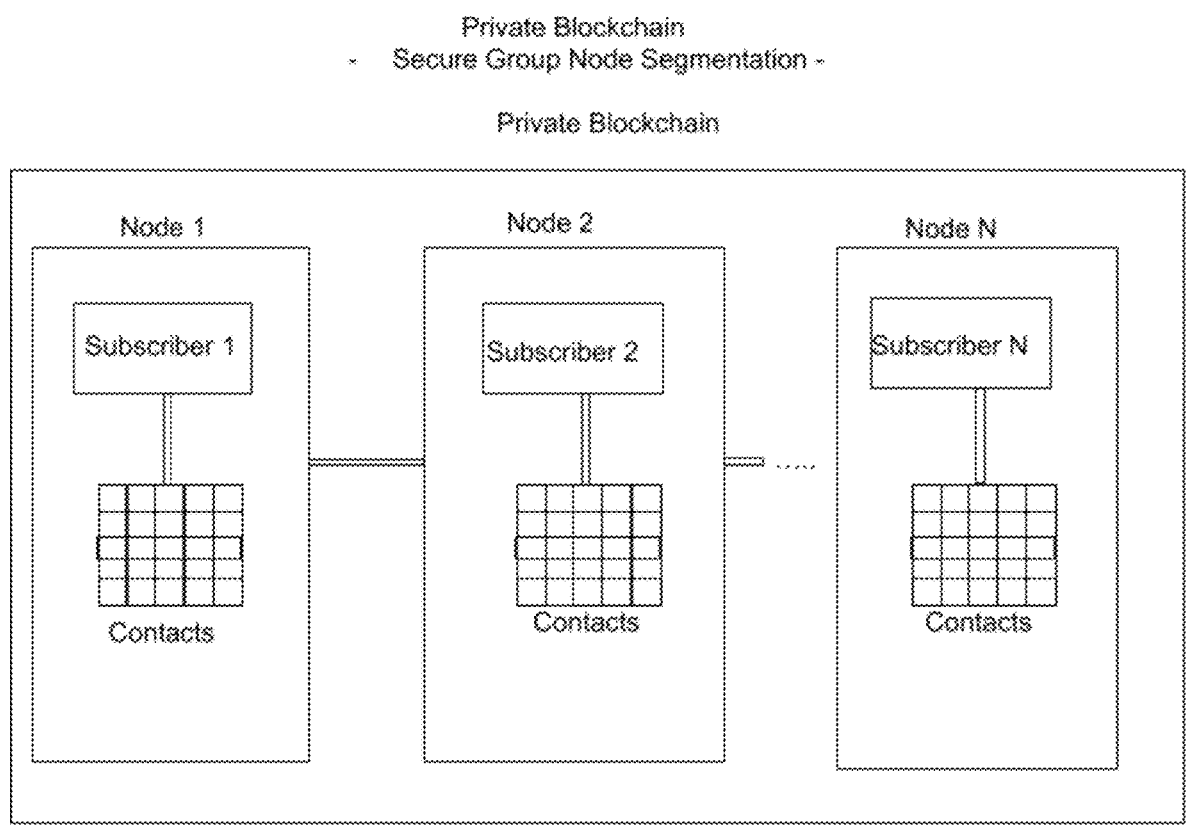
FIG. 14 is a schematic diagram of private blockchain and secure group node segmentation for the POOF App System, according to an embodiment.

FIG. 14 is a schematic diagram of private blockchain and secure group node segmentation for the POOF App System, according to an embodiment. FIG. 14 shows a Private Blockchain module with Secure Group Node Segmentation. The Private Blockchain module connects multiple Subscribers, each having their own Contacts, across individual Nodes to ensure fast computational speed and accuracy of text messaging transactions, especially when the volume of messages grows exponentially as additional subscribers are added.

Figure 15:
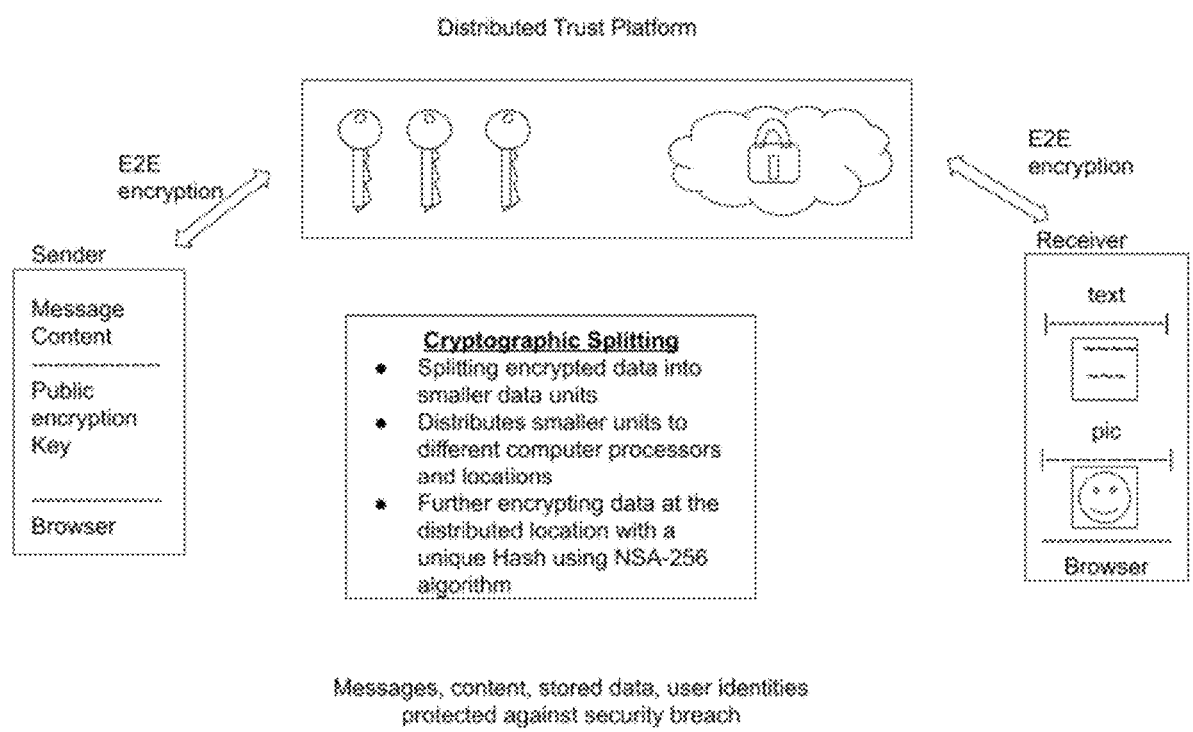
FIG. 15 is a schematic diagram of a distributed trust platform using E2E encryption and cryptographic splitting between Sender and Receiver for the POOF App, according to an embodiment.

FIG. 15 is a schematic diagram of a distributed trust platform using E2E encryption and cryptographic splitting between Sender and Receiver for the POOF App, according to an embodiment. FIG. 15 shows a Cloud-based platform connecting to a Sender App and a Receiver App using end-to-end (E2E) encryption. FIG. 15 shows that in some embodiments, a Cryptographic Splitting module includes program instructions to provide the functions of Splitting encrypted data into smaller data units, Distribute smaller units to different computer processors and locations, and to further encrypt data at the distributed location with a unique Hash using NSA-256 algorithm. This module allows the Messages, content, stored data, user identities to be additionally protected against security breach.

Figure 16:
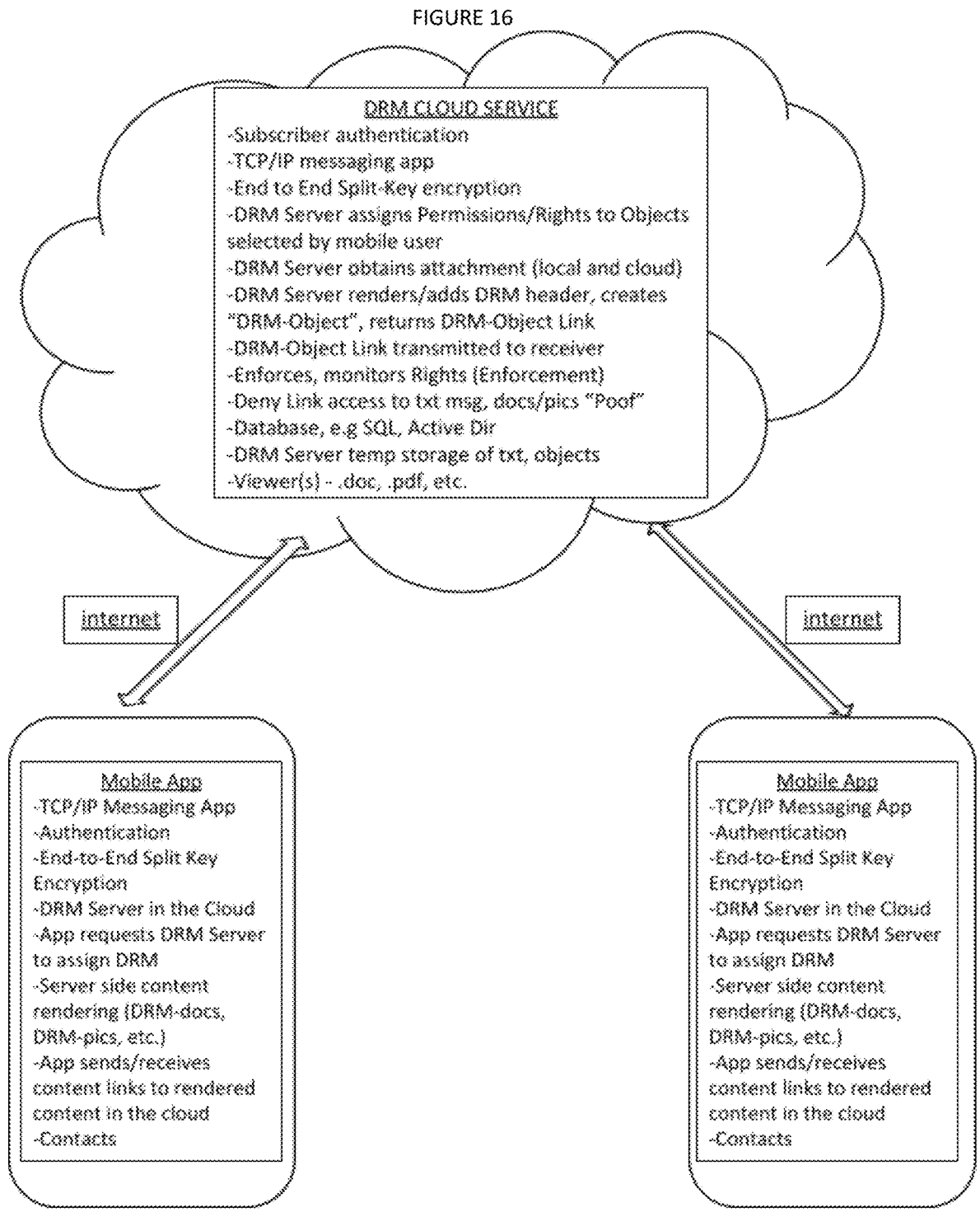
FIG. 16 is a schematic diagram of a system for secure text messaging and object sharing having mobile devices in communication with a DRM server to establish a link for a shared text message and text message attachment, that is then shared via a peer to peer (P2P) network, according to an embodiment.

FIG. 16 is a schematic diagram of a system for secure text messaging and object sharing having mobile devices in communication with a DRM server to establish a link for a shared text message and text message attachment, that is then shared via a peer to peer (P2P) network, according to an embodiment.

FIG. 16 shows a DRM Cloud Service providing end to end encryption, assignment and modification of DRM permissions (rights), enforcement of DRM permissions by alerts, warnings, and revocations, and poof capability to deny access to objects for recipients who violate the DRM. FIG. 16 shows how a pair of mobile communication devices, such as cell phones, install the DRM mobile text app and provide functions for encryption, decryption, assigning and modifying DRM permissions, sending of text messages, sending of text message attachments, and interfacing with the contacts app of the mobile communication device to generate an DRM mobile text app specific contact list.

Figure 17:
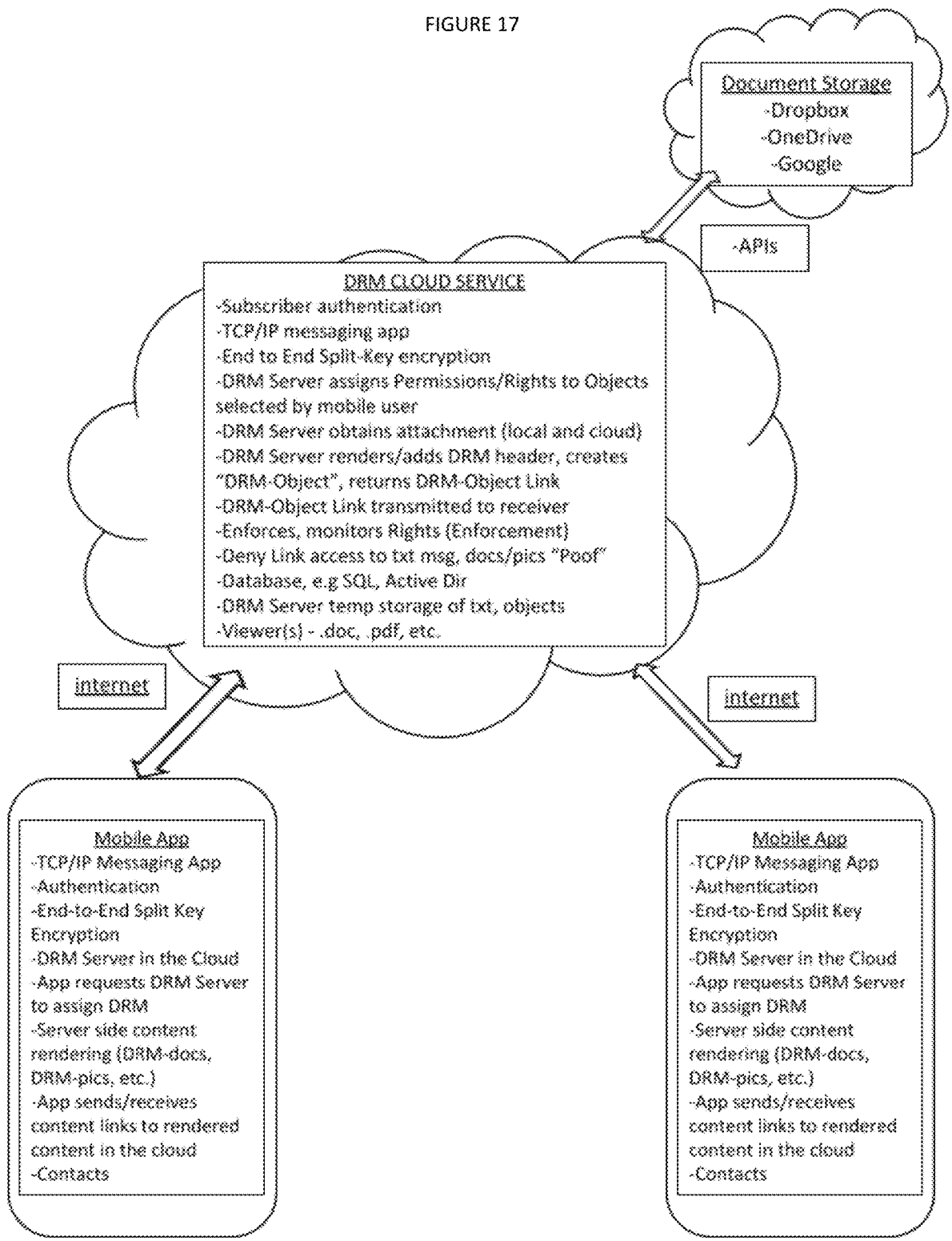
FIG. 17 is a schematic diagram of a system for secure text messaging and object sharing having mobile devices in communication with a DRM server to establish a link for a shared text message and text message attachment, that is then shared via a peer to peer (P2P) network, with a cloud API connection to a cloud based storage facility, according to an embodiment.

FIG. 17 is a schematic diagram of a system for secure text messaging and object sharing having mobile devices in communication with a DRM server to establish a link for a shared text message and text message attachment, that is then shared via a peer to peer (P2P) network, with a cloud API connection to a cloud based storage facility, according to an embodiment.

FIG. 17 includes the DRM Cloud Service, the P2P network, and the DRM mobile text apps of FIG. 16, but also includes one or more APIs to interface with commercial or private cloud-based document storage services such as Dropbox, Box, OneDrive, Google Drive, iCloud drive, etc.

Figure 18:
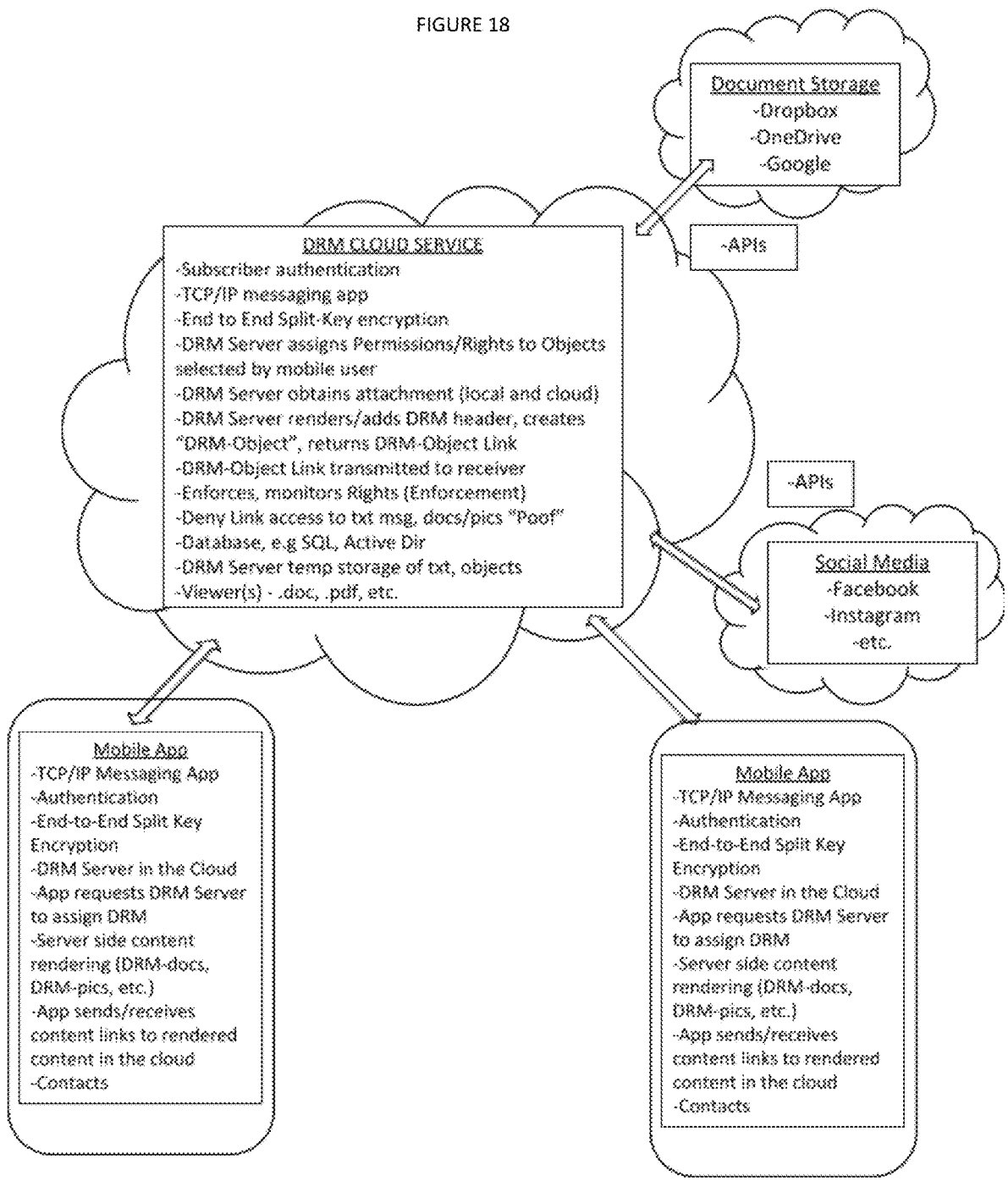
FIG. 18 is a schematic diagram of a system for secure text messaging and object sharing having mobile devices in communication with a DRM server to establish a link for a shared text message and text message attachment, that is then shared via a peer to peer (P2P) network, with a cloud API connection to a cloud based storage facility, and with a cloud API connection to a social media account facility, according to an embodiment.

FIG. 18 is a schematic diagram of a system for secure text messaging and object sharing having mobile devices in communication with a DRM server to establish a link for a shared text message and text message attachment, that is then shared via a peer to peer (P2P) network, with a cloud API connection to a cloud based storage facility, and with a cloud API connection to a social media account facility, according to an embodiment.

FIG. 18 includes the DRM Cloud Service, the P2P network, and the DRM mobile text apps of FIGS. 16 and 17, and also includes one or more APIs as in FIG. 17 to interface with commercial or private cloud-based document storage services such as Dropbox, Box, OneDrive, Google Drive, iCloud drive, etc., but also includes one or more APIs to interface with Social Media accounts to access photos, video, documents, and other objects located within a social media environment.

Figure 19:
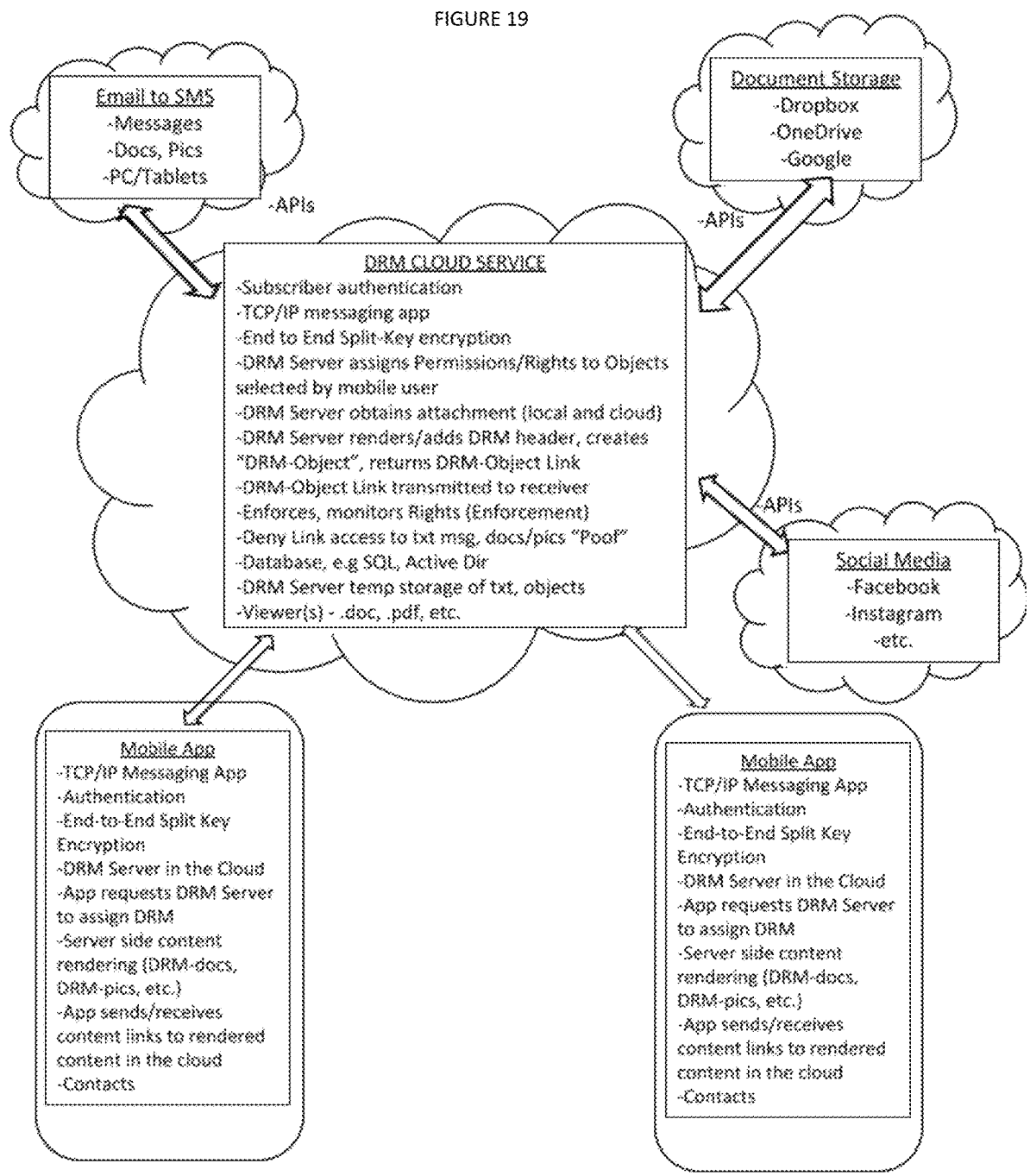
FIG. 19 is a schematic diagram of a system for secure text messaging and object sharing having mobile devices in communication with a DRM server to establish a link for a shared text message and text message attachment, that is then shared via a peer to peer (P2P) network, with a cloud API connection to a cloud based storage facility, with a cloud API connection to a social media account facility, and with Email to SMS service, according to an embodiment.

FIG. 19 is a schematic diagram of a system for secure text messaging and object sharing having mobile devices in communication with a DRM server to establish a link for a shared text message and text message attachment, that is then shared via a peer to peer (P2P) network, with a cloud API connection to a cloud based storage facility, and with a cloud API connection to a social media account facility, and with an Email to SMS program included therein, according to an embodiment.

FIG. 19 includes the DRM Cloud Service, the P2P network, and the DRM mobile text apps, the one or more APIs to interface with commercial or private cloud-based document storage services, the one or more APIs to interface with Social Media accounts as illustrated in embodiments shown in FIGS. 16-18, but also includes an Email to SMS program included therein, according to an embodiment.

Figure 20:
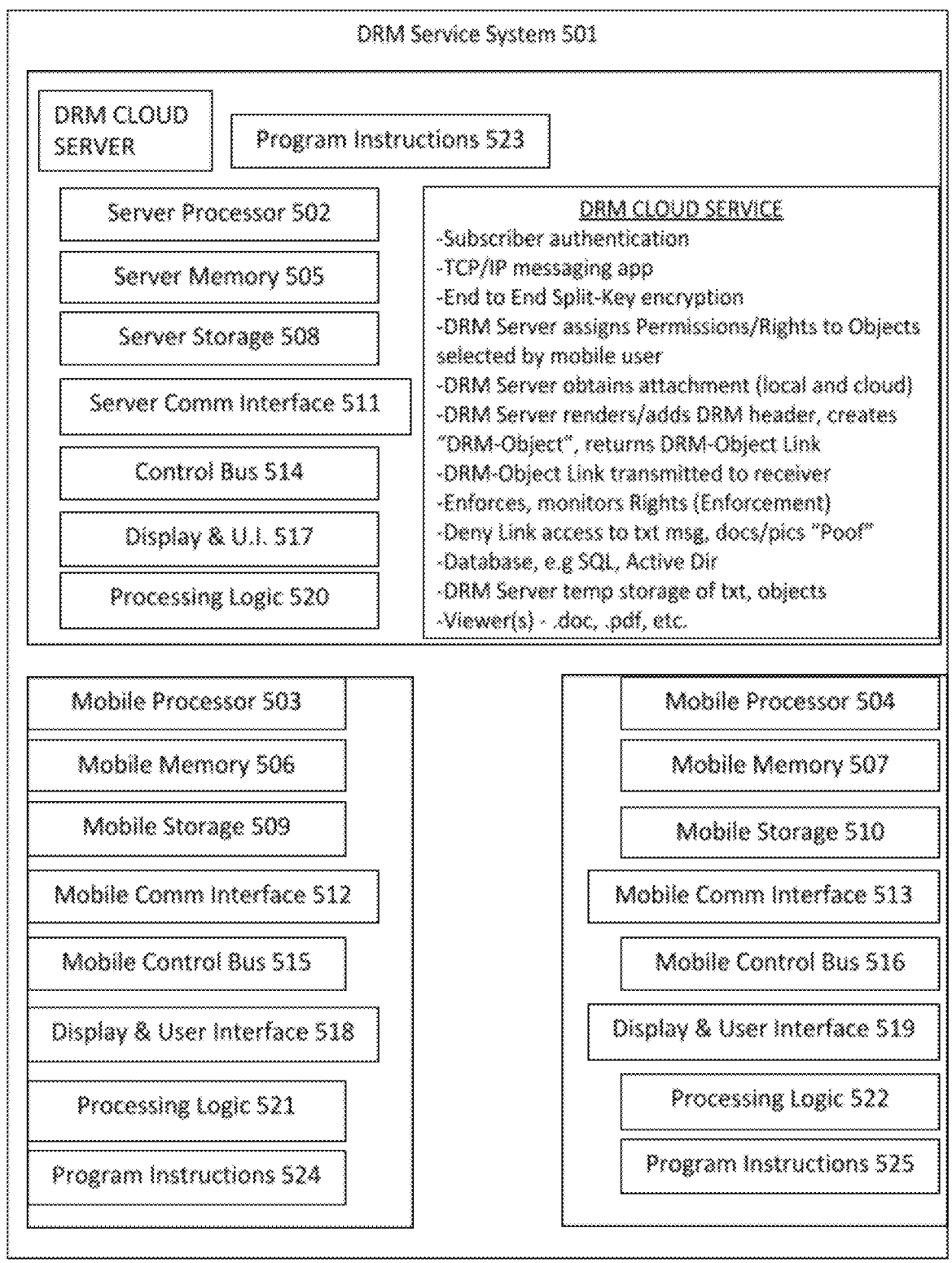
FIG. 20 is a schematic block diagram showing various components within the DRM Server and Cloud Service, as well as components needed to operate the DRM-SMS mobile app within each mobile device.

FIG. 20 illustrates a functional block diagram of a Secure Mobile Text Messaging and Object Sharing system as a machine in the example form of computer system, within which a set of instructions for causing the machine to perform any one or more of the methodologies, processes or functions discussed herein may be executed. In some examples, the machine is a plurality of mobile telephone devices in communication with a DRM Server as described above. The machine operates as both a server or a client machine in a client-server network environment when each mobile telephone is connected to the DRM Server in the cloud, and in a peer-to-peer (or distributed) network environment, when the mobile telephones are communicating by text message (SMS, RCS, MMS, IM, blockchain, etc.). The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example computer system may include processor, memory, data storage and communication interface, which may communicate with each other via data and control bus. In some examples, computer system also includes display and/or user interface.

Processor may include, without being limited to, a microprocessor, a central processing unit, an application specific integrated circuit (ASIC), a field programmable gate array (FPGA), a digital signal processor (DSP) and/or a network processor. Processor may be configured to execute processing logic for performing the operations described herein. In general, processor may include any suitable special-purpose processing device specially programmed with processing logic to perform the operations described herein.

Memory may include, for example, without being limited to, at least one of a read-only memory (ROM), a random access memory (RAM), a flash memory, a dynamic RAM (DRAM) and a static RAM (SRAM), storing computer-readable instructions executable by processing device. In general, memory may include any suitable non-transitory computer readable storage medium storing computer-readable instructions executable by processing device for performing the operations described herein. Although one memory device is illustrated in FIG. 5, in some examples, computer system may include two or more memory devices (e.g., dynamic memory and static memory).

Computer system may include communication interface device, for direct communication with other computers (including wired and/or wireless communication), and/or for communication with network. In some examples, computer system may include display device (e.g., a liquid crystal display (LCD), a touch sensitive display, etc.). In some examples, computer system may include user interface (e.g., touchscreen, keyboard, an alphanumeric input device, a cursor control device, etc.).

In some examples, computer system may include data storage device storing instructions (e.g., software) for performing any one or more of the functions described herein. Data storage device may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, Software applications or code) include machine instructions for a programmable processor, and may be implemented in a high-level procedural and/or object-oriented programming language, and/or in assembly/machine language.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device for displaying information to the user and a U.I. touchscreen, stylus pencil, voice command, keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

FIG. 21(a)-(g) is a series of illustrations showing examples of screenshots within a DRM-SMS mobile app, according to the invention.

Figure 21A:
FIG. 21(*a*)-(*g*) is a series of illustrations showing examples of screenshots within a DRM-SMS mobile app, according to the invention.
Figure 21B:
Figure 21C:
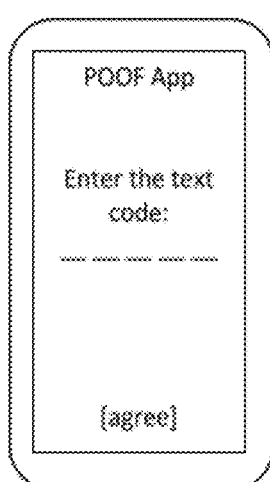
Figure 21D:
Figure 21E:
Figure 21F:
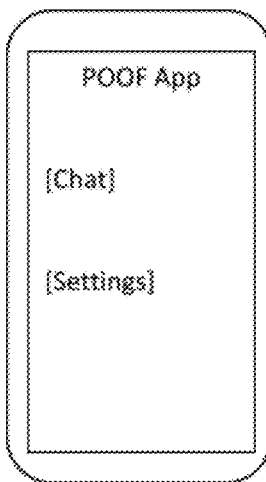
Figure 21G:
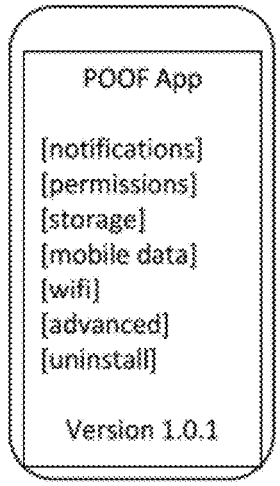

FIG. 21(a) shows a welcome screen having options to log in or create an account. FIG. 21(a) also illustrates a typical location for TOS and privacy policy statements, along with a radio button to indicate an agreement with the TOS and privacy policy. FIG. 21(b) illustrates that a user can enter a telephone number in order to verify by SMS or other two factor authentication. FIG. 21(c) shows an illustration of a screen shot where a 2FA code can be entered to complete the authentication of the Mobile App within the system, and to send administrative communications to the DRM Cloud Server to provision a communications link. FIG. 21(d) illustrates a screen shot of a page in the mobile app that provides a user with the option to access their Contact list to search for, match, and expand the number of authenticated users in the sender's network. FIG. 21(e) illustrates a screen providing an option to enter profile information including a user name and a user profile photo to associate with their account. FIG. 21(f) illustrates a main ready-to-function screen that provides a radio button to initiate a CHAT or a radio button that provides access to the mobile app settings pages. FIG. 21(g) is an illustration of the functions available within a settings menu.

FIG. 22(a)-(h) is a series of illustrations showing examples of screenshots within a DRM-SMS mobile app to effect the local, application-level functions of the invention.

Figure 22A:
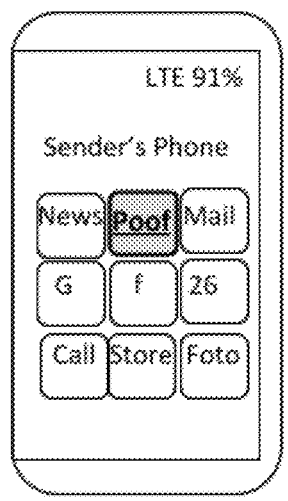
FIG. 22(*a*)-(*h*) is a series of illustrations showing examples of screenshots within a DRM-SMS mobile app to effect the local, application-level functions of the invention.
Figure 22B:
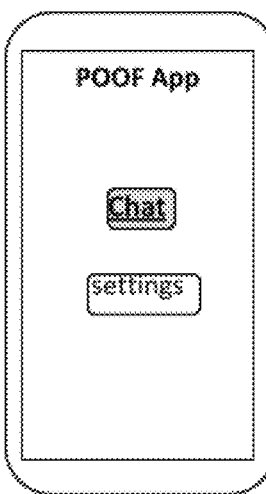
Figure 22C:
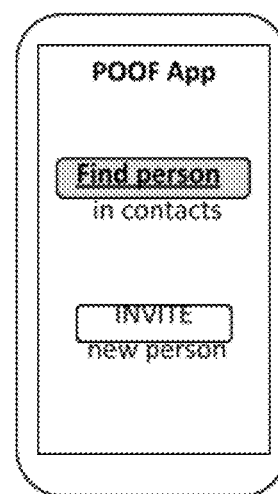
Figure 22D:
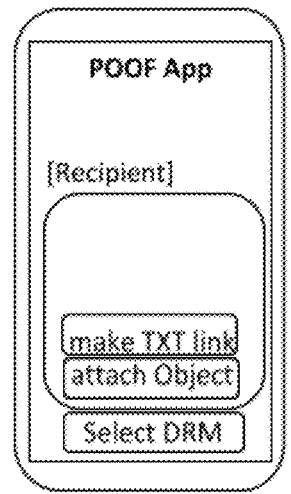
Figure 22E:
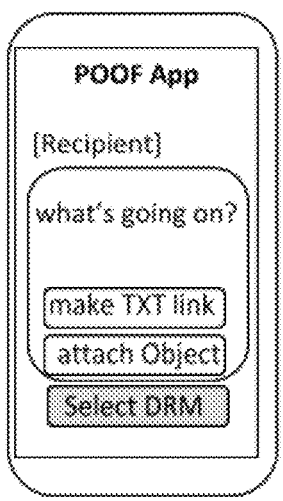
Figure 22F:
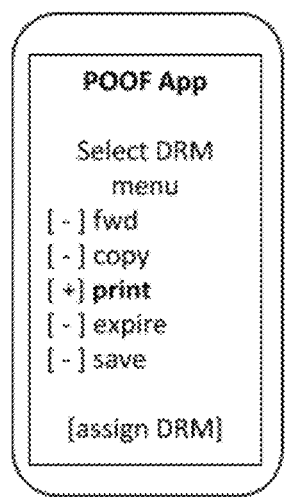
Figure 22G:
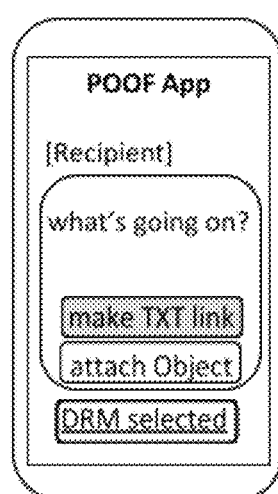
Figure 22H:
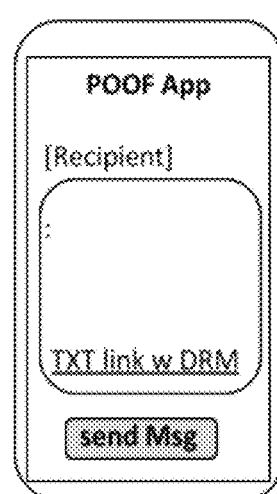

FIG. 22(a) illustrates a screen from the mobile app and shows a mobile phone communication device having an icon to access the inventive mobile app. FIG. 22(b) illustrates a screen from the mobile app and shows a main ready-to-function screen that provides a radio button to initiate a CHAT or a radio button that provides access to the mobile app settings pages. FIG. 22(c) illustrates a screen from the mobile app and provides a pair of radio button selectors to choose from finding a person in a contacts list or inviting a new person. FIG. 22(d) illustrates a screen from the mobile app and shows a text message entry box along with an illustration of radio button selectors to make a text link, attach an Object, and select DRM. FIG. 22(e) illustrates a screen from the mobile app and shows a sample text message entry "what's going on?" and that the Select DRM radio button has been actuated. FIG. 22(f) illustrates a DRM screen from the mobile app and shows some non-limiting options for DRM permissions that can be selected. Examples include restrictions or permissions on forwarding (fwd), copying (copy), printing (print), setting an expiry date for the object or message (expire), or saving the item (save). FIG. 22(f) shows that, e.g. a printing restriction is chosen by the sender. FIG. 22(g) illustrates a screen from the mobile app and shows that the DRM radio button now reflects that DRM is being requested, and that the "make link" radio button is actuated to send the message to the DRM Cloud Server to have the DRM rights applied to the item, by creating a new item, no longer "text message entry" but a "DRM text message entry", by having DRM restrictions rendered into the header. The DRM Cloud Sever will then save the DRM restricted item, generate a link to the DRM Cloud-stored location, and return the link to the DRM Mobile Text App on the mobile phone for sending to the recipient. Rendering such a protected file verifies the DRM, and shows or makes the document available subject to the permissions or restrictions.

FIG. 23 is a schematic sequence diagram showing transmission and receipt of certain communications of the system, especially the mobile app directing the DRM Server to locate the SMS attachment, the mobile app instructing the DRM Server to assign DRM rights and saving the DRM modified attachment, creating an Object link, and displaying the Object link within a text SMS message, according to an embodiment.

Figure 23A:
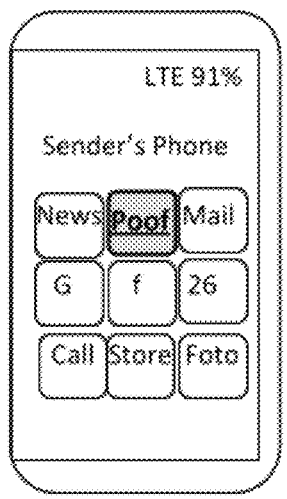
FIG. 23(*a*)-(*k*) is a series of illustrations showing examples of screenshots within a DRM-SMS mobile app to effect the local, application-level functions of the invention.
Figure 23B:
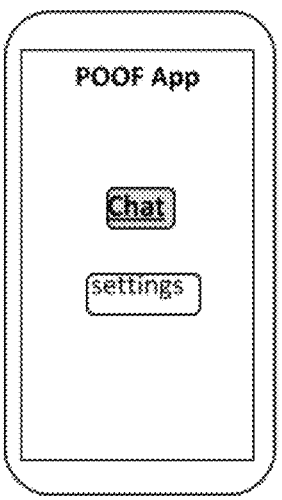
Figure 23C:
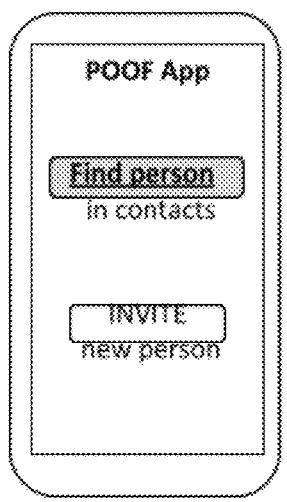
Figure 23D:
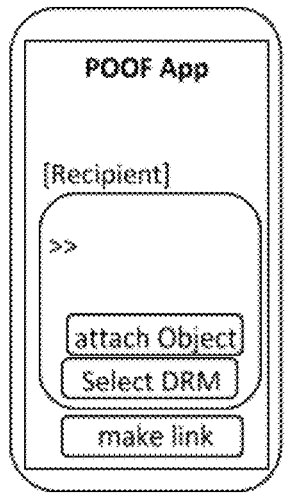
Figure 23E:
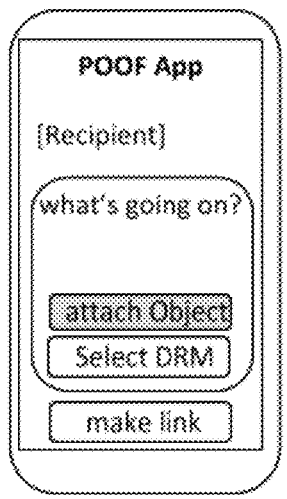
Figure 23F:
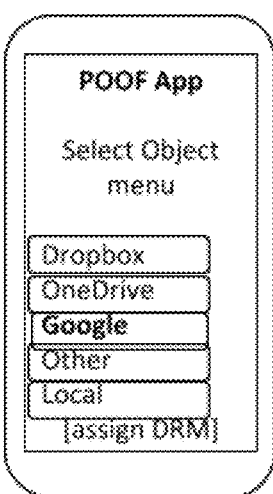
Figure 23G:
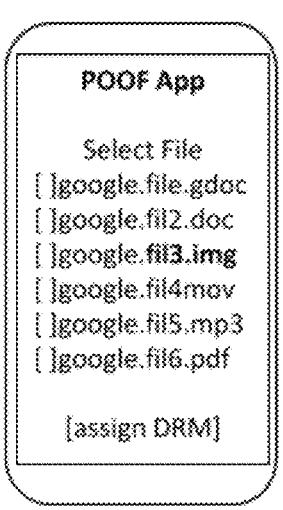
Figure 23H:
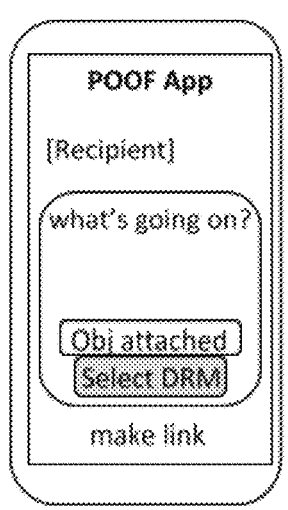
Figure 23I:
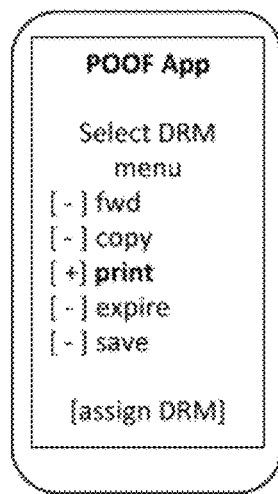
Figure 23J:
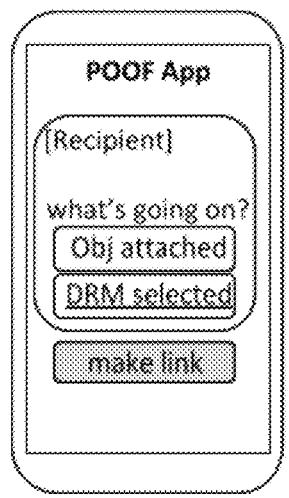
Figure 23K:
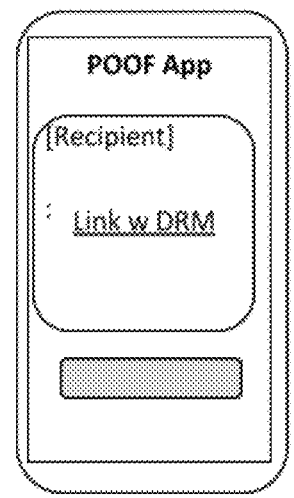

Similar to FIG. 22, FIG. 23(a) illustrates a screen from the mobile app and shows a mobile phone communication device having an icon to access the inventive mobile app. FIG. 23(b) illustrates a screen from the mobile app and shows a main ready-to-function screen that provides a radio button to initiate a CHAT or a radio button that provides access to the mobile app settings pages. FIG. 23(c) illustrates a screen from the mobile app and provides a pair of radio button selectors to choose from finding a person in a contacts list or inviting a new person. FIG. 23(d) illustrates a screen from the mobile app and shows a text message entry box along with an illustration of radio button selectors to make a text link, attach an Object, and select DRM. FIG. 23(e) illustrates a screen from the mobile app and shows a sample text message entry "what's going on?" and that the "ATTACH OBJECT" radio button has been actuated. FIG. 23(f) illustrates a "select object" menu where a remote or local file attachment can be selected by the user from a variety of pre-linked storage options. FIG. 23(f) illustrates that e.g. Google drive can be chosen from a menu of Dropbox, OneDrive, Other, and Local (on the mobile phone itself). FIG. 23(g) illustrates a screen that shows access to a view of a users files available on e.g. Google drive that can be selected as a file attachment to be send using the DRM Mobile Text App. Fil3.img is highlighted to show how many types of file types can be selected, including Word docs, PDFs, images such as .img, .jpg, .tif, .png, etc., video such as .mov, and even audio such as .mp3 files. FIG. 23(h) illustrates that the attach Object radio button now reflects that an object has been chosen for attachment, and that the user is prompted to chosen DRM permissions or restrictions for the text message entry and the file attachment for the text message. FIG. 23(h) shows that the Select DRM radio button has been actuated. FIG. 23(i) illustrates a DRM screen from the mobile app and shows some non-limiting options for DRM permissions that can be selected. Examples include restrictions or permissions on forwarding (fwd), copying (copy), printing (print), setting an expiry date for the object or message (expire), or saving the item (save). FIG. 23(j) shows that, e.g. a printing restriction is chosen by the sender. FIG. 23(k) illustrates a screen from the mobile app and shows that the DRM radio button now reflects that DRM is being requested, and that the "make link" radio button is actuated to send the message to the DRM Cloud Server to have the DRM rights applied to the item, by rendering a new item, no longer "text message entry" but a "DRM text message entry", by having DRM restrictions rendered into the header. The DRM Cloud Sever will then save the DRM restricted item, generate a link to the DRM Cloud-stored location, and return the link to the DRM Mobile Text App on the mobile phone for sending to the recipient.

Figure 24:
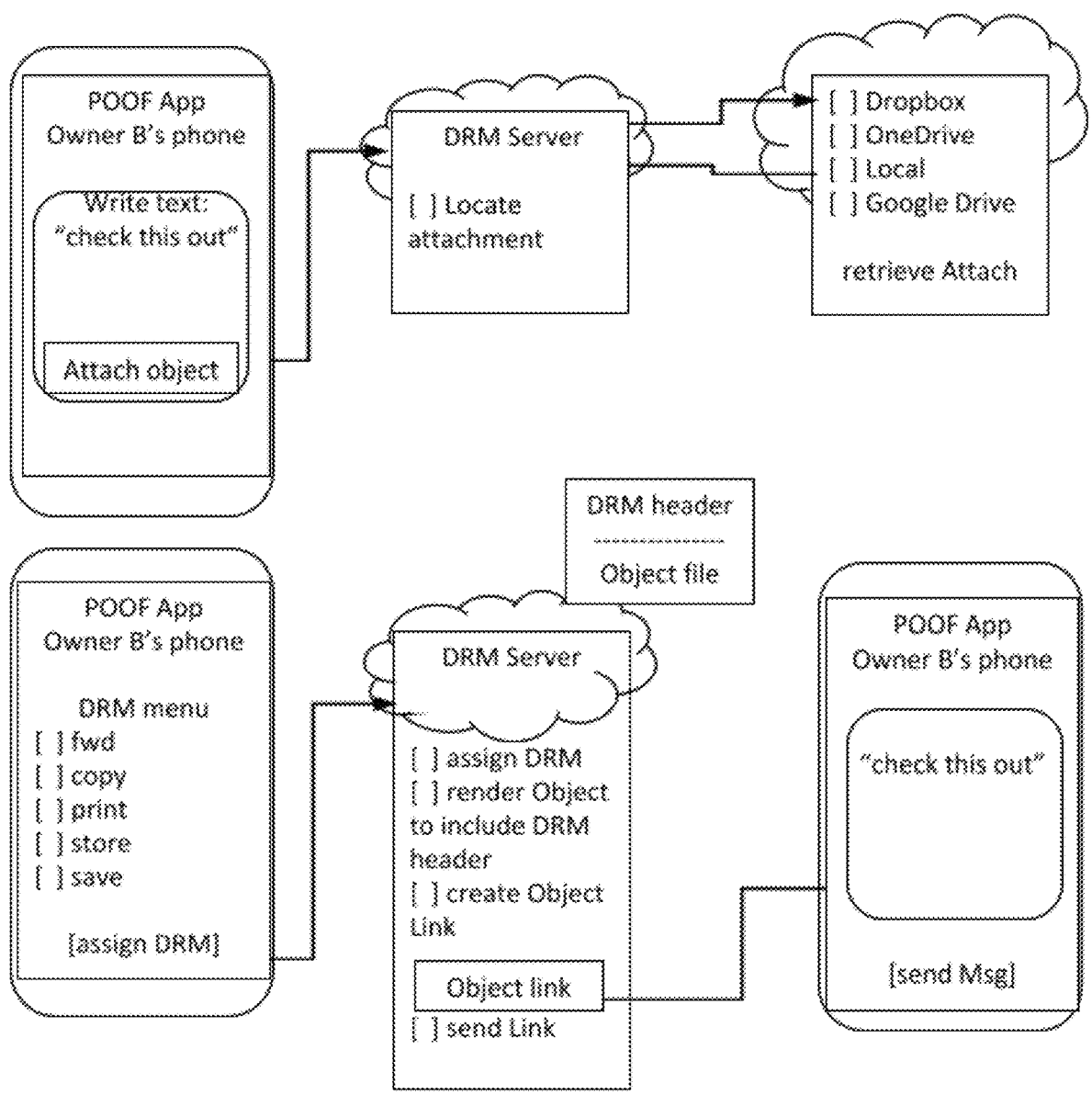
FIG. 24 is a schematic sequence diagram showing transmission and receipt of certain communications of the system, especially the mobile app directing the DRM Server to locate the SMS attachment, the mobile app instructing the DRM Server to assign DRM rights and saving the DRM modified attachment, creating an Object link, and displaying the Object link within a text SMS message, according to an embodiment.

FIG. 24 is a schematic sequence diagram showing transmission and receipt of certain communications of the system, especially the SENDER writing the outgoing message, sending the attach object command to the DRM Cloud Server, having the DRM Cloud Server obtain the file attachment (object) from a remote storage account, assigning DRM, rendering the new DRM-restricted object, creating the TCP-IP link, forwarding the DRM link to the sender's mobile phone, and having the DRM-Object Link presented in the recipient mobile app, according to an embodiment.

Figure 25:
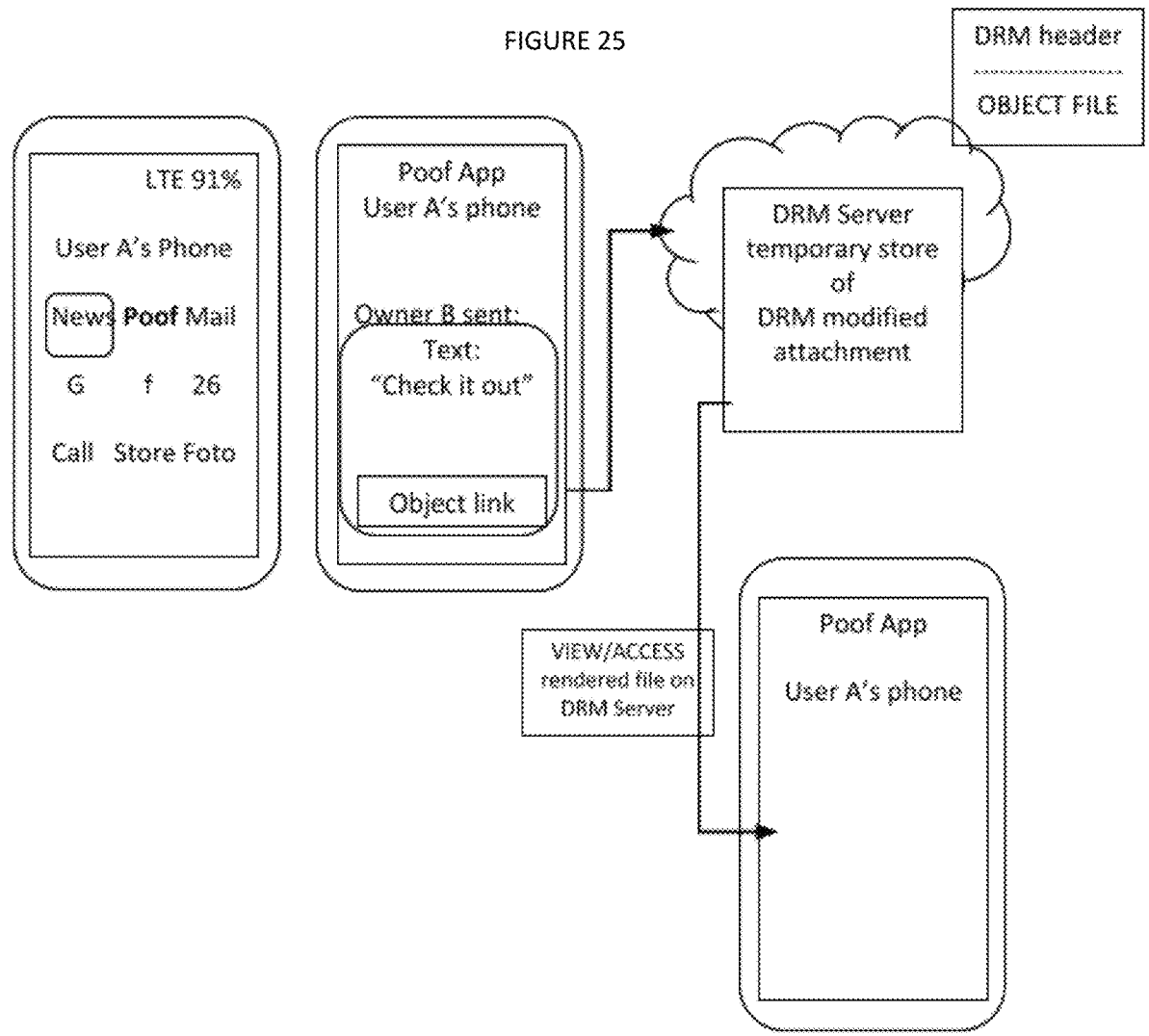
FIG. 25 is a schematic sequence diagram showing transmission and receipt of certain communications of the system, especially the recipient receiving a notification of incoming message, having the DRM-Object Link presented in the recipient mobile app, clicking the link to obtain access to the attachment file stored in the DRM Server, and having the mobile app display or play the DRM protected attachment in the mobile app, according to an embodiment.

FIG. 25 is a schematic sequence diagram showing transmission and receipt of certain communications of the system, especially the recipient receiving a notification of incoming message, having the DRM-Object Link presented in the recipient mobile app, clicking the link to obtain access to the attachment file stored in the DRM Server, and having the mobile app display or play the DRM protected attachment in the mobile app, according to an embodiment.

Figure 26:
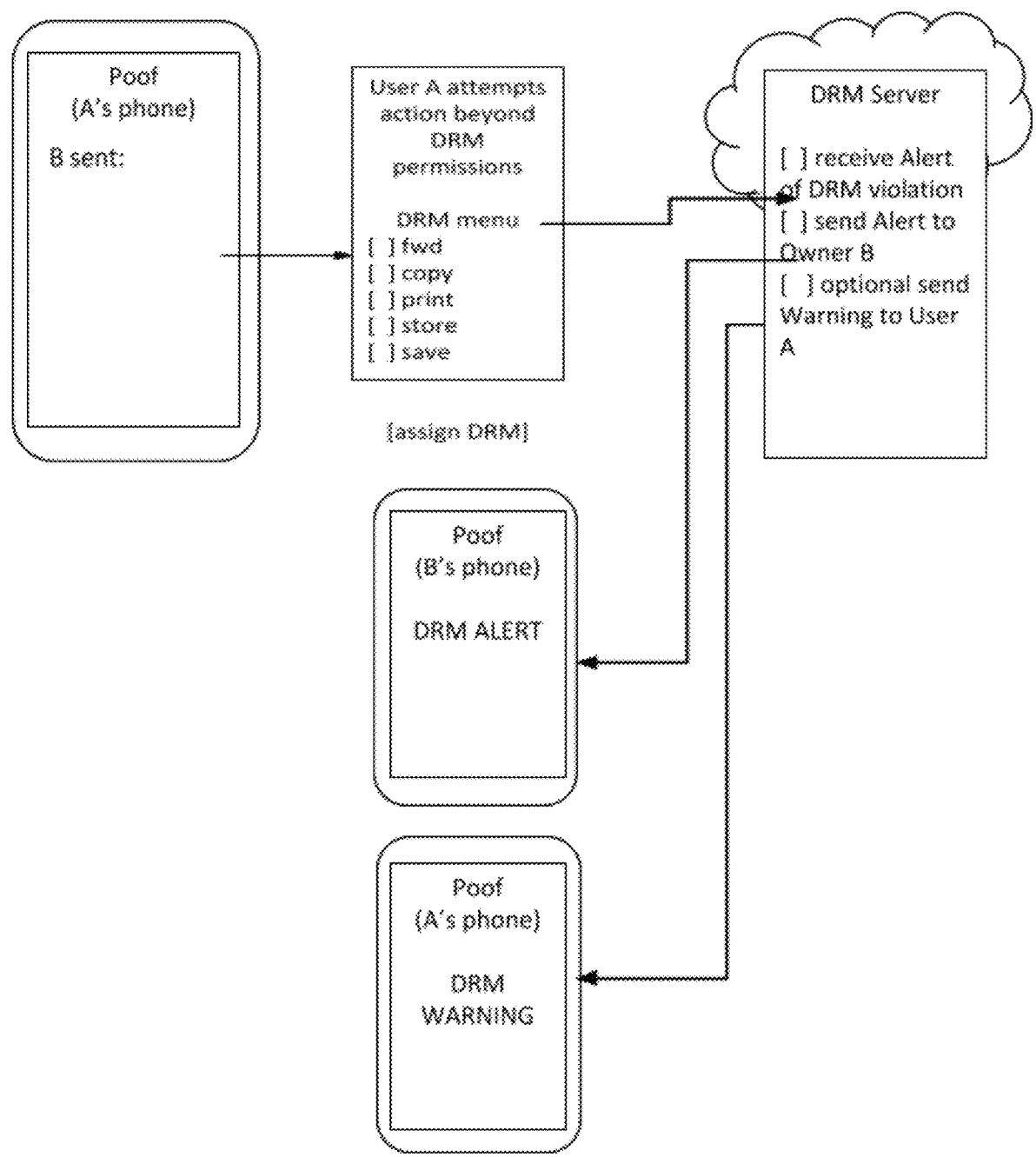
FIG. 26 is a schematic sequence diagram showing transmission and receipt of certain communications of the system, especially the recipient User A attempting to perform an action beyond what is permitted within the DRM rights granted by the Sender, the DRM Server generating an Alert sent to the Sender, and generating a Warning sent to the Recipient, according to an embodiment.

FIG. 26 is a schematic sequence diagram showing transmission and receipt of certain communications of the system, especially the recipient User A attempting to perform an action beyond what is permitted within the DRM rights granted by the Sender, the DRM Server generating an Alert sent to the Sender, and generating a Warning sent to the Recipient, according to an embodiment.

FIG. 26 is a schematic sequence diagram showing transmission and receipt of certain communications of the system, especially the recipient User A attempting to perform an action beyond what is permitted within the DRM rights granted by the Sender, the DRM Server generating an Alert sent to the Sender, and displaying a menu of DRM enforcement options available to the Sender, such as a Warning, a revoking of the DRM permissions for the document, or removing entirely the message from the Recipient's phone "You've been POOF' d", according to an embodiment.

Figure 27:
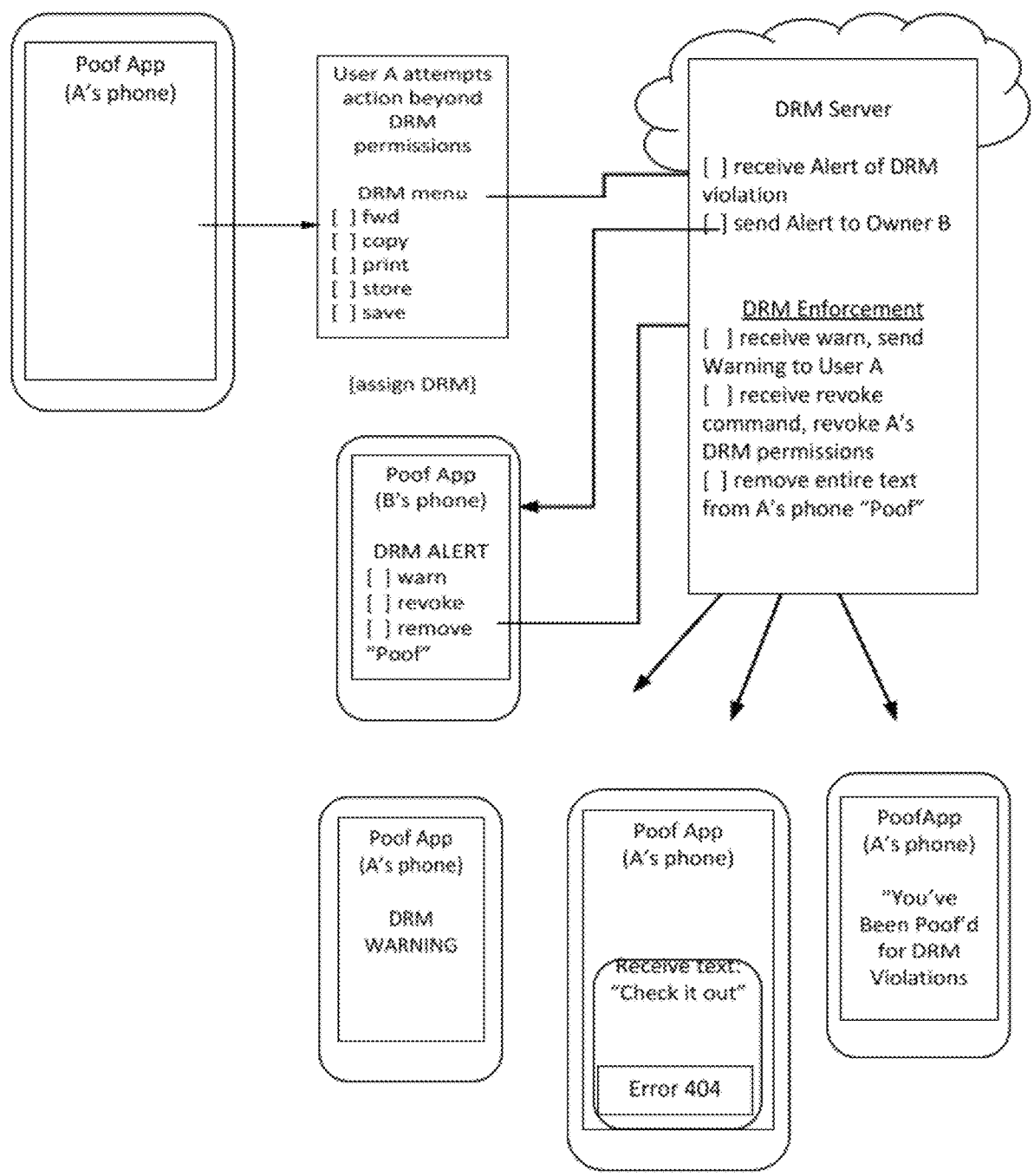
FIG. 27 is a schematic sequence diagram showing transmission and receipt of certain communications of the system, especially the recipient User A attempting to perform an action beyond what is permitted within the DRM rights granted by the Sender, the DRM Server generating an Alert sent to the Sender, and displaying a menu of DRm enforcement options available to the Sender, such as a Warning, a revoking of the DRM permissions for the document, or removing entirely the message from the Recipient's phone, according to an embodiment.

In one embodiment, the RECIPIENT may acknowledge receipt of the text. The RECIPIENT may then open the message in accordance with the DRM restrictions. If the recipient attempts to performs a function that is not permitted by the DRM restrictions, a warning can be sent to the RECIPIENT that the object contains DRM restrictions, and that further attempts to contravene the DRM permissions will result in the text and/or attachment being blocked or revoked by denying the encryption key to the RECIPIENT. FIG. 27 then shows a situation where the RECIPIENT has attempted to violate the DRM restrictions and the SENDER has revoked access to the text and/or attachment for the RECIPIENT.

Figure 28:
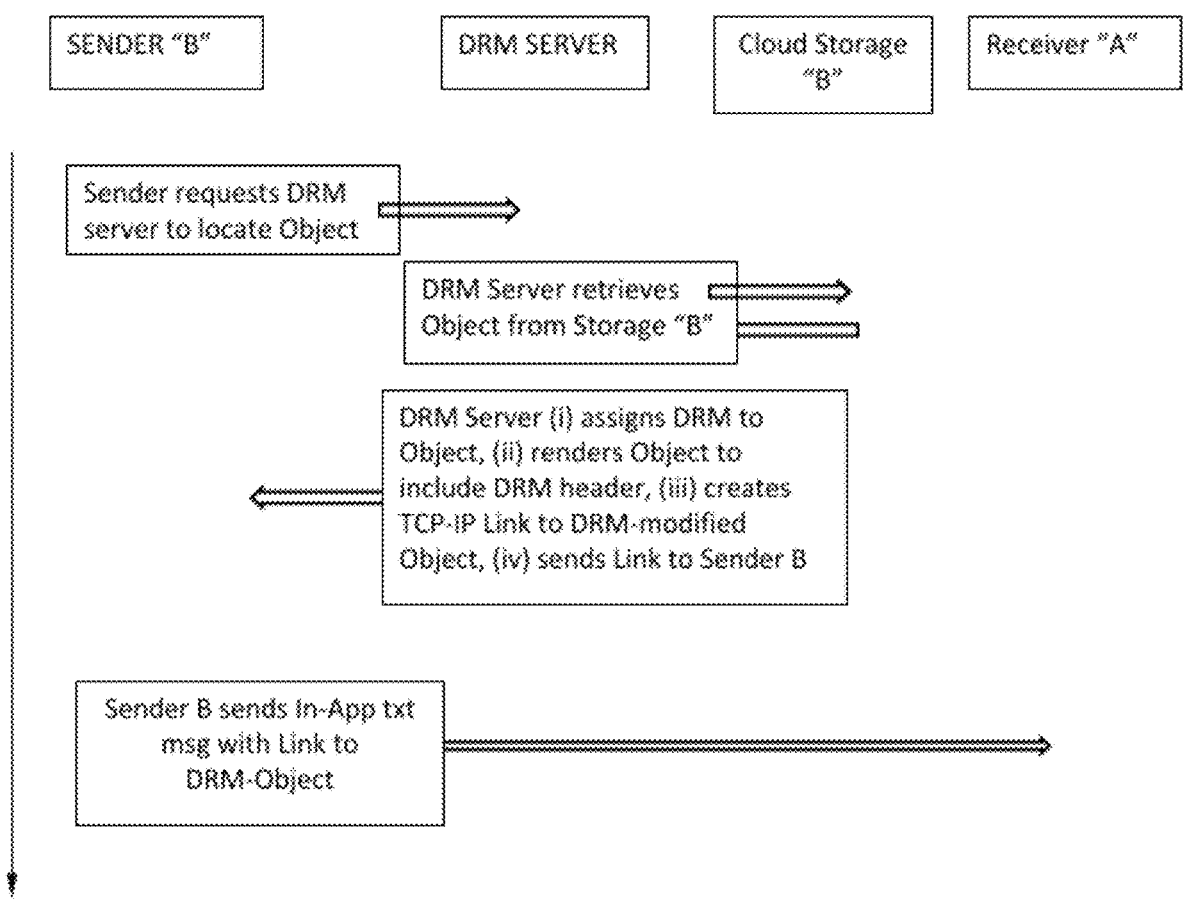
FIG. 28 is a flowchart showing an example of steps in one preferred process, especially obtaining the remote stored Sender document/object, assigning a set of DRM permissions to the Sender document/object, and providing the Sender mobile app with a DRM Link, where the DRM Link is texted to another user, according to an embodiment of the invention.

FIG. 28 is a flowchart showing an example of steps in one preferred process, especially obtaining the remote stored Sender document/object, assigning a set of DRM permissions to the Sender document/object, and providing the Sender mobile app with a DRM Link, where the DRM Link is texted to another user, according to an embodiment of the invention.

Figure 29:
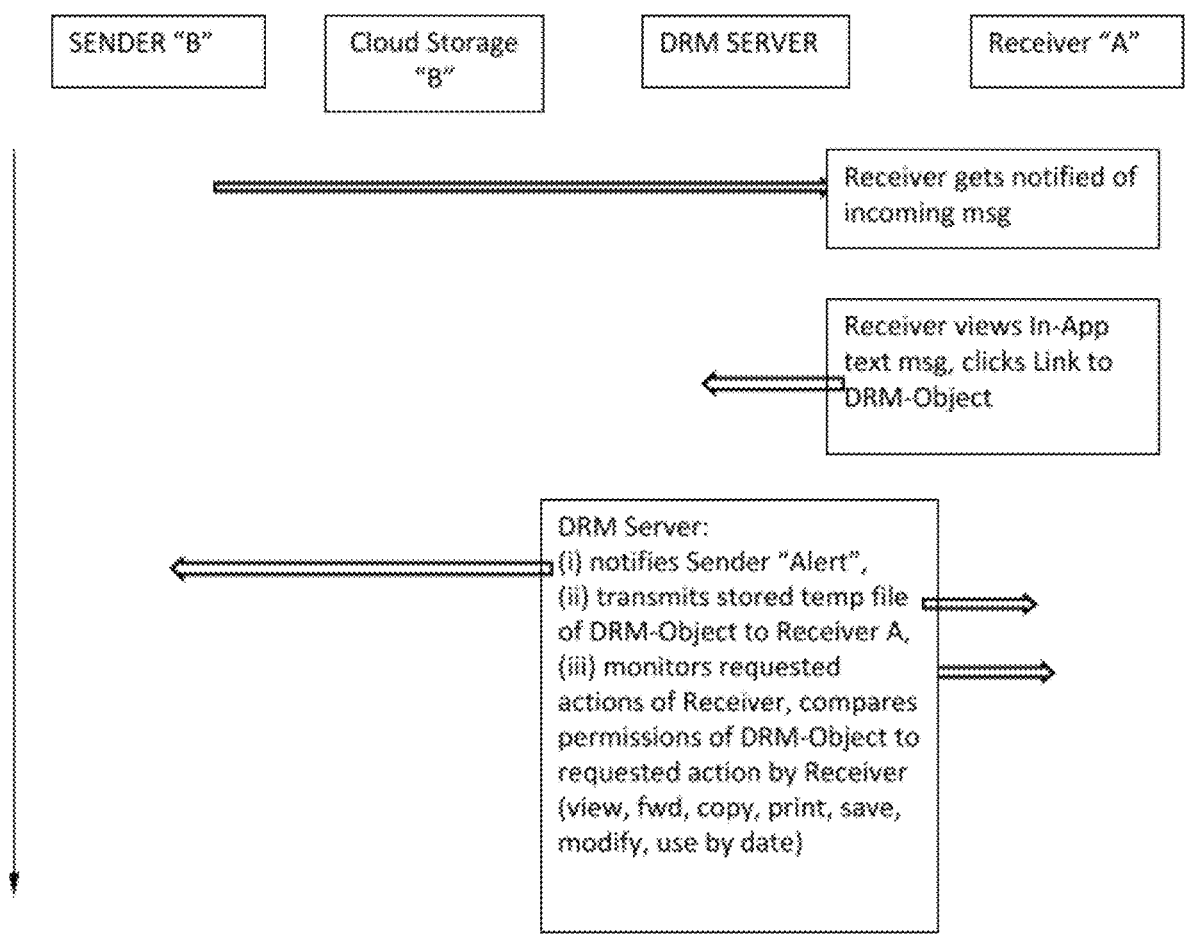
FIG. 29 is a flowchart showing an example of steps in one preferred process, especially the encryption/decryption in the authentication process for the recipient/receiver, the assignment of DRM access to the document/file, the ALERT sent to the Sender, the displaying or playing of the DRM file, and the monitoring of the document to ensure compliance with the DRM permissions, according to an embodiment of the invention.

FIG. 29 is a flowchart showing an example of steps in one preferred process, especially the encryption/decryption in the authentication process for the receiver, the assignment of DRM access to the document/file, the ALERT sent to the Sender, the displaying or playing of the DRM file, and the monitoring of the document to ensure compliance with the DRM permissions, according to an embodiment of the invention.

Figure 30:
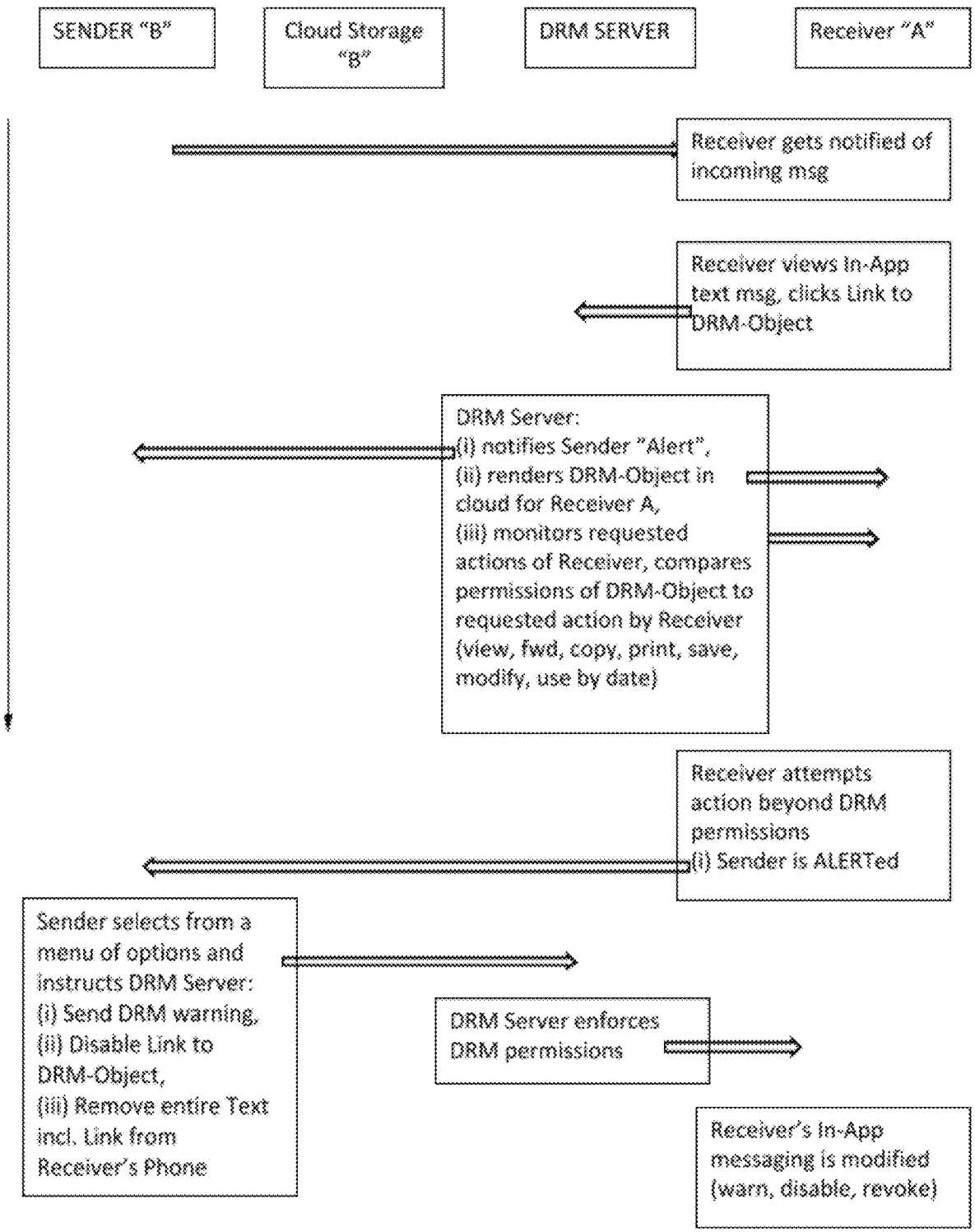
FIG. 30 is a flowchart showing an example of steps in one preferred process, especially the encryption/decryption in the authentication process for the recipient/receiver, the assignment of DRM access to the document/file, the ALERT sent to the Sender, the displaying or playing of the DRM file, the monitoring of the document to ensure compliance with the DRM permissions, the system reaction when a DRM violation is detected, the options provided to the Sender, and the consequences of a DRM violation to the Recipient, according to an embodiment of the invention.

FIG. 30 is a flowchart showing an example of steps in one preferred process, especially the encryption/decryption in the authentication process for the receiver, the assignment of DRM access to the document/file, the ALERT sent to the Sender, the displaying or playing of the DRM file, the monitoring of the document to ensure compliance with the DRM permissions, the system reaction when a DRM violation is detected, the options provided to the Sender, and the consequences of a DRM violation to the Recipient, according to an embodiment of the invention.

Figure 31:
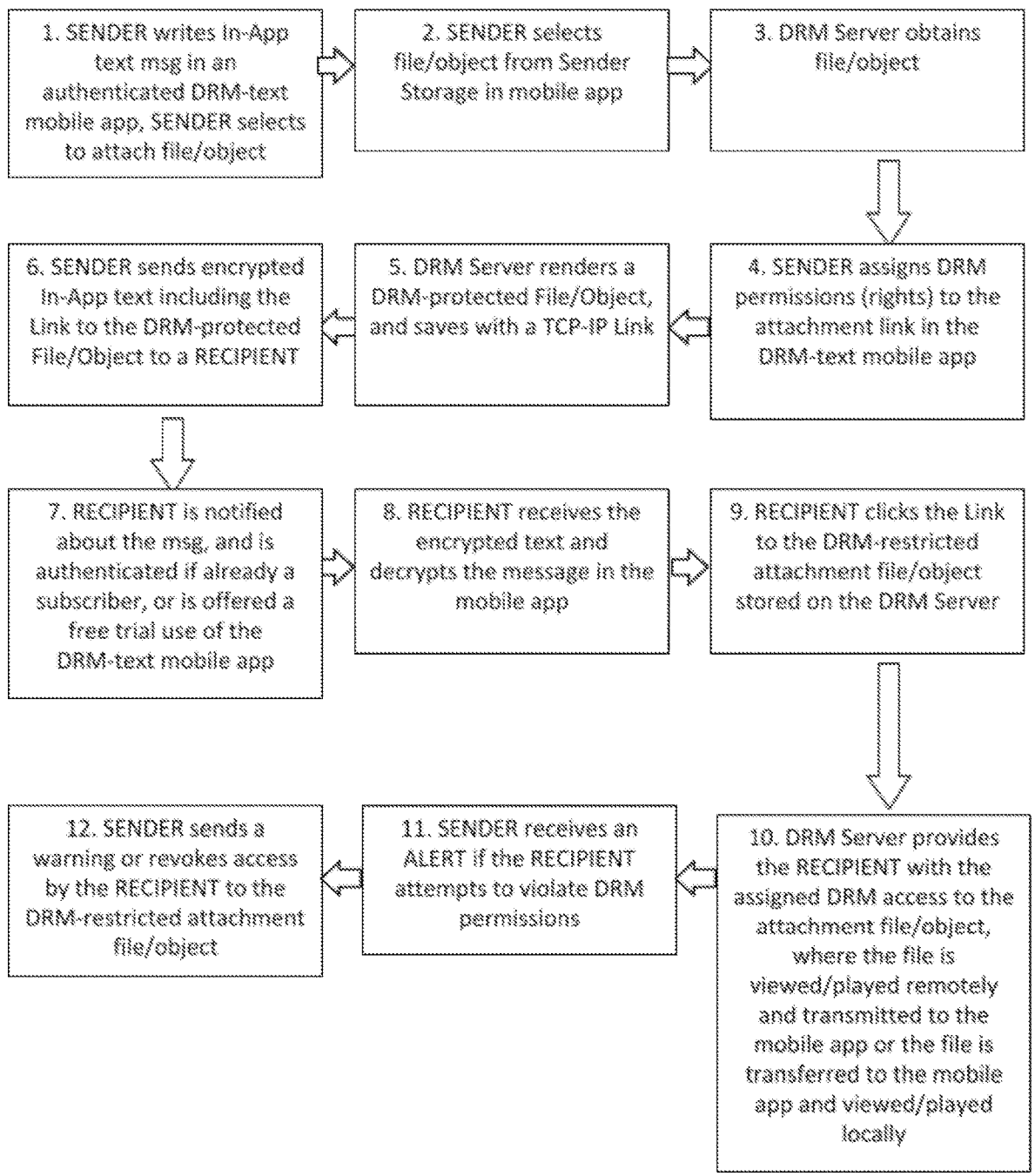
FIG. 31 is a flowchart showing an example of steps in one preferred process, according to an embodiment of the invention.

FIG. 31 is a flowchart showing an example of steps in one preferred process, according to an embodiment of the invention.

1. SENDER writes text msg in an authenticated DRM-text mobile app, SENDER selects to attach file/object.
2. SENDER selects file/object from Sender Storage in mobile app.
3. DRM Server obtains file/object.
4. SENDER assigns DRM permissions (rights) to the attachment link in the DRM-text mobile app.
5. DRM Server renders a DRM-protected File/Object, and saves with a TCP-IP Link.
6. SENDER sends encrypted SMS text including the Link to the DRM-protected File/Object to a RECIPIENT.
7. RECIPIENT is notified about the msg, and is authenticated if already a subscriber, or is offered a free trial use of the DRM-text mobile app.
8. RECIPIENT receives the encrypted text and decrypts the message in the mobile app.
9. RECIPIENT clicks the Link to the DRM-restricted attachment file/object stored on the DRM Server.
10. DRM Server provides the RECIPIENT with the assigned DRM access to the attachment file/object, where the file is viewed/played remotely and transmitted to the mobile app or the file is transferred to the mobile app and viewed/played locally.
11. SENDER receives an ALERT if the RECIPIENT attempts to violate DRM permissions.
12. SENDER sends a warning or revokes access by the RECIPIENT to the DRM-restricted attachment file/object.

The embodiments described herein are also directed to methods related to the secure text messaging and object sharing mobile application and system, including methods for connecting two mobile apps via a P2P network, methods for protecting a text message attachment, methods for providing a DRM server dedicated to the secure text messaging and object sharing mobile applications, methods of selecting DRM rights and restrictions from a menu of DRM rights and restrictions, methods of selecting encryption from a menu of encryption choices, methods of providing sender monitoring of compliance by the receiver of the text of the DRM protected attachments, methods of sending a warning or communication to a receiver of a text message concerning the DRM compliance, methods of revoking DRM rights by the sender, methods of removing a DRM protected and encrypted text message or attachment from a conversation with the receiver, and so forth.

Although the present disclosure may provide a sequence of steps, it is understood that in some embodiments, additional steps may be added, described steps may be omitted, and the like. Additionally, the described sequence of steps may be performed in any suitable order.

In one preferred embodiment, the invention includes a method of assigning and enforcing DRM permissions from a menu of DRM permissions in the system described and claimed herein, comprising the steps:

STEP 1: generating in said DRM Mobile Messaging App of the first mobile communication device an electronic messaging object;

STEP 2: transmitting the electronic messaging object, encrypted in transit, to the DRM Cloud Server along with a selection of DRM permissions;

STEP 3: assigning, in the DRM permissions module of said DRM Cloud Server, a DRM restriction on the electronic messaging object sent to the DRM Cloud Server;

STEP 4: saving the DRM restricted electronic messaging object in storage on the DRM Cloud Server;

STEP 5: rendering, by a DRM Rendering module, an HTML link to the DRM restricted electronic messaging object;

STEP 6: forwarding the HTML link, encrypted in transit, to the DRM Mobile Messaging App of the second mobile communication device;

STEP 7: processing, by the DRM Enforcement module, DRM permissions on the HTML link transmitted to the second mobile communication device;

STEP 8: sending an Alert, by the DRM Enforcement module of the DRM Mobile Messaging App, encrypted in transit, to the DRM Cloud Server when a DRM permissions violation is detected;

STEP 9: forwarding the Alert, by the TCP-IP communication module of said DRM Cloud Server, encrypted in transit, to a DRM Mobile Messaging App that assigned DRM permissions;

STEP 10: sending an enforcement command by the DRM Enforcement module of said DRM Mobile Messaging App, encrypted in transit, to the DRM Cloud Server; and STEP 11: enforcing DRM permissions, by disabling the URL link to the HTML file.

Figure 32:
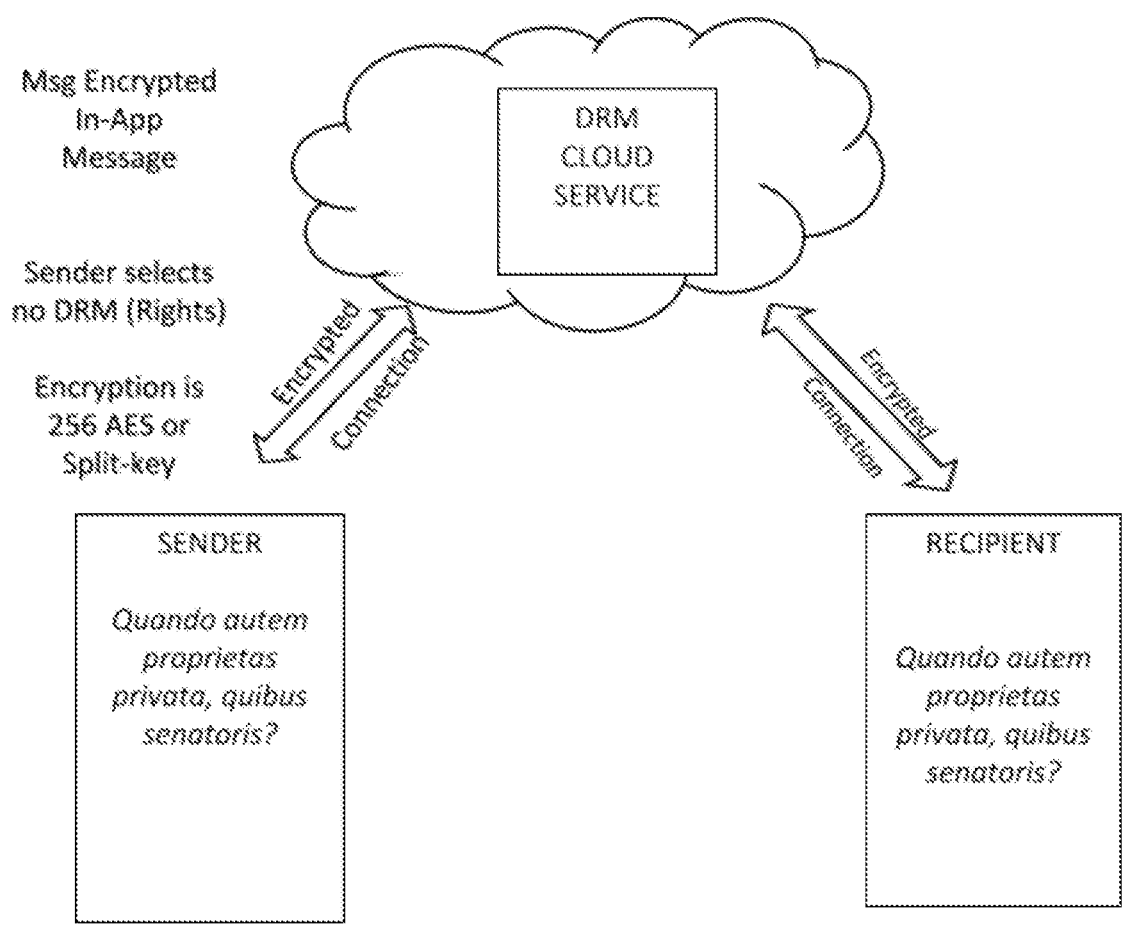
FIG. 32 is a schematic diagram of the invention as a Mobile Text App and Cloud Service system for sending an encrypted SMS message, according to an embodiment of the invention.

FIG. 32 is a schematic diagram of the invention as a Mobile Text App and Cloud Service system for sending an encrypted SMS message. FIG. 32 shows a DRM Cloud Service in encrypted communication with a Sender mobile device having a mobile text app and a Receiver mobile device having a mobile text app. The mobile devices send encrypted SMS messages using an SMS network. Where no DRM is selected, and no 256 AES or split key encryption is provided, simply sending a text in this fashion represents the state of the art.

Figure 33:
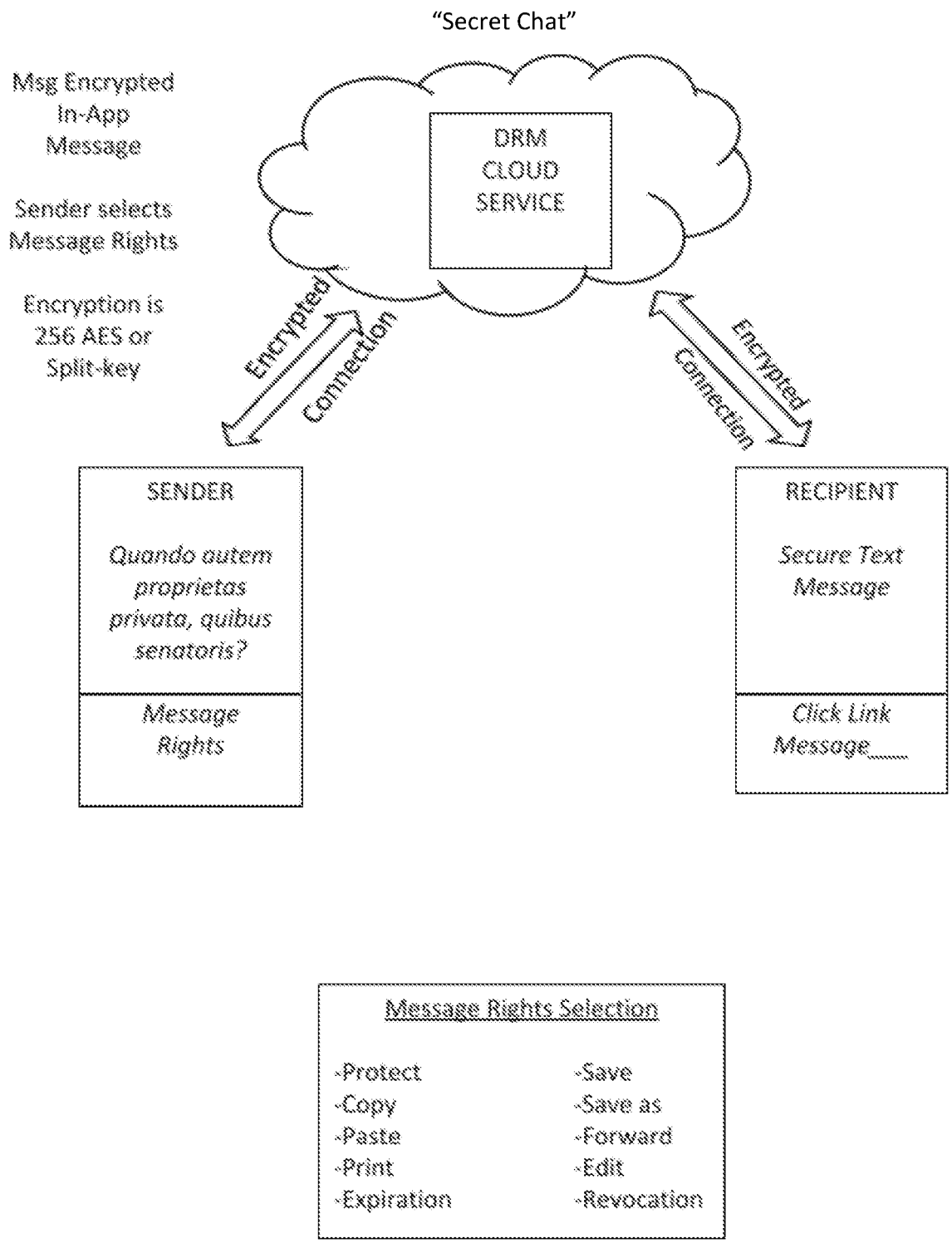
FIG. 33 is a schematic diagram of the invention as a Mobile Text App and Cloud Service system for providing a secret chat service, according to an embodiment of the invention.

FIG. 33 is a schematic diagram of the invention as a Mobile Text App and Cloud Service system for providing a secret chat service. FIG. 33 shows a DRM Cloud Service in encrypted communication with a Sender mobile device having a mobile text app and a Receiver mobile device having a mobile text app. The mobile devices send encrypted SMS messages using an SMS network. In this example, the message is restricted with specific message rights. These rights include, without limitation, permission or restrictions on the ability for the text message to: protect, copy, paste, print, expire, save, save as, forward, edit, and revoke.

In use, FIG. 33 shows that a Sender will compose a text message. The Sender will then choose message rights from a menu. The message is then sent, encrypted in transit, to the DRM Cloud Service, where the message has the message rights added to the text message file. The newly created DRM-text message is temporarily stored within the DRM Cloud Service, a link is created, and the link is sent back to the Sender's mobile device into the mobile text app of the invention. The link-only text message is then sent over the SMS network, encrypted in transit, to a Receiver's mobile device. The Receiver may already be a subscriber to the DRM Cloud Service or, if not, is invited to download a free install to set up a free account, in order to receive the link-only text message, and be able to click open and consume the linked text message from the Sender that is stored on the DRM Cloud Service. In this example, both the DRM-mobile device and the mobile-to-mobile connections are encrypted, and can be 256 AES or split key encryption.

Figure 34:
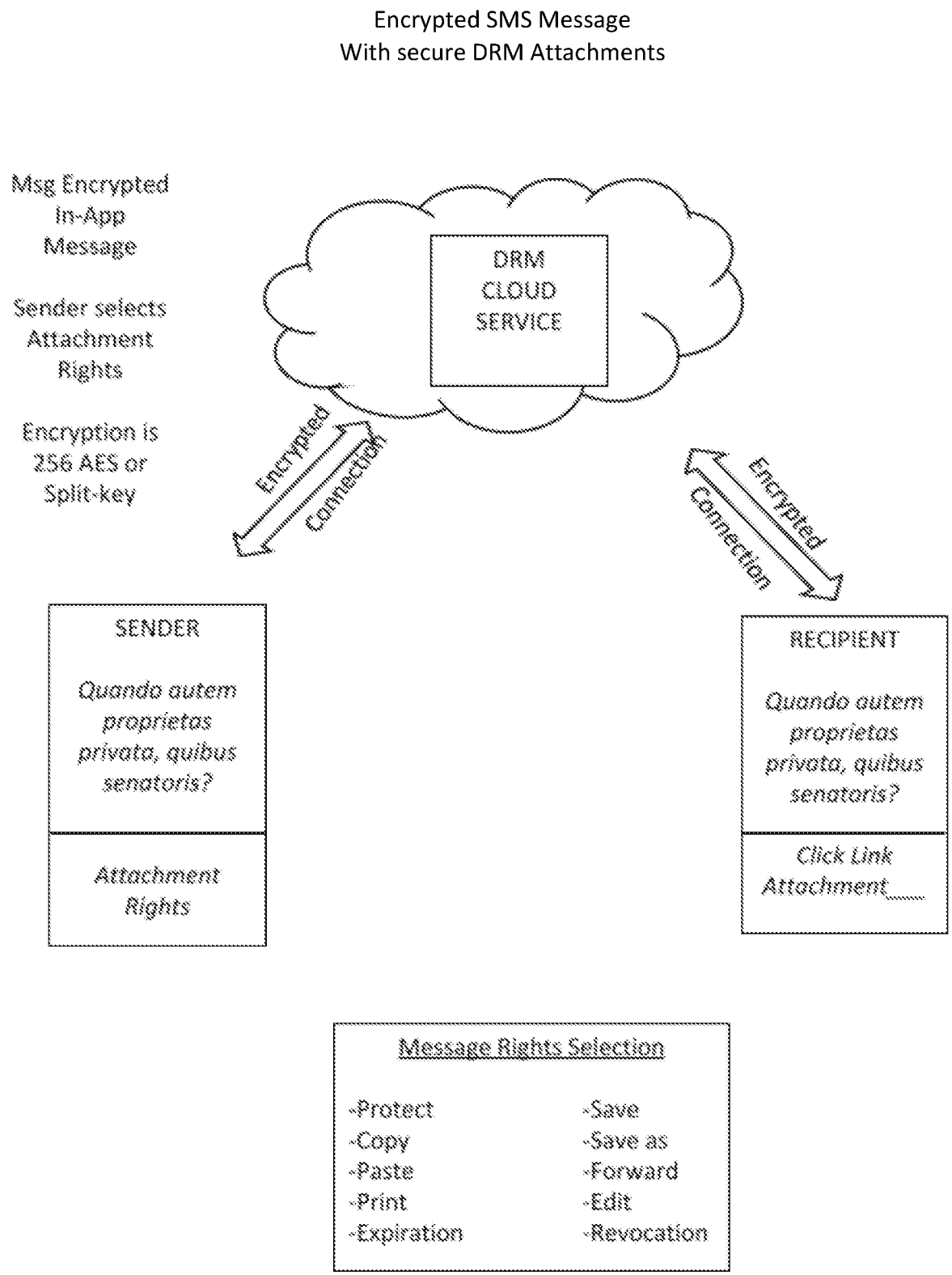
FIG. 34 is a schematic diagram of the invention as a Mobile Text App and Cloud Service system for sending an encrypted SMS message with secure DRM file attachments, according to an embodiment of the invention.

FIG. 34 is a schematic diagram of the invention as an Mobile Text App and Cloud Service system for sending an encrypted SMS message with secure DRM file attachments. FIG. 34 shows a DRM Cloud Service in encrypted communication with a Sender mobile device having a mobile text app and a Receiver mobile device having a mobile text app. The mobile devices send encrypted SMS messages using an SMS network. In this example, the message is sent with encryption and the attachment (object) is restricted with specific message rights. These rights include, without limitation, permission or restrictions on the ability for the attachment to be: protected, copied, pasted, printed, expired, saved, saved as, forwarded, edited, and revoked.

In use, FIG. 34 shows that a Sender will compose a text message. The Sender will then choose a file attachment (object) to be sent with the text message. The Sender will then choose object rights from a menu. A file attachment command is sent, encrypted in transit, to the DRM Cloud Service, where the DRM Cloud Service is instructed to obtain the file. The file attachment can be an MS Word document, a PDF, a spreadsheet, a presentation file, an image/photo, an email message, an attachment from an email message, a video, an audio file, and so forth. The DRM Cloud Service assigns the object rights to the retrieved or uploaded file attachment. The newly created DRM-object is temporarily stored within the DRM Cloud Service, a link is created, and the link is sent back to the Sender's mobile device into the mobile text app of the invention. The link-only text message is then sent over the SMS network, encrypted in transit, to a Receiver's mobile device. The Receiver may already be a subscriber to the DRM Cloud Service or, if not, is invited to download a free install to set up a free account, in order to receive the link-only text message, and be able to click open and consume the linked object from the Sender that is stored on the DRM Cloud Service. In this example, both the DRM-mobile device and the mobile-to-mobile connections are encrypted, and can be 256 AES or split key encryption.

Figure 35:
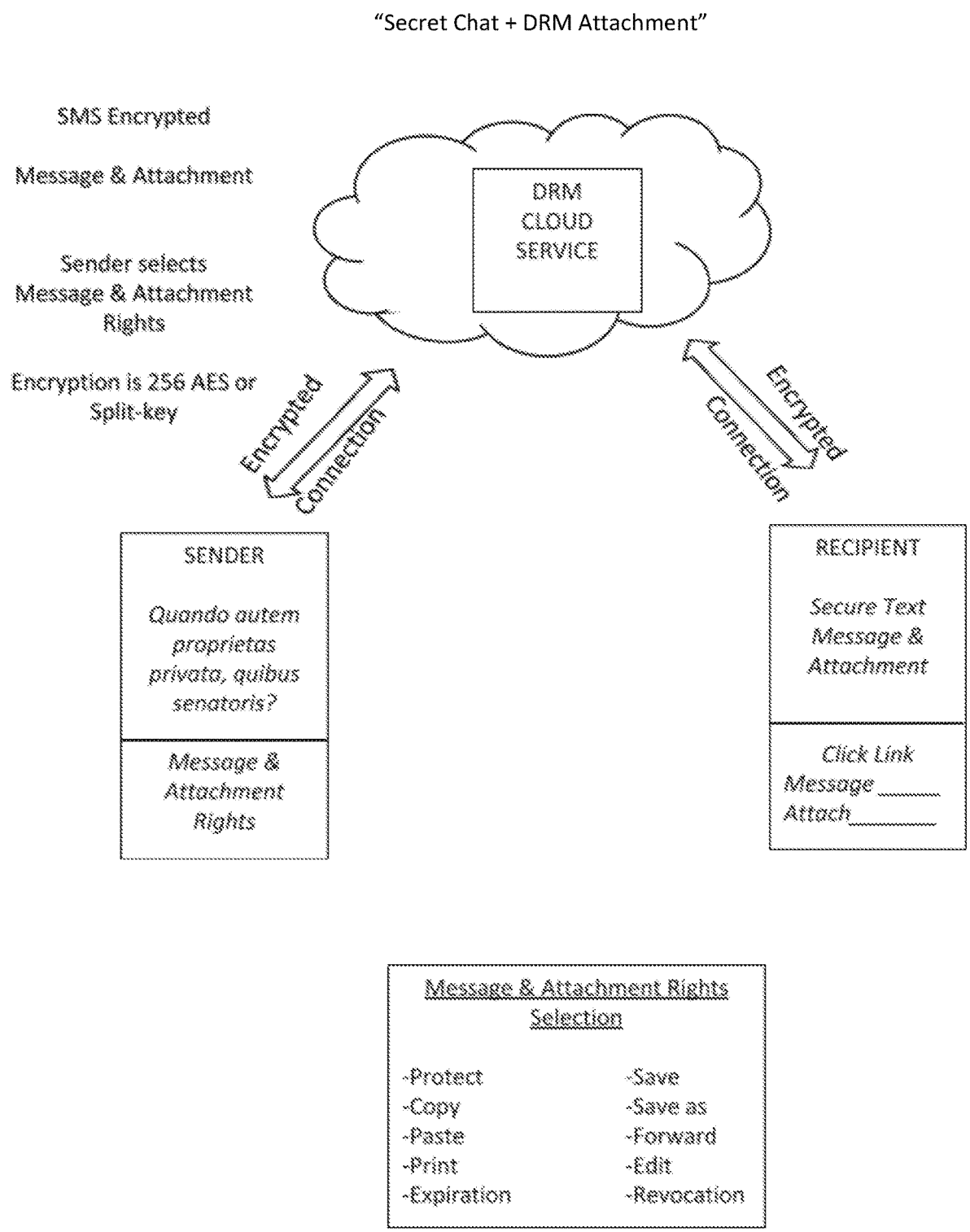
FIG. 35 is a schematic diagram of the invention as a Mobile Text App and Cloud Service system for providing a secret chat service with transfer of DRM attachments, according to an embodiment of the invention.

FIG. 35 is a schematic diagram of the invention as an Mobile Text App and Cloud Service system for providing a secret chat service with transfer of DRM attachments. FIG. 35 shows a DRM Cloud Service in encrypted communication with a Sender mobile device having a mobile text app and a Receiver mobile device having a mobile text app. The mobile devices send encrypted SMS messages using an SMS network. In this example, both the message and the attachment (object) are restricted with specific message rights. These rights include, without limitation, permission or restrictions on the ability for the text message and the attachment to be: protected, copied, pasted, printed, expired, saved, saved as, forwarded, edited, and revoked.

In use, FIG. 35 shows that a Sender will compose a text message. The Sender will then choose a file attachment (object) to be sent with the text message. The Sender will then choose message rights and object rights from a menu. A file attachment command is sent, encrypted in transit, to the DRM Cloud Service, where the DRM Cloud Service is instructed to obtain the file. The file attachment can be an MS Word document, a PDF, a spreadsheet, a presentation file, an image/photo, an email message, an attachment from an email message, a video, an audio file, and so forth. The DRM Cloud Service assigns the message rights to the text message and the object rights to the retrieved or uploaded file attachment. The newly created DRM-message+object is temporarily stored within the DRM Cloud Service, a link is created, and the link is sent back to the Sender's mobile device into the mobile text app of the invention. The link-only text message is then sent over the SMS network, encrypted in transit, to a Receiver's mobile device. The Receiver may already be a subscriber to the DRM Cloud Service or, if not, is invited to download a free install to set up a free account, in order to receive the link-only text message, and be able to click open and consume the linked DRM-message+object from the Sender that is stored on the DRM Cloud Service. In this example, both the DRM-mobile device and the mobile-to-mobile connections are encrypted, and can be 256 AES or split key encryption.

Figure 36:
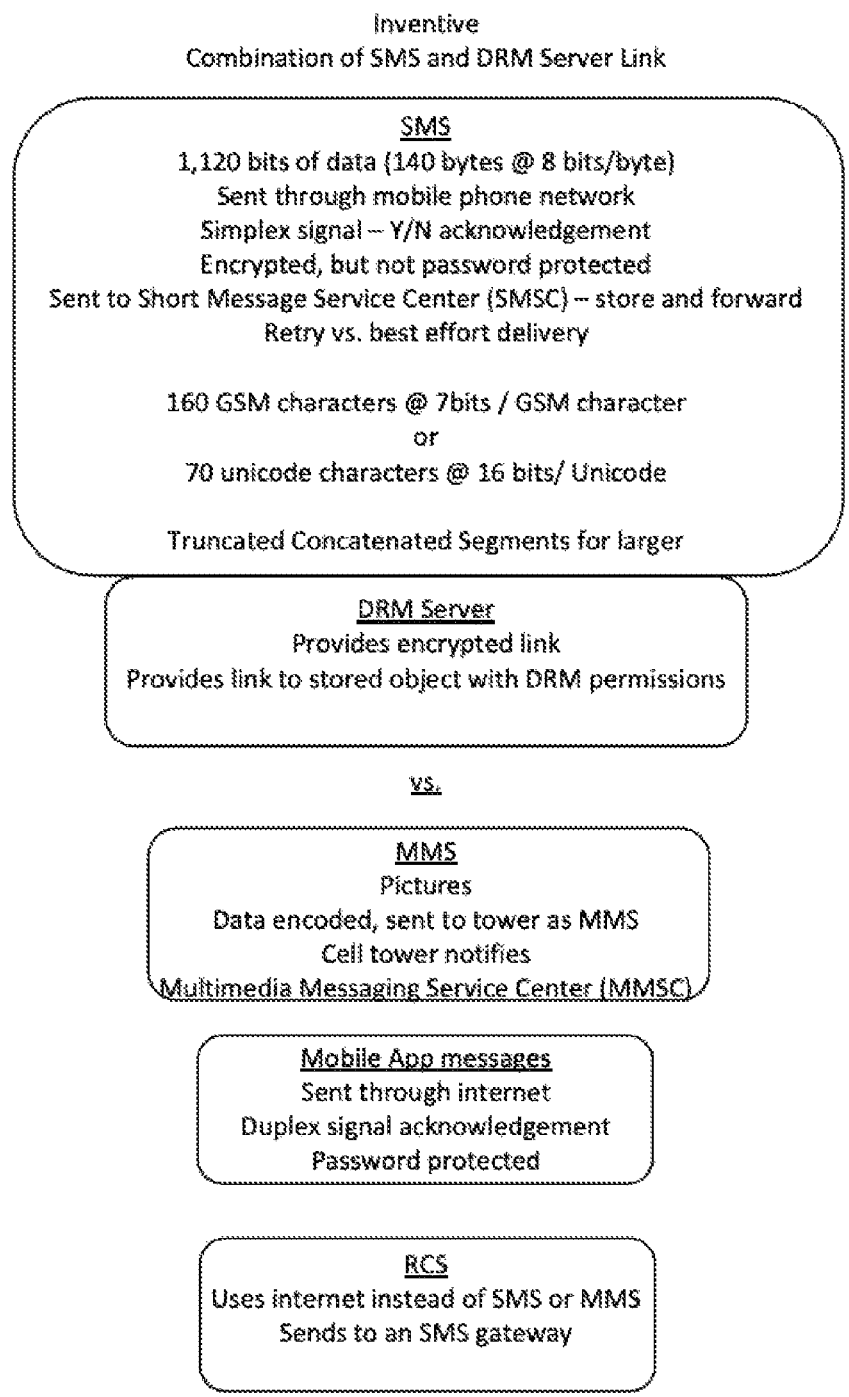
FIG. 36 is a schematic diagram illustrating various modes of messaging and the combination provided by the inventive subject matter described herein, according to an embodiment of the invention.

FIG. 36 is a schematic diagram illustrating various modes of messaging and the combination provided by the inventive subject matter described herein.

As shown in FIG. 36, SMS or Short Message Service is defined as using 1,120 bits of data (140 bytes @ 8 bits/byte). SMS is sent through mobile phone network and uses a simplex signal—Y/N acknowledgement. SMS is not password protected. SMS messages are sent to a Short Message Service Center (SMSC) as part of a store and forward service. SMS can be a send and retry process if the message does not immediately go through, or SMS can be configured as a send using best efforts delivery service without requiring delivery confirmation.

SMS message are composed of 160 GSM characters @ 7 bits/GSM character, or may also be composed as a message having 70 unicode characters @ 16 bits/Unicode. Messages larger are broken into segments and are truncated, or Concatenated.

As shown in FIG. 36, the DRM Server provides an encrypted link to each device and provides an embedded link to one or more stored objects that have been modified with DRM permissions and stored temporarily in the DRM server.

In contrast, traditional MMS was built for sending pictures but does not have DRM capability. In MMS, the data is encoded, and sent to a cell tower as MMS. The cell tower recognizes the MMS message and notifies the Multimedia Messaging Service Center (MMSC) for transport.

Also, in contrast to the inventive subject matter, traditional Mobile App messages are sent through the internet but do not have DRM capability. Mobile apps are able to use duplex signaling for signal acknowledgement and can be password protected.

Also, in contrast to the inventive subject matter, RCS messaging uses internet instead of SMS or MMS. RCS sends to an SMS gateway connected to the internet.

Figure 37:
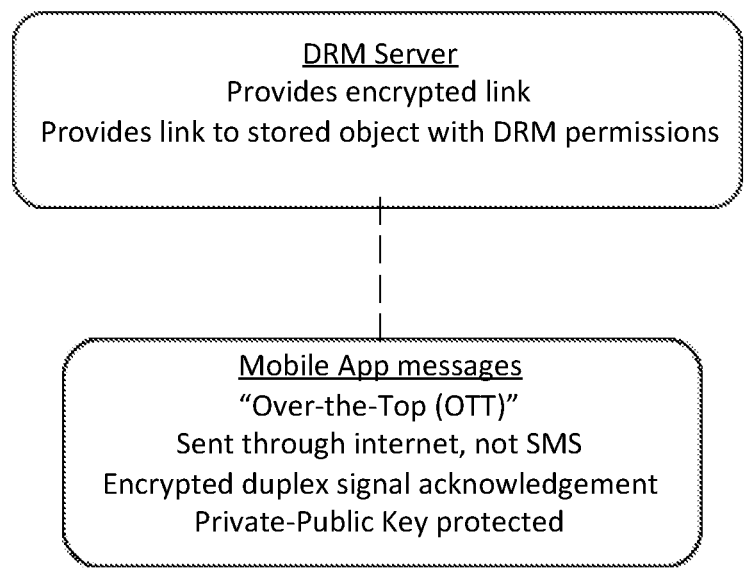
FIG. 37 is a diagram illustrating an SMS frame or protocol description unit containing the ink to the DRM object, according to an embodiment of the invention.

FIG. 37 is a diagram illustrating an SMS frame or protocol description unit containing the ink to the DRM object. FIG. 37 shows that SMS Protocol Description Unit (PDU) is composed of subcomponent segments consisting typically of: Length of SMC, Type of SMC, Delivery Code, Length of Address, Type of Sender Address, Sender Number, Protocol ID, Data encoding scheme, Time stamp, SMS length, and the SMS message which includes the text of the message, if any, e.g. "you've received a secure message" as well as a link to a secure message and a link to a DRM-modified object.

FIG. 38 is a diagram illustrating industries that depend on secure, private message and document sharing in relation to the compliance requirements of federal laws that require secure, private messaging and document sharing.

FIG. 38 shows a list of exemplary industries that depending on Secure, Private Messaging and Document Sharing, including: BANKING, FINANCIAL, MEDICAL, RETAILER, AIRLINE, TSA BORDER CONTROL, SOCIAL SECURITY, LAW ENFORCEMENT, MILITARY COMMUNICATIONS, INSURANCE, etc.

FIG. 38 also shows an exemplary list of Federal Laws requiring Secure, Private Messaging and Document Sharing, including:

Telephone Consumer Protection Act (TCPA) 47 USC 227—regulates SMS Marketing

CAN-SPAM Act—protects vs. unwanted spam messages and calls

Gramm Leach Bliley Act (GLBA) 15 USC 6802—protection of personal information by banks, insurance, financial services Fair Credit Reporting Act (FCRA) 15 USC 1681—protects credit reports, credit card information, credit fraud, comply with Payment Card Industry Data Security Standard (PCI-DSS)

Health Information Portability and Accountability Act (HIPAA) 29 USC 1181—protect health status, information, payment information Family Education Rights and Privacy Act (1-ERPA) 20 USC 1232—protects student records Drivers Privacy Protection Act (DPPA) 18 USC 2721—protects DMV information Children's Online Privacy Protection.

FIG. 39 is a diagram illustrating the compliance requirements of federal laws that require secure, private messaging and document sharing in relation to the DRM permissions available from the inventive subject matter on messaging and document sharing available to achieve compliance with those laws.

FIG. 39 shows how the inventive subject matter can be used to facilitate and ensure compliance with the various listed laws requiring secure private messaging and document sharing. FIG. 39 shows a list of how the invention can provide compliance with the transmission and safe-keeping of valuable information for the following laws, including:

(TCPA) compliant—DRM can be used to restrict SMS Marketing,

CAN-SPAM Act compliant—DRM can be used to restrict spam, (GLBA) compliant—DRM can be used to restrict access and abuse of personal financial information, (FCRA) compliant—DRM can be used to protect credit reports, credit card information, (PCI-DSS), (HIPAA) compliant—DRM can be used to protect health status, information, payment information, (1-ERPA) compliant—DRM can be used to protect student records, (DPPA) compliant—DRM can be used to protect DMV information, (COPPA) compliant—DRM can be used to protect against collection of a child's personal information, (VPPA) compliant compliant—DRM can be used to protect against online theft, (CCPA) compliant—DRM can be used to protect subscriber privacy, (CCPA) compliant—DRM can be used to protect personal information, (CFAA) compliant—DRM can be used to prohibit unauthorized computer use, (ECPA) compliant—DRM can be used to prohibit intercepted communications SOX compliant—DRM can be used to enforce protection of cybersecurity credentials, and DFAR compliant—DRM can be used to protect unauthorized dissemination of information valuable to the U.S. Department of Defense, including communications with DoD contractors, DoD personnel, and communications required to be shared outside of DoD with agencies and parties having varying security clearances.

As used herein the term "Block Chain" or "Block Chain technology" refers to a secure, decentralized, distributed, and oftentimes public, digital ledger that is used to record transactions across many computers so that any involved record cannot be altered retroactively, without the alteration of all subsequent blocks. A "Block" refers to digital information that includes one or more transactions, each transaction typically including the date, time, a payload, and a digital signature. Each Block is typically 1 MB, and so can contain many transactions. A "Chain" refers to a stacked series of Blocks, attached in chronological order, with each Block identified by it's own number as well as the number of the preceding Block. Thus, for example, a recent Block might be named 615,401/615,400, and the one before it would be named 615,400/615,399. In this way, the chain cannot be tampered with and the data is secure. Additionally, a copy of the ledger of all blocks is synchronized and kept by all parties. Thus, no single party can alter the chain unless it is approved by a consensus of the users. The term "transaction" refers to the date, time, payload, and ID, with the ID typically being a public key in a public-private key system. This information is then run through a hashing algorithm that generates the information as an alpha-numeric string. For example, in a Secure Hashing Algorithm (SHA) version 256 (SHA-256), the file contents are coded into a 256-bit length alpha-numeric string, where the string is typically 64-characters in length. Generating this string is a one-way process used to create a tool that can verify that the file contains what it purports to contain. Thus, when a Block Chain system hashes a block, it can verify that the strings are either identical and verified, or that they are different and thus corrupt. When Block Chain is used for cryptocurrency, the payload is the amount of funds to transfer. When Block Chain is used for other applications, the payload can be a link, a document, an image, etc.

Figure 40:
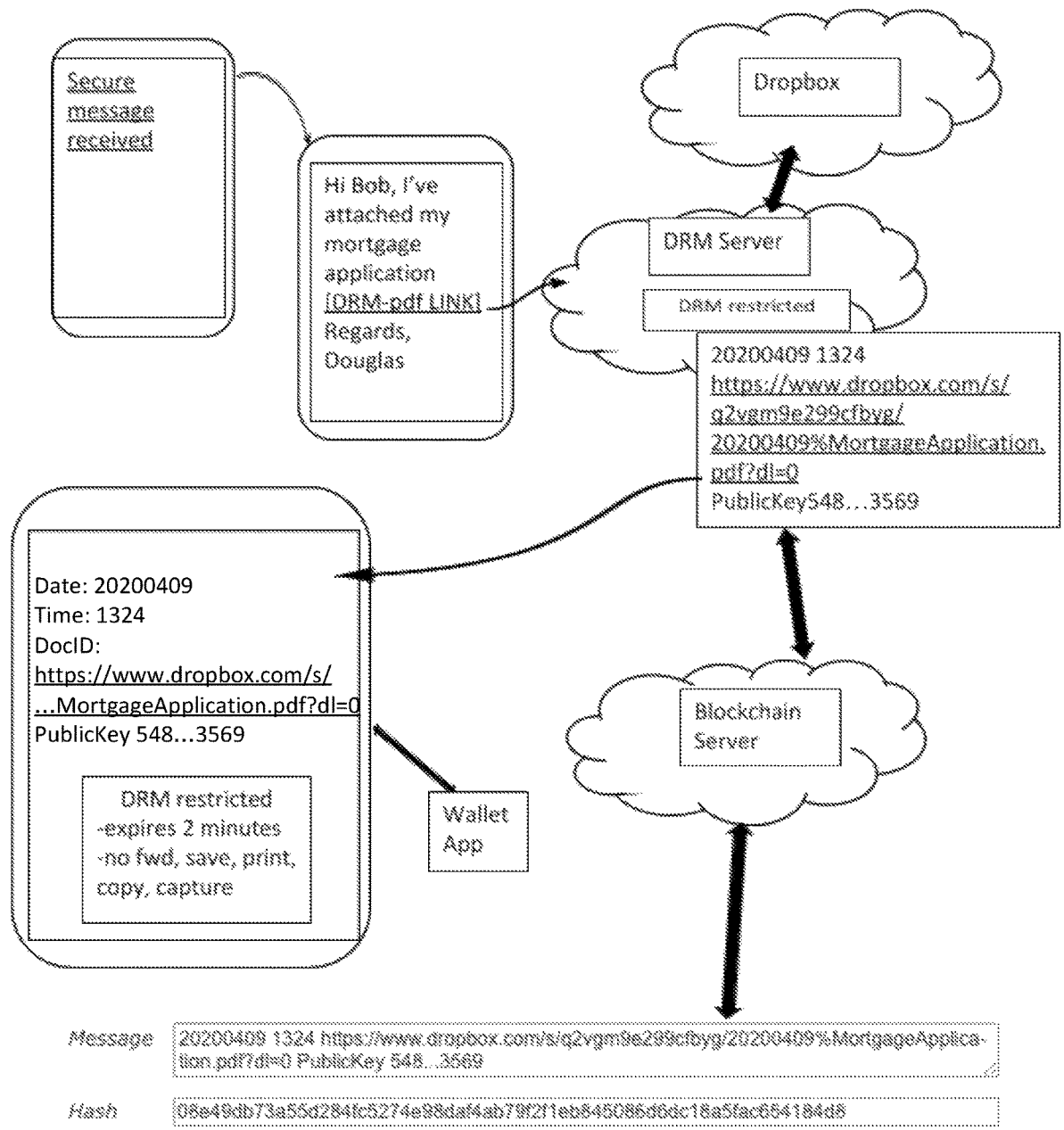
FIG. 40 is a diagram illustrating use of the inventive subject matter to facilitate blockchain access to sensitive documents or files, according to an embodiment of the invention.

Referring now to FIG. 40. FIG. 40 is a diagram illustrating use of the inventive subject matter to facilitate blockchain access to sensitive documents or files. FIG. 40 shows how a recipient can receive an encrypted SMS containing a generic notice that a Secure message has been received. When the recipient clicks the link, the mobile app requests delivery of encrypted SMS text message. The message can contain, as illustrated, a link to a sensitive document or object, such as a mortgage application.

Other sensitive documents may include, without limitation, an eBook, music, video, a stock certificate, a stock order/transaction request, a bond certificate, a bond order/transaction request, a bank transaction, a health or medical record, a property record or title, a smart contract, a country of origin authentication for a supply chain verification, a sensitive government document, a government contract document, a student record, an insurance document, a retail coupon, rebate, or receipt, a gift card, and so forth.

FIG. 40 shows how the sensitive document may be located in a separate server, such as a Dropbox storage, and that the sender has chosen to apply DRM restrictions to the sensitive document thus establishing a DRM-document and a DRM server link. FIG. 40 shows how the DRM server link may be incorporated into a Block Chain transaction as part of a Block transaction payload and may include a date, time, and a user ID. In this non-limiting example, the user ID is a public key.

FIG. 40 then shows that the Block Chain transaction is transmitted to the recipient, along with a legend showing that the transaction file is DRM protected. When the DRM Server technology of the present invention is used in conjunction with Block Chain technology, the DRM Server may be programmed to hash the Block containing the transaction to verify the transaction. FIG. 40 shows that the text and link within the transaction file can be hashed to obtain the string ending in . . . 184d8.

In the example shown in FIG. 40, when the recipient receives the Block Chain transaction file, the DRM restrictions (chosen by the sender) requires action within a period of 2 minutes, and that the file may not be forwarded, saved, printed, copied, or captured. The recipient would then use their Wallet App for this transaction to receive the verified sensitive document. In this way, the present invention can be used in combination with Block Chain technology to secure and control the communication of the Block Chain transaction data. In addition, since the DRM Server maintains control of link to the file, if a DRM violation occurs, such as tampering or forwarding the transaction file, the Alert that is generated and sent to the Sender, can allow the Sender to revoke the link and cancel the access to the transaction file.

Figure 41:
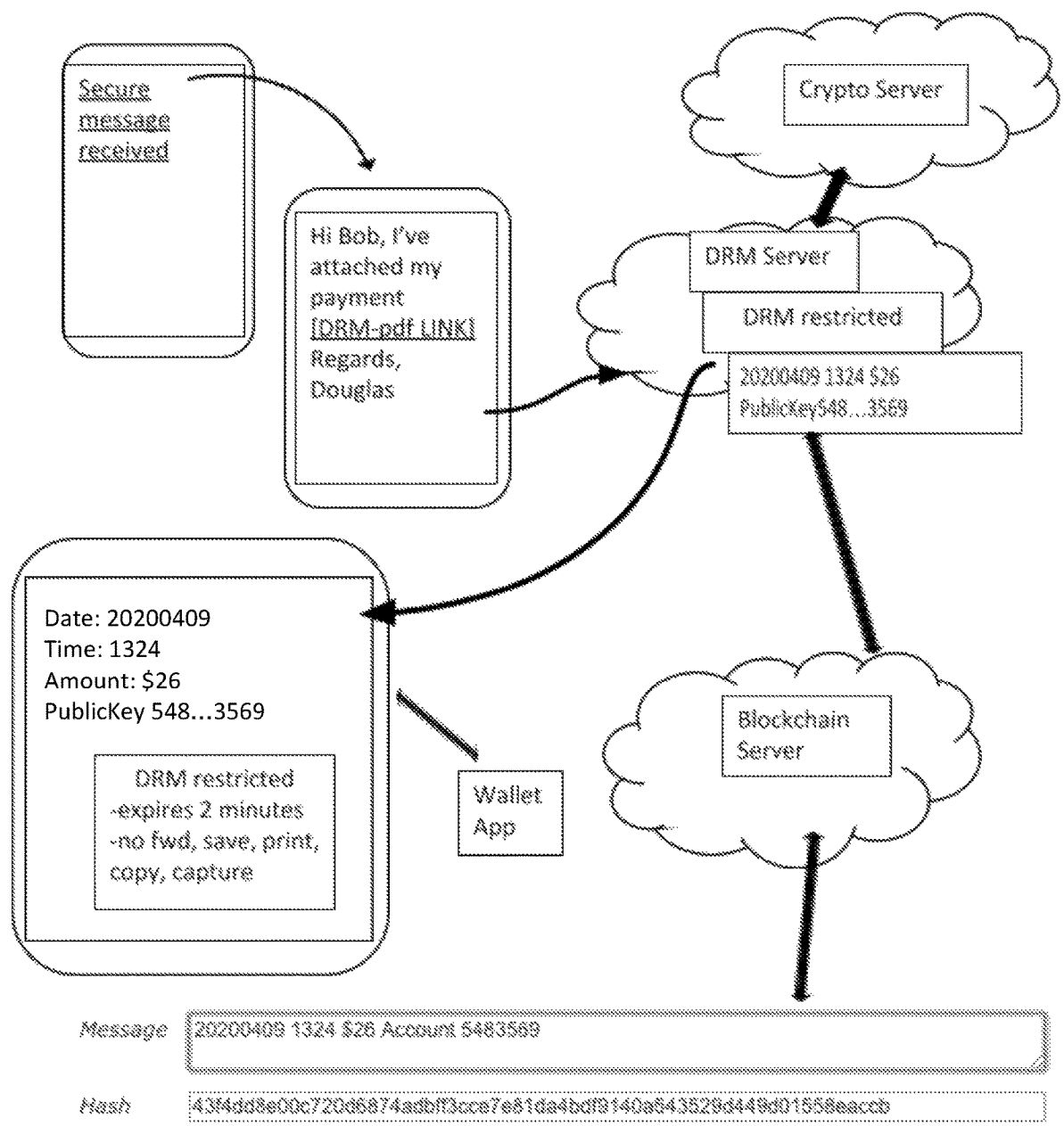
FIG. 41 is a diagram illustrating use of the inventive subject matter to facilitate blockchain access to payment information, according to an embodiment of the invention.

Referring now to FIG. 41, FIG. 26 is a diagram illustrating use of the inventive subject matter to facilitate blockchain access to payment information. FIG. 41 shows how a recipient can receive an encrypted SMS containing a generic notice that a Secure message has been received. When the recipient clicks the link, the mobile app requests delivery of encrypted SMS text message. The message can contain, as illustrated, a link to a transaction file.

Transaction files may include transaction information for BitCoin, Ethereum, XRP, Tether, Bitcoin Cash, as well as any of the other 200+ cryptocurrencies available, see e.g. https://coinmarketcap.com/all/views/all/.

FIG. 41 shows how the cryptocurrency transaction information may be located in a separate server, and that the sender has chosen to apply DRM restrictions to the transaction file thus establishing a DRM-transaction document. FIG. 41 shows how the DRM-transaction payload may include a date, time, amount and a user ID. In this non-limiting example, the user ID is a public key.

FIG. 41 then shows that the Block Chain transaction is transmitted to the recipient, along with a legend showing that the transaction file is DRM protected. When the DRM Server technology of the present invention is used in conjunction with Block Chain technology, the DRM Server may be programmed to hash the Block containing the transaction to verify the transaction. FIG. 41 shows that the text and link within the transaction file can be hashed to obtain the string ending in . . . 8eaccb.

In the example shown in FIG. 41, when the recipient receives the Block Chain transaction file, the DRM restrictions (chosen by the sender) requires action within a period of 2 minutes, and that the file may not be forwarded, saved, printed, copied, or captured. The recipient would then use their Wallet App for this transaction to receive the verified transaction (funds). In this way, the present invention can be used in combination with Block Chain technology to secure and control the communication of the Block Chain transaction data. In addition, since the DRM Server maintains control of link to the file, if a DRM violation occurs, such as tampering or forwarding the transaction file, the Alert that is generated and sent to the Sender, can allow the Sender to revoke the link and cancel the access to the transaction file.

Figure 42:
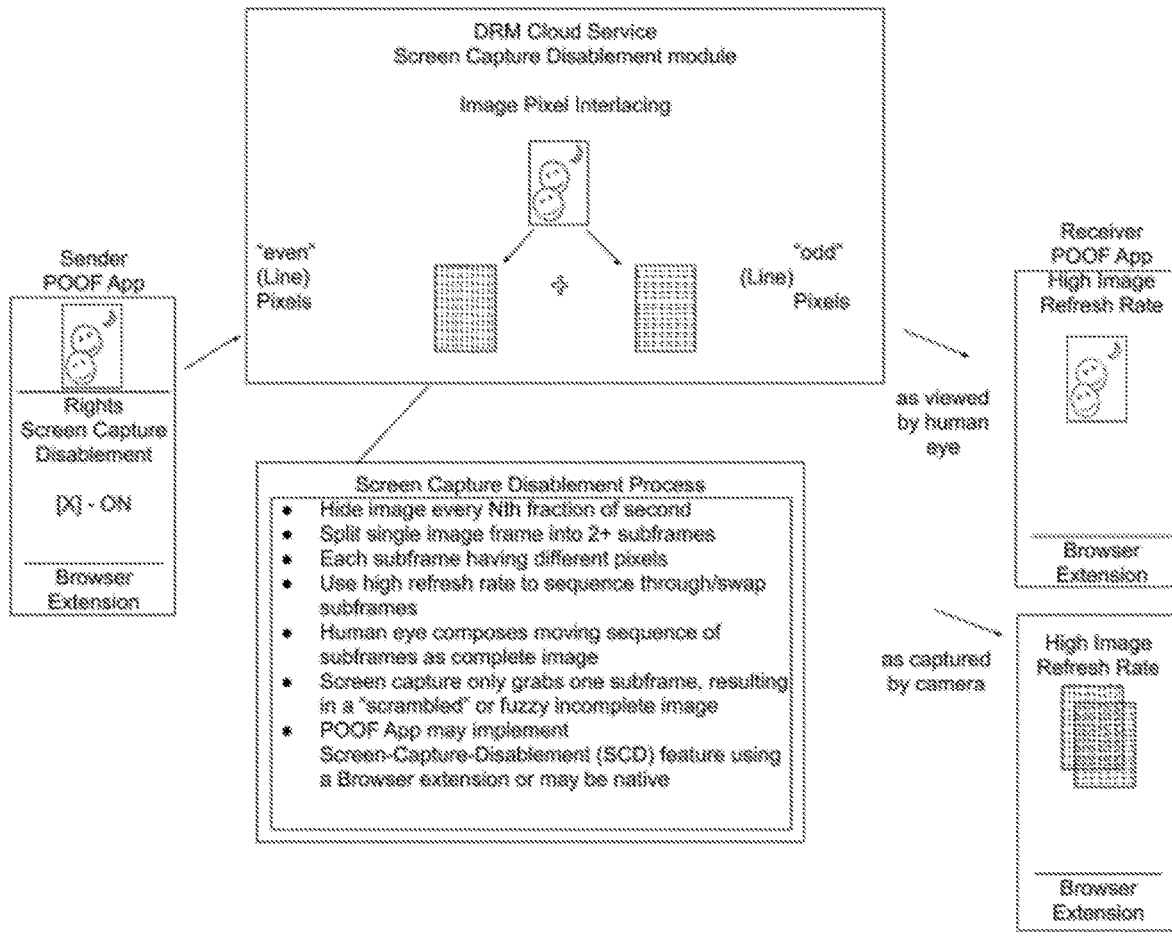
FIG. 42 is a schematic diagram illustrating a screen capture disablement module for use on Android, iOS, and other mobile devices, according to an embodiment of the invention.

FIG. 42 is a schematic diagram illustrating a screen capture disablement (SCD) module for use on Android, iOS, and other mobile devices, according to an embodiment of the invention. FIG. 42 shows how the DRM Cloud Service receives in a non-limiting embodiment a photo from a Sender mobile device having the DRM (Poof) App installed thereon. The Sender has selected that the screen capture disablement function is "on", or operational. FIG. 42 shows that when DRM Server receives the request to transfer the photo from the Sender to the Receiver along with the Rights selection of having the screen capture function of the receiving device disabled, the DRM Server splits the image (frame) into two or more subframes. The image frame is split by identifying the pixels that make up the photo as-sent, and then dividing the pixels into two or more subframes. For example, an eight (8) megapixel photo will consist of a grid of about 3266×2450 pixels. In order to make a photo look blurry, the image will generally need to have a resolution of about 150 pixels per inch (PPI) or less. Thus, to make a 1"×1" photo look blurry, the image, 3266/150 height and 2450/150 width, will need to be sampled or compressed by 1/22 in height and 1/16 in width. Thus, the SCD module splits the image that is uploaded to the DRM Server as a single frame into subframes. In a non-limiting example, an image can be split into two subframes, a first subframe that removes 21 of 22 horizontal pixel lines and a second subframe that removes 15 of 16 vertical pixel lines. By alternating the display of the first and second subframes at 30 Hz, the human eye can construct a complete image but a screen capture device will capture a blurry image. In some embodiments, the specific pixel lines that are chosen for removal can be dynamically presented from among a sequence of subframes. In another example, the SCD module can split the original into multiple subframes, each having only a specific geographic grid address such that any specific subframe will have entire subsections redacted and having zero pixels. Thus, at higher frame rates, 120-1000 Hz, a screen capture function will only capture a highly pixelated subframe. In some embodiments, the SCD module can split the frame into a first sampling subframe and one or more in-fill subframes of unequal sizes, in terms of number of pixels. The sampling subframe uses a sampling setting to ensure that the screen capture function of the receiver's device captures a blurry image while maintaining sufficient image quality to enable the human eye to process a clear image. Since the human eye can see an image as stable in a range from 30-1000 frames per second (fps)(Hz), sequencing of the subframes to construct a composite image is required to meet this range.

FIG. 43 is a schematic diagram illustrating the Text Message and Content Creation Reporting function of the Application. FIG. 43 shows a series of selection button in a menu of options, including a screen capture disablement selection button, an encrypt chat button, a secret chat button, a select Rights button, various Select (media) buttons— photo, video, audio, document, and a recover history information area. FIG. 43 shows how a text message can be co-created with an attached (or referred) photo or other content, along with menu selection items for DRM and encryption, and along with alert/notification settings.

Example—POOF Mobile App

POOF is platform agnostic. A user does not need to own the same brand of phone as the call recipient or be on a specific platform—the app works with iPhone, Android, and Windows phones. Like any other SMS messenger, you can initiate a conversation with an individual or a group.

In any preferred embodiment, the POOF mobile app allows a user to share location, broadcast status to contacts, share contacts, set customized wallpapers and notification alerts, email chat history, use the camera to shoot photos and videos from within the app, and simultaneously broadcast messages to multiple contacts. When logged in, the POOF app receives messages, and when not logged in, the POOF app saves recent messages for when you re-open the app.

POOF has a simple interface with chats in text boxes, a timestamp, and the POOF app has notifications when a recipient has viewed the text. POOF allows a user to establish a status message.

POOF can match people in a user's contact list who currently use the app, to avoid having to manually add contacts. POOF allows a user to invite people who don't have POOF account or who aren't in your contact list. POOF allows a user to create groups with up to 256 participants. POOF allows a user to block contacts within the app also. The POOF app allows a user to change the wallpaper background. POOF can interface with a user's GPS location for mapping.

POOF has a search function that allows a user to search by phone number, contact name, keyword, or group.

POOF has end-to-end encryption, just like Apple's iMessage and Signal. All text messages flowing through the platform are secured so that only the sender and the recipient can view them. POOF cannot read these messages. The app doesn't store your personal information, and only people you approve as contacts can message you. In a preferred embodiment, POOF uses two-factor authentication.

POOF provides a user with control over group messages, particularly who can add the user to groups.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

What is claimed is:

1. A method, comprising:

Assigning a digital rights management (DRM) restriction to an electronic messaging object associated with a first user to generate a DRM-modified electronic messaging object (DRM-MEMO), the electronic messaging object selected from a text message, a document, a photo, a video file, and an audio file, the DRM restriction selected by the first user from a DRM menu in a DRM Messaging application installed on a first user computing device, the DRM restriction selected from copy, save, print, forward, expire, revoke upon violation, disappear, edit, and modify, the electronic messaging object saved to memory associated with the first user computing device, the first user computing device in encrypted communication with a DRM Cloud Server, Server-side rendering the DRM-modified electronic messaging object on the DRM Cloud Server to produce an HTML file of the DRM-modified electronic messaging object, the HTML file saved to a storage location associated with the first user, Transmitting a URL link of the HTML file in an encrypted electronic message to a second user computing device of a second user, the second user computing device in encrypted communication with the DRM Cloud Server, the second user computing device having the DRM Messaging application installed, the URL link displayed within a message module of the DRM Messaging application of the second user computing device, Requesting the HTML file of the DRM-modified electronic messaging object from the DRM Cloud Server in response to the second user clicking the URL link, Displaying in a browser associated with the DRM Messaging application of the second user computing device the HTML file of the DRM-modified electronic messaging object, and Processing the DRM restriction on the electronic messaging object by monitoring the second user computing device, Sending an Alert by the DRM messaging application on the second user computing device to the DRM Cloud Server when a DRM restriction is violated, Forwarding the Alert from the DRM Cloud Server to the DRM Messaging application installed on the first user computing device, Sending an enforcement command from the DRM Messaging application installed on the first user computing device to the DRM Cloud Server, and Enforcing the DRM restriction by disabling the URL link to the HTML file when a DRM restriction is violated, wherein the first user computing device and the second user computing device each has a memory and a hardware processor, and programming instructions saved to the memory and executable on the hardware processor for performing the steps to the effect the DRM Messaging application, wherein the DRM Cloud Server has a memory and a hardware processor, and programming instructions saved to the memory and executable on the hardware processor for performing the steps to the effect the DRM Cloud Service.

2. The method of claim 1, wherein the encryption is split-key encryption.

3. The method of claim 1, wherein the DRM restriction is assigned to the electronic messaging object using XrML to insert a restrictive header into metadata of the electronic messaging object.

4. The method of claim 1, wherein the DRM Cloud Server stores the DRM-modified electronic messaging object on a decentralized cloud platform having a blockchain network auditing module and blockchain identity and security module.

5. The method of claim 4, wherein the DRM Cloud Server has a blockchain crypto payments module.

6. The method of claim 1, wherein the DRM Menu item for expire provides an timed expire option to disable the URL link to the HTML file after a period selected from the ranges of 1-30 days, 1-24 hours, and 1-60 minutes.

7. The method of claim 1, wherein the first user computing device and the second user computing device are each a mobile telephone, and wherein the DRM Messaging application is configured as a mobile telephone application.

8. The method of claim 1, wherein the DRM-restricted electronic messaging object is a specific file type with a specific DRM permission, selected from the group consisting of: a marketing file and a (TCPA) compliant DRM used to restrict SMS Marketing, a commercial message and a CAN-SPAM Act compliant DRM used to restrict spam, a financial record and a (GLBA) compliant DRM used to restrict access and abuse of personal financial information, a credit record and a (FCRA) compliant DRM used to protect credit reports, credit card information, (PCI-DSS), a health record and a (HIPAA) compliant DRM used to protect health status, information, payment information, a student record and a (FERPA) compliant DRM used to protect student records, a DMV record and a (DPPA) compliant DRM used to protect DMV information, a child's information and a (COPPA) compliant DRM used to protect against collection of a child's personal information, an online transaction file and a (VPPA) compliant DRM used to protect against online theft, a subscriber record and a (CCPA) compliant DRM used to protect subscriber privacy, a personal information file and a (CCPA) compliant DRM used to protect personal information, a file stored on a computer and a (CFAA) compliant DRM used to prohibit unauthorized computer use, a communication file and an (ECPA) compliant DRM used to prohibit intercepted communications, an identification file and a SOX compliant DRM used to enforce protection of cybersecurity credentials, and a DoD or DFAR related file and a DFAR compliant DRM used to protect unauthorized dissemination of DoD information.

9. A computer-implemented system for secure text messaging and object sharing, comprising:

a first user computing device having a memory and a hardware processor and program instructions saved to the memory and executable by the processor for running a DRM Messaging application configured to assign a digital rights management (DRM) restriction to an electronic messaging object associated with a first user to generate a DRM-modified electronic messaging object (DRM-MEMO), the electronic messaging object selected from a text message, a document, a photo, a video file, and an audio file, the DRM restriction selected by the first user from a DRM menu in a mobile application installed on a first user computing device, the DRM restriction selected from copy, save, print, forward, expire, revoke upon violation, disappear, edit, and modify, the electronic messaging object saved to memory associated with the first user computing device, the first user computing device in encrypted communication with a DRM Cloud Server, a second user computing device having a memory and a hardware processor and program instructions saved to the memory and executable by the processor for running a DRM Messaging application, a DRM Cloud Server having a memory and a hardware processor and program instructions saved to the memory and executable by the processor for providing a DRM Cloud Service configured to perform server-side rendering of the DRM-modified electronic messaging object on the DRM Cloud Server to produce an HTML file of the DRM-modified electronic messaging object, the HTML file saved to a storage location associated with the first user, transmit a URL link of the HTML file in an encrypted electronic message to the second user computing device of a second user, the second user computing device in encrypted communication with the DRM Cloud Server, the URL link displayed within a message module of the DRM Messaging application of the second user computing device, request the HTML file of the DRM-modified electronic messaging object from the DRM Cloud Server in response to the second user clicking the URL link, display in a browser associated with the DRM Messaging application of the second user computing device the HTML file of the DRM-modified electronic messaging object, and process the DRM restriction on the electronic messaging object by monitoring the second user computing device, send an Alert by the DRM messaging application on the second user computing device to the DRM Cloud Server when a DRM restriction is violated, forward the Alert from the DRM Cloud Server to the DRM Messaging application installed on the first user computing device, send an enforcement command from the DRM Messaging application installed on the first user computing device to the DRM Cloud Server, and enforce the DRM restriction by disabling the URL link to the HTML file when a DRM restriction is violated.

10. The system of claim 9, wherein the encryption is standard 256-bit AES encryption or is split-key encryption.

11. The system of claim 9, wherein the DRM restriction is assigned to the electronic messaging object using XrML to insert a restrictive header into metadata of the electronic messaging object.

12. The system of claim 9, wherein the DRM Cloud Server stores the DRM-modified electronic messaging object on a decentralized cloud platform having a blockchain network auditing module and blockchain identity and security module, and wherein the DRM Cloud Server has a blockchain crypto payments module.

13. The system of claim 9, wherein the first user computing device and the second user computing device are each a mobile telephone, and wherein the DRM Messaging application is configured as a mobile telephone application.

14. A computer-implemented system, comprising:
a first mobile computing device having memory and a hardware processor, said first user computing device executing a DRM Mobile Messaging App configured to effect, by the first mobile communication device in encrypted communication with a DRM Cloud Server, assignment of DRM permissions on an electronic messaging object, to generate a DRM restricted electronic messaging object, said DRM Mobile Messaging App configured to send, by a TCP-IP communication module, the DRM restricted electronic messaging object, encrypted in transit from the first mobile communication device to the DRM Cloud Server, said DRM Cloud Server configured to render, by a DRM rendering module, an HTML file of the DRM restricted electronic messaging object sent to the DRM Cloud Server, the HTML file stored in memory associated with the DRM Cloud Server and having a URL link associated therewith, said DRM Cloud Server configured to forward, by the TCP-IP communication module, the URL link, encrypted in transit, to a second mobile communication device having program instructions saved thereon and executable on a processor for the DRM Mobile Messaging App, said DRM Mobile Text App having a browser associated therewith to request access to the HTML file, and said DRM Mobile Messaging App configured to process, by a DRM Enforcement module, DRM permissions on the HTML file, said DRM Mobile Messaging App configured to send an Alert, encrypted in transit, by the DRM Enforcement module, to the DRM Cloud Server when a DRM permissions violation is detected, and said DRM Cloud Server forwarding the Alert, encrypted in transit, by the TCP-IP communication module, to the DRM Mobile Messaging App of sending an enforcement command, by the DRM Mobile Messaging App of the first mobile communication device that assigned the DRM permissions, to the DRM cloud server, said DRM Cloud Server configured to send the enforcement command to the second mobile communication device, encrypted in transit, by the DRM enforcement module, wherein the DRM Cloud Server is configured to enforce DRM permissions to disable access by the second mobile communication device to the URL link.

15. The system of claim 14, wherein the encryption is standard 256-bit AES encryption or is split-key encryption for a private key located at the DRM Cloud Server and a public key located in the DRM Mobile Messaging App.

16. The system of claim 14, wherein the DRM Mobile Messaging App is configured to interface with a Contacts App on the first mobile communication device.

17. The system of claim 14, wherein the encryption is split-key encryption, and wherein the DRM restriction is assigned to the electronic messaging object using XrML to insert a restrictive header into metadata of the electronic messaging object.

18. The system of claim 14, wherein the DRM Cloud Server stores the DRM-modified electronic messaging object on a decentralized cloud platform having a blockchain network auditing module and blockchain identity and security module, and wherein the DRM Cloud Server has a blockchain crypto payments module.

\* \* \* \* \*